US011031790B2

(12) United States Patent
Baldasare et al.

(10) Patent No.: US 11,031,790 B2
(45) Date of Patent: Jun. 8, 2021

(54) SYSTEM AND METHOD FOR PROVIDING INTERCONNECTED AND SECURE MOBILE DEVICE CHARGING STATIONS

(71) Applicant: ChargeItSpot, LLC, Philadelphia, PA (US)

(72) Inventors: Douglas Baldasare, Philadelphia, PA (US); Sheri Tate, Philadelphia, PA (US); Robert Kay, Cinnaminson, NJ (US); Jeffrey Bergeland, Philadelphia, PA (US); Mikayla Wickman, Englewood, CO (US); Charles Williams, Cornwall, NY (US); David Andreasen, Menahga, MN (US); Saran Singh Sound, Boca Raton, FL (US); Michael Weinberg, Philadelphia, PA (US)

(73) Assignee: ChargeItSpot, LLC, Philadelphia, PA (US)

( * ) Notice: Subject to any disclaimer, the term of this patent is extended or adjusted under 35 U.S.C. 154(b) by 0 days.

(21) Appl. No.: 17/018,833

(22) Filed: Sep. 11, 2020

(65) Prior Publication Data

US 2020/0412133 A1 Dec. 31, 2020

Related U.S. Application Data

(63) Continuation-in-part of application No. 16/665,479, filed on Oct. 28, 2019, now Pat. No. 10,778,016,
(Continued)

(51) Int. Cl.
*H02J 7/00* (2006.01)
*G08B 21/18* (2006.01)
(Continued)

(52) U.S. Cl.
CPC ........ *H02J 7/0013* (2013.01); *G06K 9/00362* (2013.01); *G07C 9/21* (2020.01);
(Continued)

(58) Field of Classification Search
CPC ..... G06F 21/32; G06F 3/016; H04L 63/0861; H04L 2463/082; G06K 9/00221; G07C 9/00174; G07C 9/00571; G07C 9/00912
See application file for complete search history.

(56) References Cited

U.S. PATENT DOCUMENTS 5,212,644 A * 5/1993 Frisch ................ G06Q 30/0284
235/378
5,668,929 A * 9/1997 Foster, Jr. ................ G07C 9/37
704/273

(Continued)

*Primary Examiner* — Dung Hong
(74) *Attorney, Agent, or Firm* — Ellenoff Grossman & Schole LLP; James M. Smedley; Alex Korona

(57) ABSTRACT

A system for verifying the identity of a user is disclosed. The system has a door that selectively opens to allow access to a cavity and selectively closes to block access to the cavity, a lock configured to selectively lock and unlock the door when the door is closed, a camera configured to image a user area adjacent to the door, computing memory having associated therewith code, and a processor communicatively coupled with the computing memory. The processor communicatively coupled with the computing memory is configured to execute the code and to control the camera to record a first image data of the user area that includes a plurality of first image sets recorded at a plurality of first times, store the first image data, and control the camera to record a second image data of the user area that includes a second image set recorded at a second time.

18 Claims, 60 Drawing Sheets

Related U.S. Application Data which is a continuation of application No. 15/996,956, filed on Jun. 4, 2018, now Pat. No. 10,742,046, which is a continuation-in-part of application No. 15/362,370, filed on Nov. 28, 2016, now Pat. No. 10,070,250, which is a continuation-in-part of application No. 14/095,866, filed on Dec. 3, 2013, now Pat. No. 9,537,994.

(60) Provisional application No. 61/732,731, filed on Dec. 3, 2012.

(51) Int. Cl.

| | |
|---|---|
| *G06K 9/00* | (2006.01) |
| *H04W 4/021* | (2018.01) |
| *H04L 29/06* | (2006.01) |
| *G07C 9/21* | (2020.01) |
| *H04W 12/06* | (2021.01) |
| *H04W 4/02* | (2018.01) |
| *H04W 12/065* | (2021.01) |
| *G07C 9/32* | (2020.01) |
| *H04W 4/80* | (2018.01) |
| *H04W 8/18* | (2009.01) |
| *G07C 9/22* | (2020.01) |

(52) U.S. Cl.
CPC .......... *G08B 21/182* (2013.01); *H02J 7/0047* (2013.01); *H04L 63/0861* (2013.01); *H04W 4/021* (2013.01); *H04W 4/023* (2013.01); *H04W 12/06* (2013.01); *H04W 12/065* (2021.01); *G07C 9/22* (2020.01); *G07C 9/32* (2020.01); *H02J 7/0048* (2020.01); *H04W 4/80* (2018.02); *H04W 8/18* (2013.01)

(56) References Cited

U.S. PATENT DOCUMENTS

| | | | | |
|---|---|---|---|---|
| 5,894,277 | A * | 4/1999 | Keskin | E05B 47/00 340/5.21 |
| 6,102,162 | A * | 8/2000 | Teicher | G07F 17/0042 186/39 |
| 7,539,875 | B1 * | 5/2009 | Manferdelli | G06F 21/10 380/277 |
| 8,411,909 | B1 * | 4/2013 | Zhao | G06K 9/00899 382/116 |
| 8,457,367 | B1 * | 6/2013 | Sipe | G06K 9/00315 382/118 |
| 9,373,967 | B1 * | 6/2016 | Sullivan | H02J 7/0027 |
| 10,032,327 | B1 * | 7/2018 | Xin | G06K 9/00255 |
| 10,283,984 | B2 * | 5/2019 | Maguire | H02J 7/0044 |
| 2002/0080030 | A1 * | 6/2002 | Inomata | G07F 17/12 340/542 |
| 2002/0191817 | A1 * | 12/2002 | Sato | G06K 9/00288 382/118 |
| 2003/0025590 | A1 * | 2/2003 | Gokcebay | G07C 9/00571 340/5.73 |
| 2003/0052768 | A1 * | 3/2003 | Maune | G07C 9/253 340/5.53 |
| 2004/0021551 | A1 * | 2/2004 | Yamagishi | G07C 9/33 340/5.52 |
| 2005/0065851 | A1 * | 3/2005 | Aronoff | G06Q 50/12 705/15 |
| 2006/0190419 | A1 * | 8/2006 | Bunn | G06K 9/00771 706/2 |
| 2007/0085655 | A1 * | 4/2007 | Wildman | G07C 9/37 340/5.53 |
| 2008/0247611 | A1 * | 10/2008 | Aisaka | G06K 9/6255 382/118 |
| 2013/0132307 | A1 * | 5/2013 | Phelps | H02J 7/0027 705/412 |
| 2013/0307382 | A1 * | 11/2013 | Garrison | G07F 17/12 312/215 |
| 2013/0340656 | A1 * | 12/2013 | Rainier | E05G 1/02 109/38 |
| 2015/0178676 | A1 * | 6/2015 | Carr | G06Q 10/0836 705/332 |
| 2015/0186840 | A1 * | 7/2015 | Torres | A47F 10/02 705/339 |
| 2015/0254760 | A1 * | 9/2015 | Pepper | G07F 17/12 705/5 |
| 2016/0328896 | A1 * | 11/2016 | Zheng | H05B 47/19 |
| 2017/0033579 | A1 * | 2/2017 | Maguire | H02J 7/0044 |
| 2018/0165638 | A1 * | 6/2018 | Wilkinson | H04W 12/062 |
| 2018/0213191 | A1 * | 7/2018 | Shen | G06K 9/00892 |
| 2018/0291650 | A1 * | 10/2018 | Zabala Zabaleta | G07C 9/00309 |
| 2018/0365643 | A1 * | 12/2018 | Zhu | G06K 19/06037 |
| 2019/0077597 | A1 * | 3/2019 | Janwadkar | B65G 1/12 |
| 2019/0102962 | A1 * | 4/2019 | Miller | G07C 9/00309 |
| 2019/0114859 | A1 * | 4/2019 | Fee | G07C 9/00896 |
| 2019/0182457 | A1 * | 6/2019 | Kanaoka | B60R 25/102 |
| 2020/0210685 | A1 * | 7/2020 | Ko | G06K 9/00288 |
| 2020/0286006 | A1 * | 9/2020 | Huang | G07C 9/00563 |
| 2020/0291682 | A1 * | 9/2020 | Pukari | E05B 47/0038 |

* cited by examiner

Photo Verification in English

Photo Verification in Spanish

Attract Screen

Enroll in Rewards Access

Confirm Your Information

Survey Flow

Brief Survey Before you Charge

Progress Bar

1. What is Your Age?

- Under 18
- 18-25
- 26-30
- 31-35
- 36-40
- 40+

Next

Welcome!

Before you charge up, please answer a few questions about retail shopping.

Figure 7L

Attract Screen

Enter Mobile Number

Oops! Email (or scan) not recognized

Security Image

Select Locker

SYSTEM AND METHOD FOR PROVIDING INTERCONNECTED AND SECURE MOBILE DEVICE CHARGING STATIONS

CROSS REFERENCE TO RELATED APPLICATIONS

This application is a continuation-in-part of U.S. patent application Ser. No. 16/665,479, filed Oct. 28, 2019, which is a continuation of U.S. patent application Ser. No. 15/996,956, filed Jun. 4, 2018, which is a continuation-in-part of U.S. patent application Ser. No. 15/362,370, filed Nov. 28, 2016 (and now U.S. Pat. No. 10,070,250), which claims priority to U.S. patent application Ser. No. 14/095,866, filed Dec. 3, 2013 (and now U.S. Pat. No. 9,537,994), which claims priority to U.S. Provisional Patent Application No. 61/732,731, filed Dec. 3, 2012, which are hereby incorporated by reference in their entireties.

FIELD OF THE INVENTION

The instant disclosure relates to mobile devices, and, in particular, to systems and methods for providing interconnected, secure public or private mobile device charging stations.

BACKGROUND OF THE INVENTION

Mobile devices, such as cellular phones, personal digital assistants, tablets, and the like, are now widely used and heavily depended upon for voice and data communications. In order to maintain proper power levels for the operation of the device, the battery of the mobile device needs to be recharged from time to time. Often, at inopportune times, mobile device users may be located at public or private locations without the ability to recharge the mobile device battery. Even with the existence of public mobile device charging stations, these stations are limited in number and location. Consequently, a mobile device user runs the risk of his mobile device battery being exhausted before locating an available station to recharge the mobile device.

BRIEF DESCRIPTION OF THE FIGURES

Understanding of the present invention will be facilitated by consideration of the following detailed description of the preferred embodiments of the present invention taken in conjunction with the accompanying drawings, in which like numerals refer to like parts:

Figure 7C:
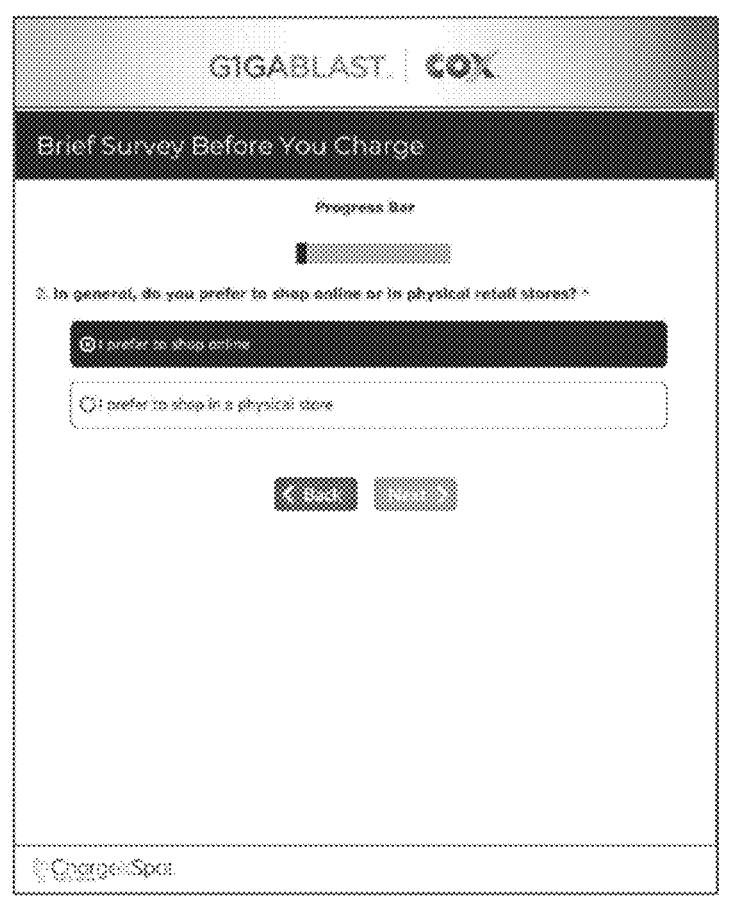
Figure 7G:
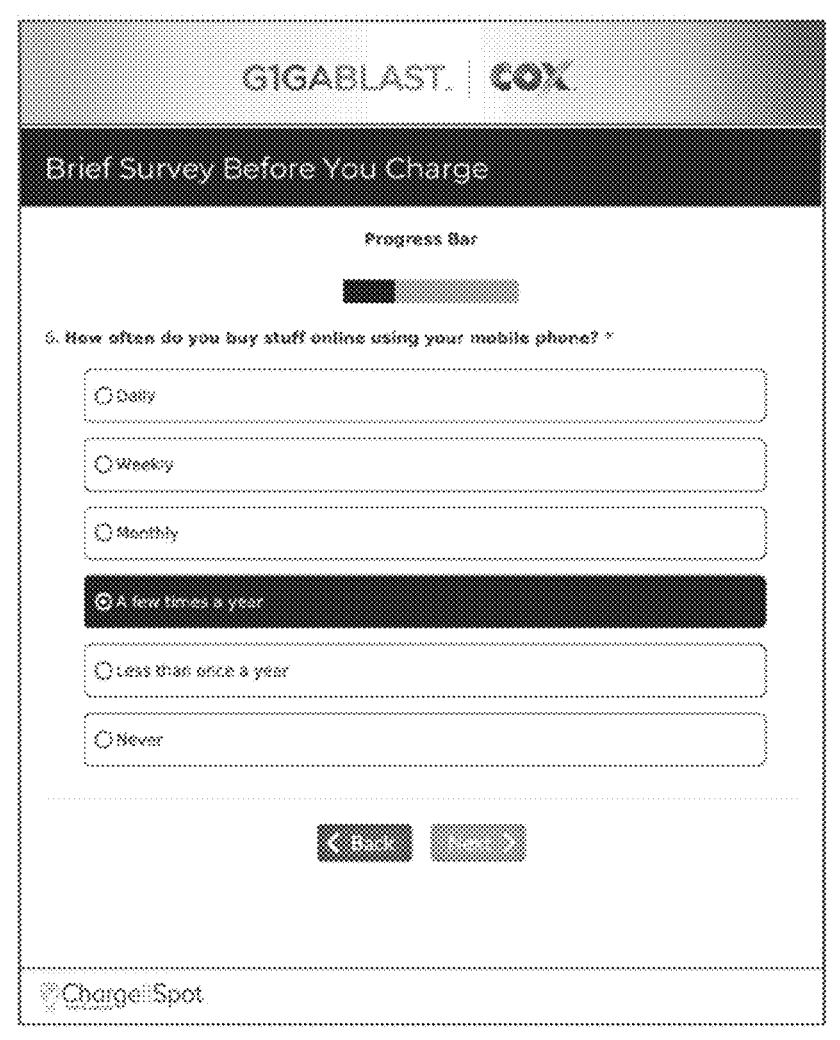

FIGS. 7A-7L illustrate a survey interface embodiment;

SUMMARY OF THE INVENTION

Figure 1:
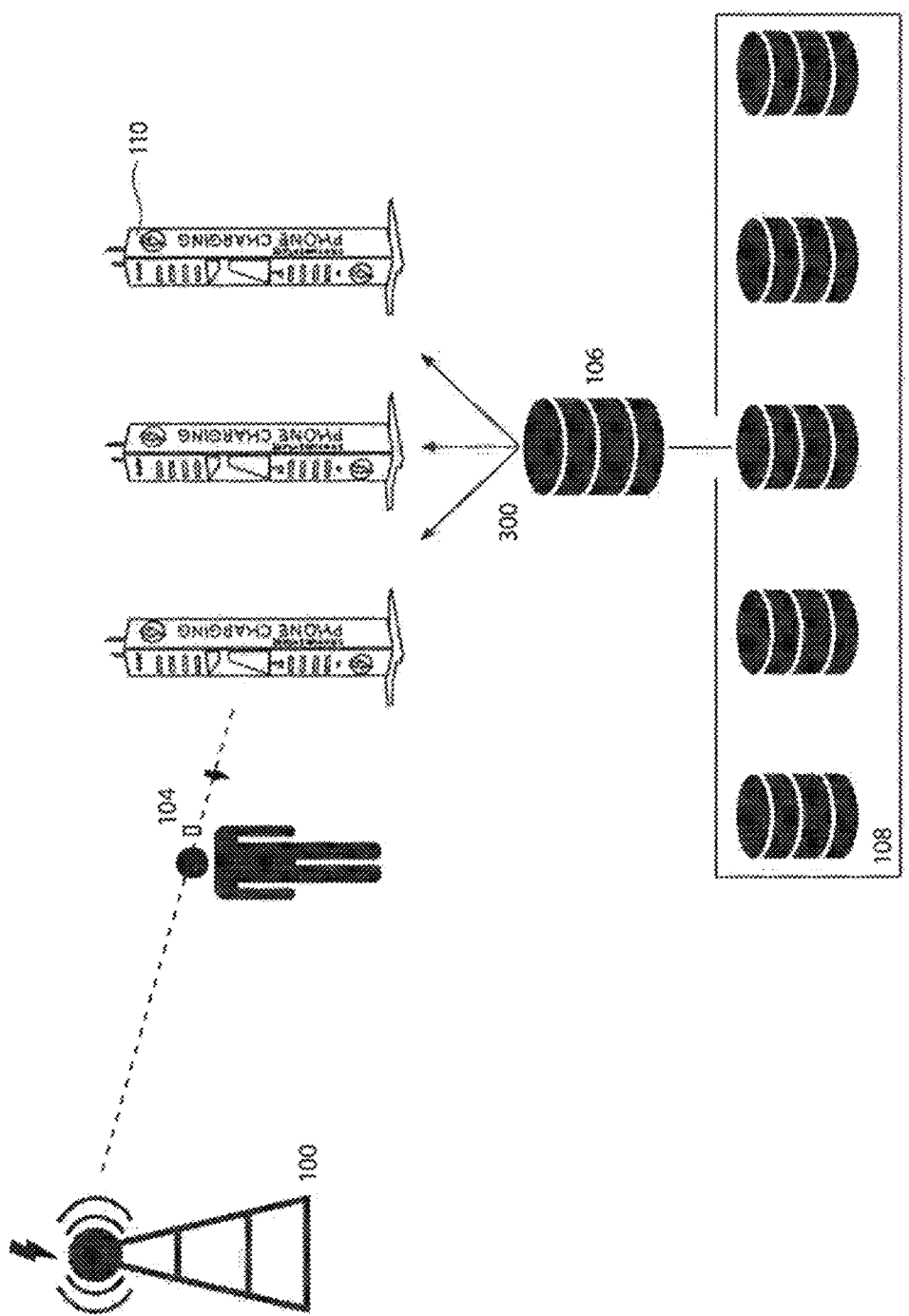
FIG. 1 illustrates a diagram of a system according to embodiments of the present invention.

In one exemplary aspect, the present disclosure is directed to a system for verifying the identity of a user. The system includes a door that selectively opens to allow access to a cavity and selectively closes to block access to the cavity, a lock configured to selectively lock and unlock the door when the door is closed, a camera configured to image a user area adjacent to the door, computing memory having associated therewith code, and a processor communicatively coupled with the computing memory. The processor communicatively coupled with the computing memory is configured to execute the code and to control the camera to record a first image data of the user area that includes a plurality of first image sets recorded at a plurality of first times, store the first image data, control the camera to record a second image data of the user area that includes a second image set recorded at a second time, and selectively unlock the door based on comparing the second image data to the first image data. Comparing the second image data to the first image data includes transmitting the first and second image data to a remotely-located device, selectively displaying some of the plurality of first images sets on the remotely-located device, and continuously displaying the second image set on the remotely-located device.

In another aspect, the present disclosure is directed to a method. The method includes providing a door that selectively opens to allow access to a cavity and selectively closes to block access to the cavity, using a lock to selectively lock and unlock the door when the door is closed, using a camera to image a user area adjacent to the door, providing computing memory having associated therewith code and a processor communicatively coupled with the computing memory to execute the code, and controlling the camera to record a first image data of the user area that includes a plurality of first image sets recorded at a plurality of first times. The method also includes storing the first image data, locking the door, controlling the camera to record a second image data of the user area that includes a second image set recorded at a second time, transmitting the first and second image data to a remotely-located device, selectively displaying some of the plurality of first images sets on the remotely-located device, continuously displaying the second image set on the remotely-located device, and selectively unlocking the door based on comparing the second image data to the first image data using the remotely-located device.

The present disclosure provides systems and techniques for providing and locating public or private mobile device charging stations.

In embodiments of the present invention, one or more charging stations may be configured to charge a battery of a mobile device. A database may be configured to store location information of the one or more charging stations, as well as mobile device location, charge, and/or other information of the one or more respective mobile devices. A server communicatively coupled with the one or more charging stations and the database may be configured to determine proximity of the one or more charging stations to a location of the mobile device. This determination may be based on the station location information and the mobile device location information. Based on the determined proximity, the server may provide the station location information of a respective one or more charging stations to the mobile device.

By way of example, the location of a charging station may be provided to a device as a push notification, such as including an indication of battery level and the closest charging station; or the location may be provided when an on-device app is proactively opened by the user to see the closest locations, such as may be assessed based on native geo-location services, for example. In the latter methodology, the battery level may not be provided, and the closest stations may be shown in any of a variety of views, such as a list view, that may be selectable by the user.

As such, the server and/or mobile application may monitor, such as pinging the device periodically for, a power level of the battery of the mobile device. Based on the power level of the battery of the mobile device, the user may be alerted via any known methodology, such as via a pop-up alert from an app, and may be provided with location information of the respective one or more charging stations nearest to the mobile device using the methods above.

Thereby, the invention may provide a system and method to alert a user of the locations of nearby public or private charging stations to charge his mobile device when the battery power level of his mobile device decreases to a low level. Moreover, the disclosed system and method also provide a system and method that provides: advertising opportunities for retailers; the ability for retailers to drive traffic to a store or stores; a mobile application—such a mobile application might indicate and/or suggest charging station locations, and/or monitor a user's use and the correspondent battery charge; and the like.

DETAILED DESCRIPTION OF THE EMBODIMENTS

It is to be understood that the figures and descriptions of the present invention have been simplified to illustrate elements that are relevant for a clear understanding of the present invention, while eliminating, for the purpose of clarity, many other elements found in typical network systems, mobile devices, telecommunications servers and telecommunications generally, and associated methods. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to the disclosed elements and methods known to those skilled in the art.

It would be advantageous for a user to use a system to be alerted of the locations of nearby public or private charging stations to charge his mobile device when the battery power level of his mobile device decreases to a low level. It would be particularly advantageous if such a system and method also provided: advertising opportunities for retailers; the ability for retailers to drive traffic to a store or stores; a mobile application, such as a mobile application that would indicate and/or suggest charging station locations, and/or that would monitor a user's use and the correspondent battery charge; and the like.

Mobile devices, such as cellular phones, personal digital assistants, tablets, and the like are now widely used and heavily depended upon for voice and data communications, and for information generally. In order to be operational, mobile devices typically employ the use of rechargeable batteries. These batteries need to be recharged from time to time in order to maintain proper power levels for the operation of the mobile device. For example, some estimate that the typical user runs very low on battery power in a mobile device multiple times each week.

Because a conventional charger generally utilizes alternating current, and specifically typically uses either 110V or 220V "household" current designed for general use, it is often difficult to recharge a mobile device battery in a public place or while traveling without access to a suitable power terminal. However, the amount of current a phone accepts is generally "stepped down" from the 110V or 220V alternating current, such as typically using a "wall wart" charger that comes with the phone, as would be apparent to the skilled artisan. Thus, even in the case of an available power terminal, such charging would require the user to also be traveling with a charger, which may be inconveniently bulky or easily forgotten. Similarly, while outside and/or travelling in a vehicle, the user may need to have his or her charger available (particularly, a charger that is adapted for the specific device brand and model) in order to use a vehicle's electrical power supply. Thus, public mobile device charging systems suitable for charging mobile devices are highly beneficial.

However, although charging stations are known, and due in part to the ubiquity of mobile device users and the currently limited number of publicly available mobile device charging stations, mobile device users may still have great difficulty locating a public charging station available for use. Consequently, a mobile device user regularly runs the risk of his mobile device battery being exhausted before locating an available station to recharge the mobile device.

Therefore, the present invention provides for a user to have readily available, secure charging capabilities. This is contrary to presently available charging solutions, which are typically non-secure at least in that the only security generally provided is when the user stands nearby to "guard" his/her phone. The inventive aspects may also provide for a user to be alerted of the locations of available public charging stations when the battery power level of his mobile device decreases to a low level. In particular, when the battery power of the mobile device decreases below a predetermined threshold level (for example, 20% of its maximum power), the mobile device may request, from the server, information of one or more registered businesses, i.e., any place of business that includes a charging unit, that house a charging station within a specified distance from the mobile device.

The disclosed system and method may also provide: advertising and differentiating opportunities for retailers; the ability for retailers to drive traffic to, and maintain traffic in, a store or stores; a mobile application, such as a mobile application that would indicate and/or suggest charging station locations, and/or that would monitor a user's use and the correspondent battery charge; and the like. For example, a user's time in-store in a retail establishment is likely to be increased as the user shops while awaiting a recharge. The user is also provided with a differentiated, enhanced customer shopping experience that increases consumer loyalty.

With reference to FIG. 1, GPS satellites (or other known mobile device locating technologies, such as triangulation) 100 operate to determine a location of a mobile device 104 that contains features, some of which features may be available based upon the location data. As used herein, mobile device 104 may refer to cellular phones, personal digital assistants, tablets, and the like. The mobile device 104 may determine its location through the use of received GPS signals, or through the use of a filter which may combine location data from the GPS signals and/or from another system, such as cell-tower-triangulation or a WLAN system in order to obtain a location or a more accurate location. The mobile device 104 may be wirelessly coupled to server 106. The server 106 may be communicatively coupled to a datastore 108, as well as to a plurality of charging stations 110.

According to certain embodiments of the present invention, the server 106 periodically receives and stores location information associated with the mobile device 104. This location information may be sent from the mobile device 104; pulled from the mobile device 104; or obtained from another service that is able to determine the location of the mobile device (e.g., Location Based Services (LBS), Assisted GPS (A-GPS), eGPS, GSM Localization, Multilaterilization, Radiolocation, Trilateration, etc.).

For example, many public areas may provide Wi-Fi access points that consumers are allowed to utilize. These access points may also be used to help ascertain the location of a user or his relation to publicly available charging stations. For example, a Skyhook Wireless system may be used. This location information may be analyzed independent of or in conjunction with other forms of information or location information. For example, Wi-Fi location information may be particularly useful in certain indoor environments where other technologies (e.g. GPS) may have more difficulty functioning, such as in a shopping mall housing a collection of retail businesses.

Embodiments of the present invention allow a mobile device user (who may become registered with the system upon using the charging station 110 for the first time) to be alerted of the locations of available public charging stations when the battery power level of his mobile device decreases, such as to a predetermined threshold level, which may be automatically set or which may be previously set by the user. Accordingly, when the battery power of the mobile device decreases below this predetermined threshold level (for example, 20% of its maximum power), the mobile device may request, from the server, information of one or more registered businesses housing a charging station within a specified distance from the mobile device. Alternatively, the location information of the mobile device may be sent to the server and compared with: the location information of one or more of the registered businesses housing a charging station; a list or a preferential list of registered businesses housing a charging station; a list of registered businesses having charging stations and making offers to consumers that those businesses wish to be known to the consumers; and the like.

By way of non-limiting example only, a mobile device user may be out in public, shopping. Becoming occupied with his shopping, the user may forget or neglect to check the battery power level of his mobile device. The system and method, according to embodiments of the present invention, may notify the user via his mobile device that the battery power of the device is indeed low, and then may display to the user a nearby store which houses a charging station, and that has a charging unit, such as a charging "locker," available. In an embodiment of the present invention, the mobile device app may display the number of charging lockers available so a user does not waste time going to a charging station that does not have any charging lockers available. By being timely notified by the mobile device associated with the disclosed system and method, the user may have enough time to locate and subsequently recharge his mobile device battery for continued use of his mobile device without having to cut short his shopping experience or risk losing operation of his mobile device. As a substantial benefit to a registered business housing the charging station, the business may experience increased consumer traffic, as potential consumers enter the business to recharge their phone, and the opportunity to make targeted enticements to consumers having a known location proximate to the registered business. For example, in a specific retail brand research study, usage of the disclosed cell phone charging kiosk resulted in an increase in dwell time of 130%, an increase in spend of 51%, and an increase in Net Promoter Score of 26%.

Figure 2:
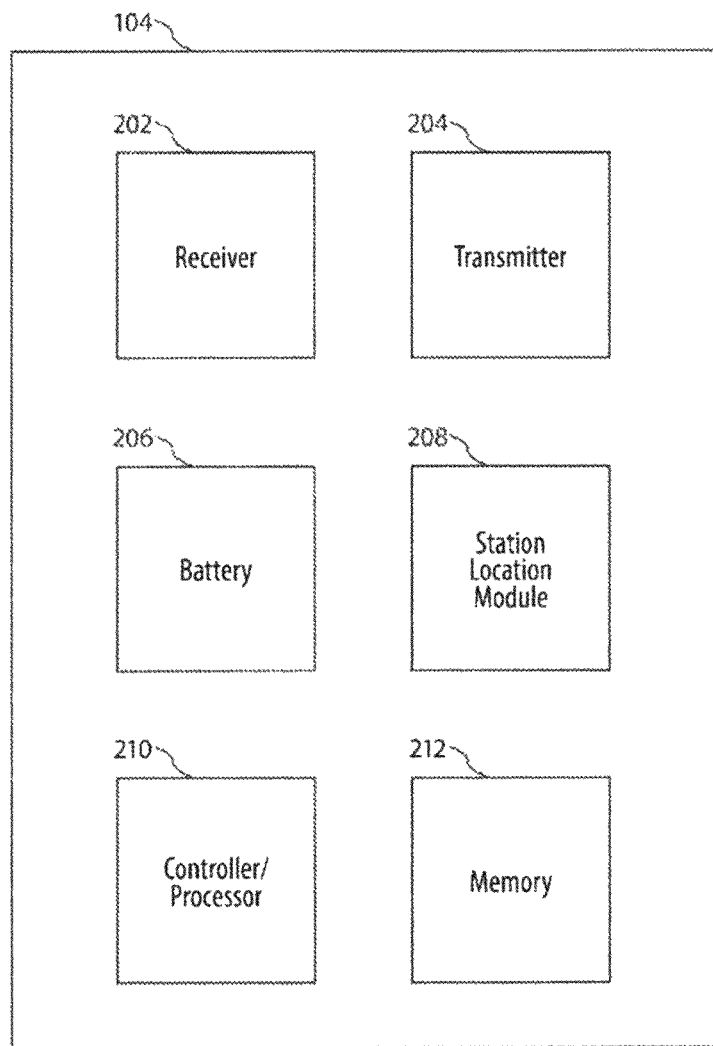
FIG. 2 illustrates a block diagram of a mobile device according to embodiments of the present invention.

FIG. 2 shows a block diagram of a mobile device 104 according to an embodiment. Within the mobile device 104, a receiver 202 may receive signals transmitted from GPS satellites, cell-towers, and/or access points for WLAN communication. A transmitter 204 may transmit signals including location information to the remote server or other access points. Power is provided to the various components of the mobile device 104 through battery 206. A station location module 208 may monitor a power level of the battery 206, and, based on the power level, the station location module 208 may provide station location information to the user of the mobile device 104. It should be noted that the station location module 208 may be able to monitor other functions and features of the mobile device as well. This information may be stored in one or more of databases described in datastore 108. The various modules within the mobile device 104 may operate as described hereinthroughout. A controller/processor 210 may direct the operation of various modules within mobile device 104, such as by execution of software program code to perform the functions discussed hereinthroughout. A memory 212 may store data and program codes for mobile device 104.

Figure 3:
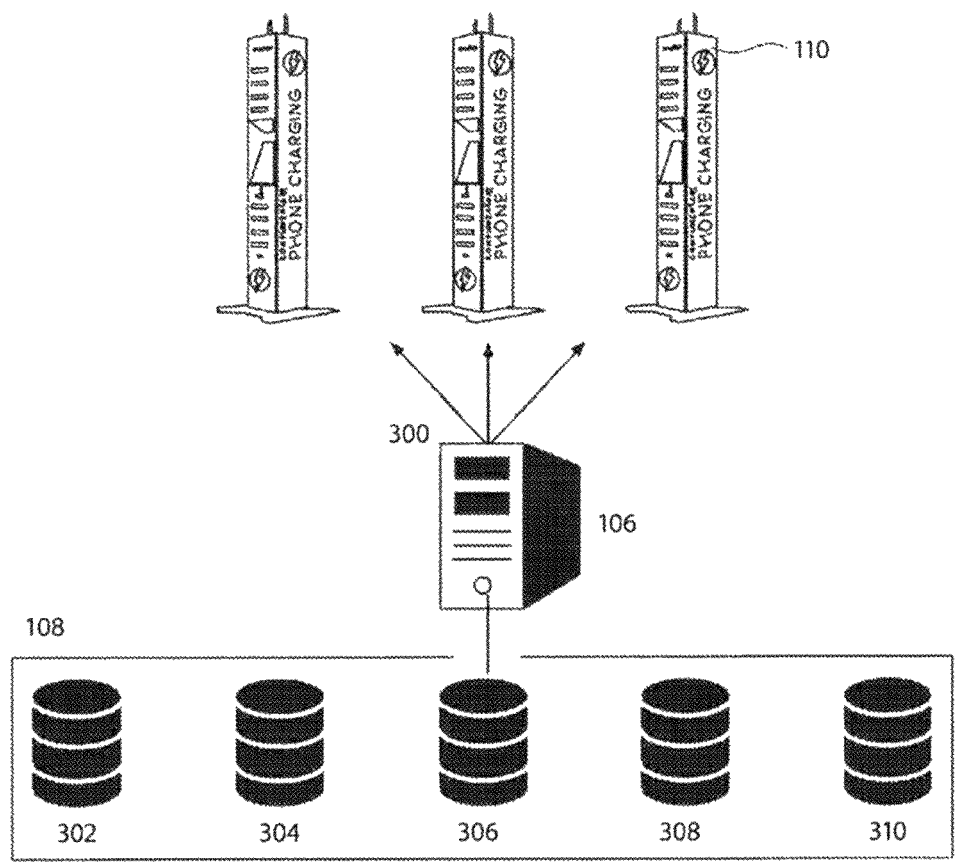
FIG. 3 illustrates a block diagram of a system according to embodiments of the present invention.

FIG. 3 shows a block diagram of a system 300 according to embodiments of the present invention. The system 300 comprises one or more charging stations 110, server 106 and data store 108. In certain embodiments of the present invention, the server 106 performs the tasks of providing charging station information to the mobile device. This charging station information may include geographical locations and/or directions to one or more respective charging stations and registered businesses in which these charging stations are housed or otherwise associated. This charging station information may also include advertisements or other types of information related to the associated businesses.

This charging station information, among other types of information, is stored in one of the various databases 302-310 in data store 108. It should be noted that the various databases 302-310 shown in data store 108 may be organized as separate databases, portions of a single database, or by any other logical structure appropriate for storing the data.

Of course, the skilled artisan will appreciate, in light of the disclosure herein, that information and data may also be stored locally at a locker/kiosk/station. Thereby, a user may be enabled to obtain her phone even if power is lost or the network connection of the locker/station goes down. In the case of a power outage, an alternative embodiment may include a UPS (universal power supply) that provides up to 45 minutes of battery backup as an added security measure that allows customers to interact with the kiosk when power is out for short periods of time. Moreover, in order to provide enhanced security in the instant invention, this locally stored information may be periodically purged, such as when a phone is obtained, or daily or weekly.

As illustrated in FIG. 3, data store 108 stores user information in user database 302. This information may include email addresses, phone numbers, user photos, survey responses, duration of charge, and the like.

A map database 304 may also be included. This database 304 may provide the background maps that are displayed on each user's mobile device and that correspond to an area or region around the user at the time the application is invoked (i.e., when the user's mobile device battery is low). For example, a map tile of the United States may provide an image of the continental U.S. that can be zoomed to display a regional street level map for any area in the U.S. The map may further be zoomed to display locations within a venue housing a collection of businesses. For example, a user may be located within a mall, and the application may be invoked due to his mobile device battery being low. The mobile device may display locations of retail stores within the mall which house available charging stations to charge the user's mobile device, either upon zooming in on the application by the user, or by a predetermined setting for displaying a location.

Figure 4A:
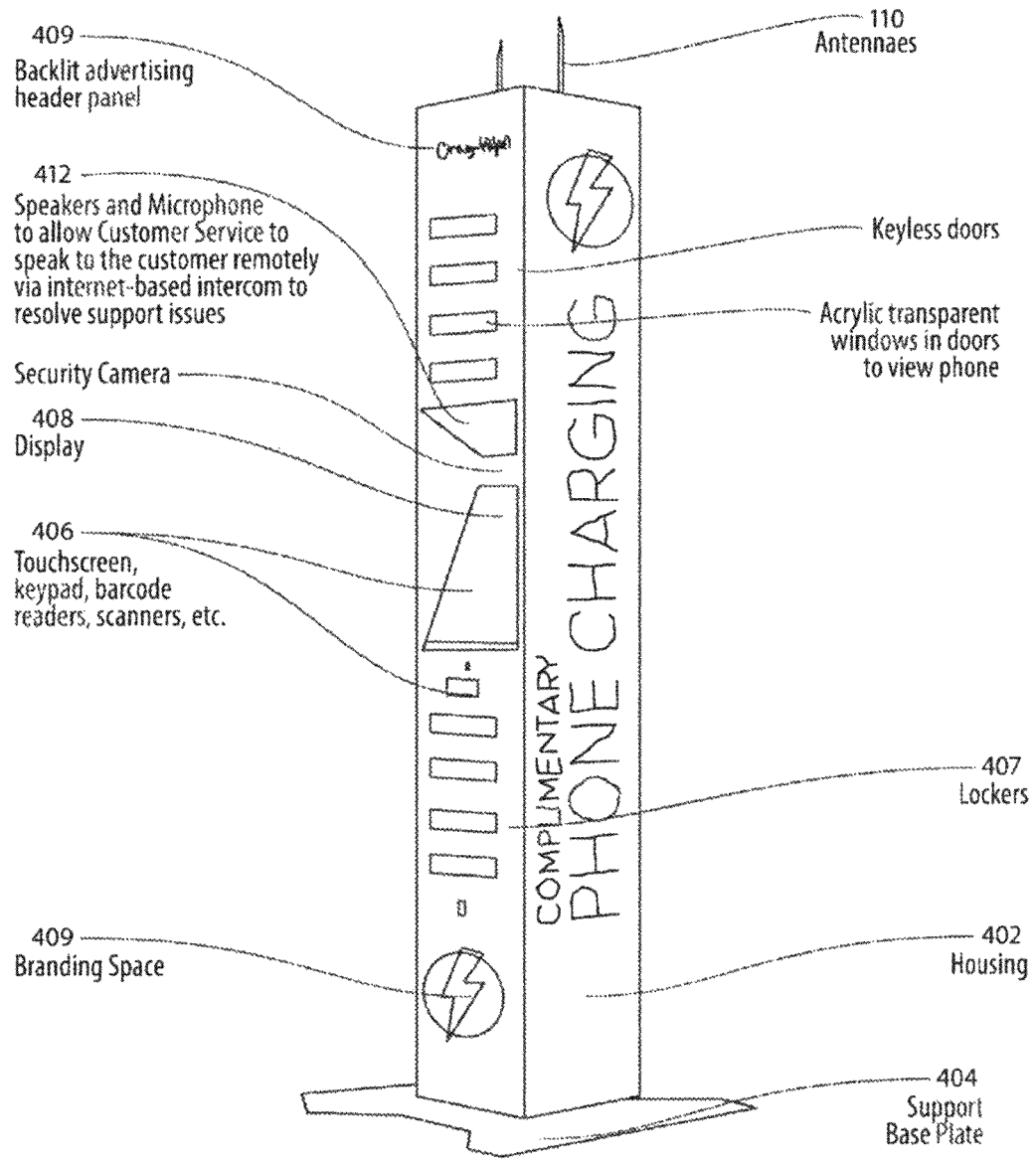
FIG. 4A illustrates an example of a mobile device charging station according to embodiments of the present invention.
Figure 4B:
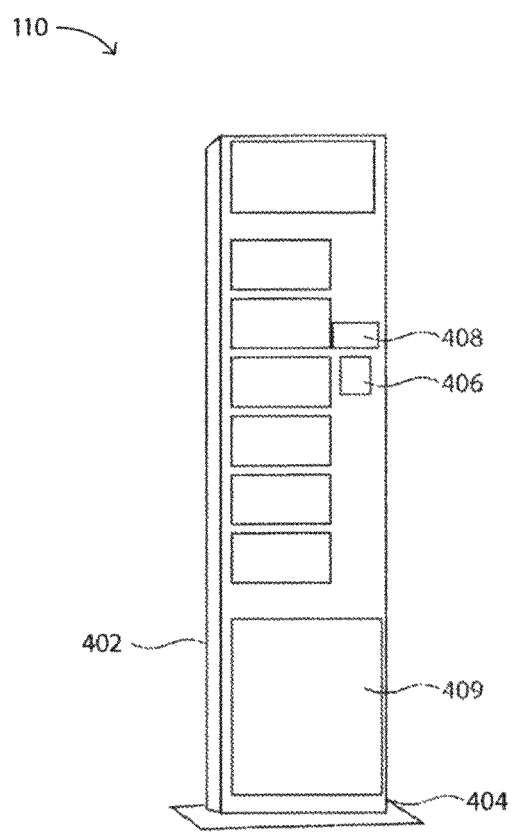
FIG. 4B illustrates another example of a mobile device charging station according to embodiments of the present invention.

A location database 306 may store geographic locations of charging stations and/or geographic locations of mobile devices 104 and/or clusters thereof. A charging station database 308 may store the current status of available lockers within any charging stations. This status may include a number of lockers of a particular charging station not currently in use, or, available, for charging. The data store 108 may also comprise a registered business database 310, which may store information related to businesses currently registered with the charging system according to embodiments of the present invention. For example, the business database 310 may include approved advertisements, or associated content describing respective registered businesses. FIG. 4A illustrates a mobile device charging station 110 according to embodiments of the present invention. This station 110 may be located in a retail store, mall, hospital, stadium, casino, building lobby, or any other location suitable for accessibility. In FIG. 4B, station 110 includes a housing 402 mounted on a support 404. Embodiments may also include, on a face of the charging station 110, branding or advertising space 409 for a registered business to provide information about its business, which may include, by non-limiting example, advertisements, coupons, or any other suitable content related to its business. Each housing 402 may comprise one or more lockers 407, preferably having resident therein supplied power, such as a plurality of charging cords or other wireless charging options, such as supplied power having different plugs, power mats, or like proprietary or third party charging formats for mating to different mobile devices, such as USB plugs, micro-USB, mini-USB or USB-C plugs, laptop tip plugs, and/or one or more proprietary plugs, such as plugs for an iPhone 3, 4, 5, 6, 7, 8, and so on. Of course, any other charging plugs that presently exist or are subsequently developed may be included, as well as any other current or subsequent charging methodologies, such as charging mats, wireless charging, etc. It should be understood that housing 402, support 404, locker 407, and branding space 409 may have any desired dimension or configuration, depending, at least in part, on the particular location of the station 110, and that the overall design of station 110 shown in FIG. 4A is for exemplary purposes only.

By way of example, charging stations may comprise eight lockers, each with multi-use charging cables, and/or multiple different charging cables, there within. The lockers may reside in a structure formed of a suitably durable composition, such as metal, acrylic, plastics or other, and combinations thereof. For example, the door of a charging locker may allow for the user to see inside the locker, but may be formed of a combination or metal or other, and/or an acrylic panel that can withstand forces up to or exceeding, by way of non-limiting example, 10,000 psi.

Of course, a durable cabinet construction may allow for usage in a variety of environments, and the durable construction may be formed accordingly, such as by metal treated with rust proofing. In addition, other measures may be taken for kiosks for use in outdoor environments such as gasketing, heating and ventilation systems, etc. Moreover, the durable housing may house there within a variety of other features, such as antennas, PCBs, and the like, as referenced herein throughout. Alternatively, antennas may be placed atop, behind, or alongside in physical association with a cabinet. In preferred embodiments, the antennas and associated or alternative hardware may be suitable to communicate and/or connect to a network, such as a local or global network, such as the Internet, using any of a variety of different communication methodologies dependent upon the context in which the cabinet is placed, such as using 4G LTE, 3G, a wide area network, a local area network, or the like. Moreover, multiple different antennas may provide this functionality, where a single antenna may provide multiple different functionalities for communication purposes. Accordingly, and dependent in part on location, communication speeds may be optimized by software or firmware algorithms within the cabinet, or remotely by an administrator, by way of non-limiting example.

Additionally, in the event the lockers can be at least partially transparent to a user, other features may be added within each individual charging locker, such as multi-color LEDs or blinking LEDs, also as referenced herein. These additional features may be controlled locally or remotely, such as to provide optionality correspondent to time of year, i.e., Christmas lights, branding of the unit, whether or not a locker is in use (i.e., a red light may mean that locker is in use), and the like.

Different mechanisms may be mounted on or associated with the housing 402 to enable a user to access, lock, and subsequently unlock an individual locker 407 for charging his mobile device 104. For example, the locking mechanism associated with a charging locker, such as in order to provide optimal security, may be break proof or resistant, such as withstanding up to or in excess of 1,000 pounds of force before yielding.

Referring to FIG. 4A, another mechanism, such as a bar code scanner or card or key FOB reader, and/or a display 408, such as a touch screen display (which may also display ads, coupons, codes and/or other aspects referenced herein), and/or a keypad 406 mounted to the housing 402, may allow for the collection of more user information. Coupled with a display 408 and microcontroller (not shown) connected to an electronic, keyless lock 413 (FIG. 4C), a user may be provided with instructions and options for charging his or her mobile device 104. For example, the locker 407 may be preprogrammed by the microcontroller (not shown) to accept a selected sequence or information entry by a new user when the electronic lock is unlatched (i.e. the locker 407 is open). The microcontroller (not shown) may be configured to accept the same sequence or information first entered by the user causing the lock to unlatch, allowing the user to remove his phone from the locker after use. This sequence or information may include user identifying information, such as the user's telephone number, key code, pin numbers, security questions, email addresses, selection of security images, scanning of a bar code (such as on a ticket provided by the kiosk to a user when the user placed the phone in the locker), etc.

The display 408 may thus prompt the user for other identifying information for the collection and subsequent storage of user shopping information which may be valuable to retailers/registered businesses. For example, the display 408 may prompt the user to enter his name, a telephone number, an email address, a name and/or telephone number in conjunction with other information, such as a security "pin" having 2, 3, 4, 5, 6 or more digits or such as a security image, a loyalty program identifier, or the like.

By way of example, upon actuation of keypad 406 or touch display 408, the display may prompt the user to enter his telephone number. It should be noted that other and/or additional user identifying information may be gathered as a part of these instructions. This gathered information may be used to serve several purposes. One purpose may be to provide verification information that the user is, indeed, who he says he is (such as by way of comparison to registered user information for system 300, by way of verification with information stored in the mobile application having associated therewith the aforementioned map and battery charge level capabilities, and/or by comparison with personal information on or associated with the mobile device. Another purpose is to ensure that only the user (or, an individual authorized by the user) is able to access the mobile device 104 from the locker 407 after the mobile device has been locked in the given locker 407. Yet further and as mentioned above, another purpose for the prompted user identifying information is to gather information about the user's shopping habits and/or frequented registered businesses, and/or other information as described hereinthroughout, which may be subsequently stored in user database 302 (as shown in FIG. 3).

The embodiments may thus include one or more remote, or local, data warehouses/databases 302. The data warehouse may include user information as discussed above and throughout, and/or may comprise reports, calculations, and the like, run over a predetermined time period in association with a kiosk or a group of kiosks, such as once per day. The data in the data warehouse may be segregated by user, user type, brand, group, and so on. For example, phone numbers and emails may be indicative of uniquely personal identifying information, and as such may be segregated by brand or group to which the user is willing to allow that information to be provided. Needless to say, this may provide enhanced security of use to users.

Also, as a security feature, the display 408 may display an image of which a user has previously selected upon initially accessing an available locker. For example, the user may enter a telephone number, and then either select or be shown an image, such as a black dog. Upon returning to unlock the locker, the user may be prompted to enter his phone number, and then to select the appropriate image that matches the preselected image in order to unlock the locker.

Figure 5A:
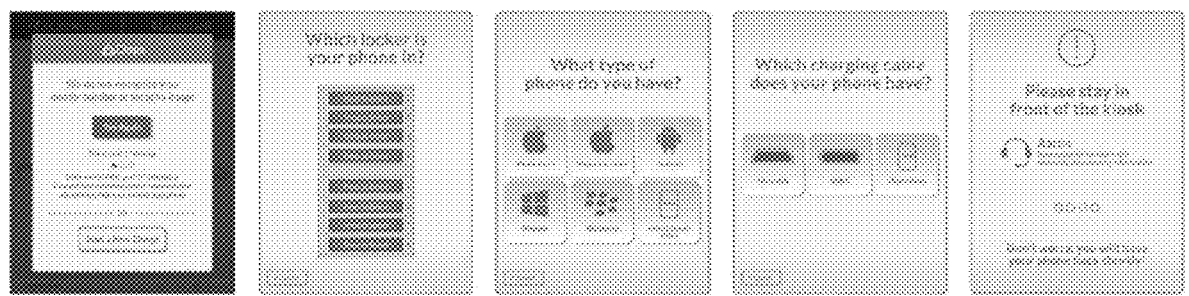
FIGS. 5A and 5B illustrate PhotoVerification in English and Spanish, respectively.
Figure 5B:
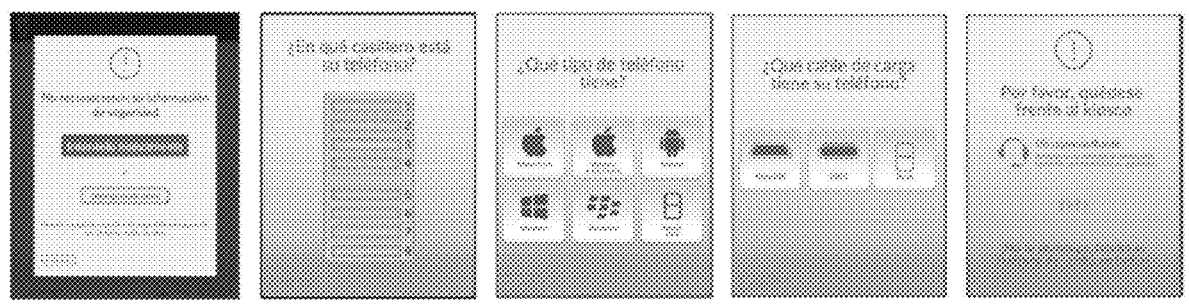
Figure 6A:
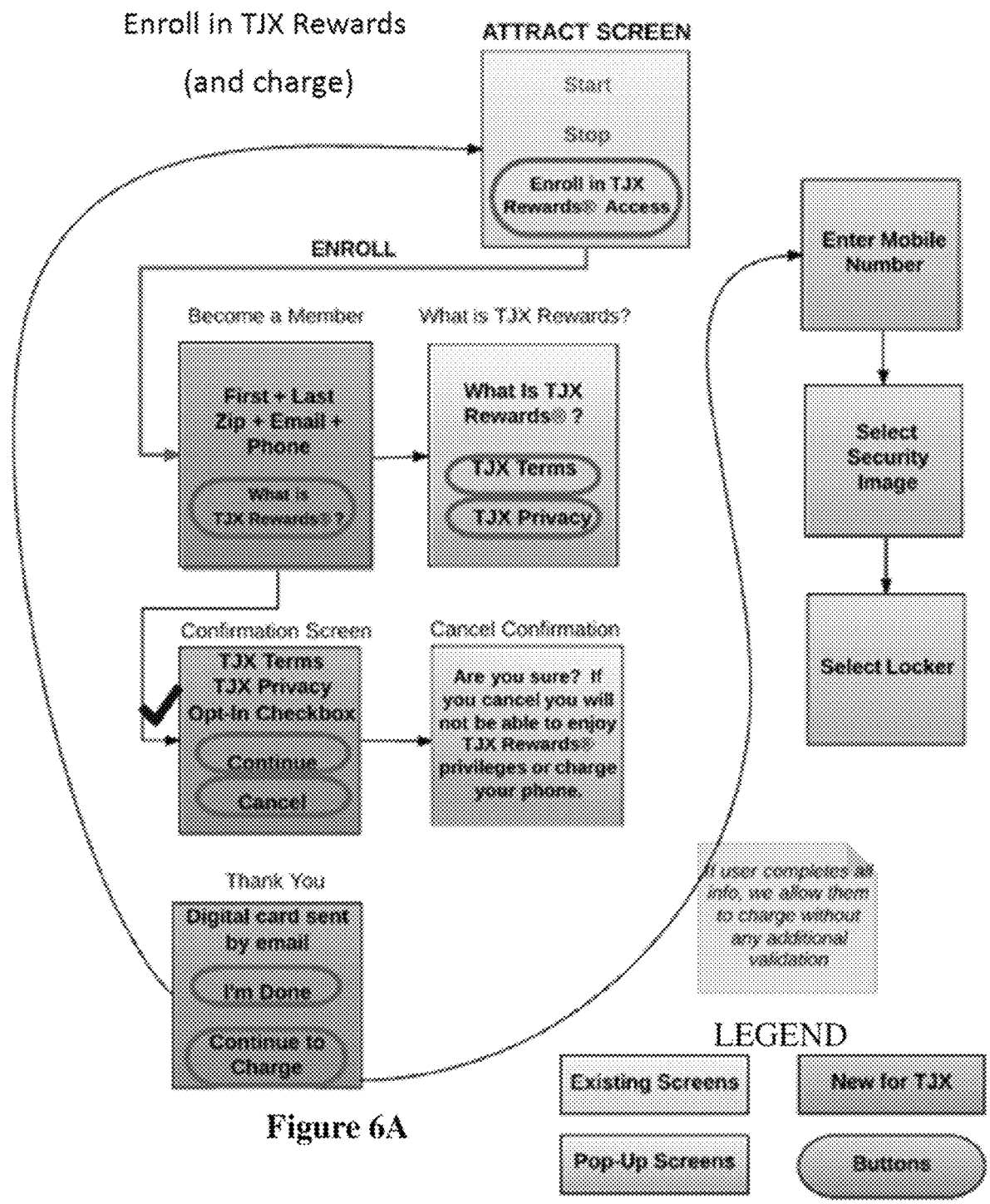
FIGS. 6A-6G illustrate loyalty program enrollment.
Figure 6B:
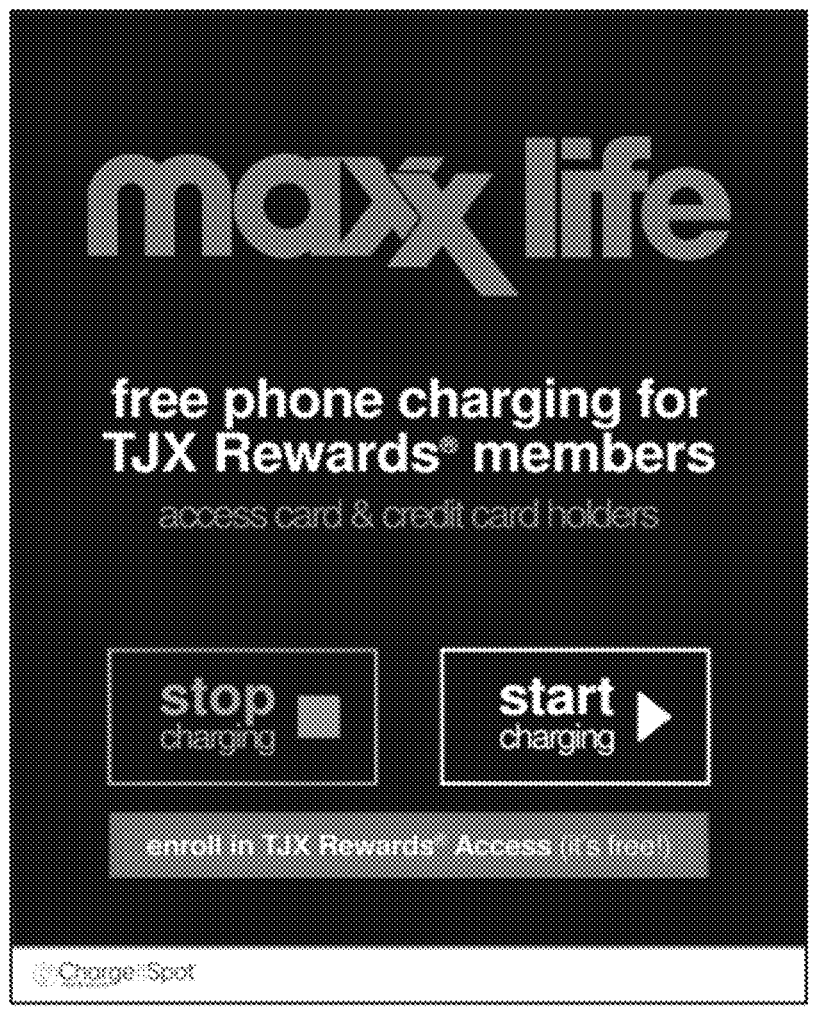
Figure 6C:
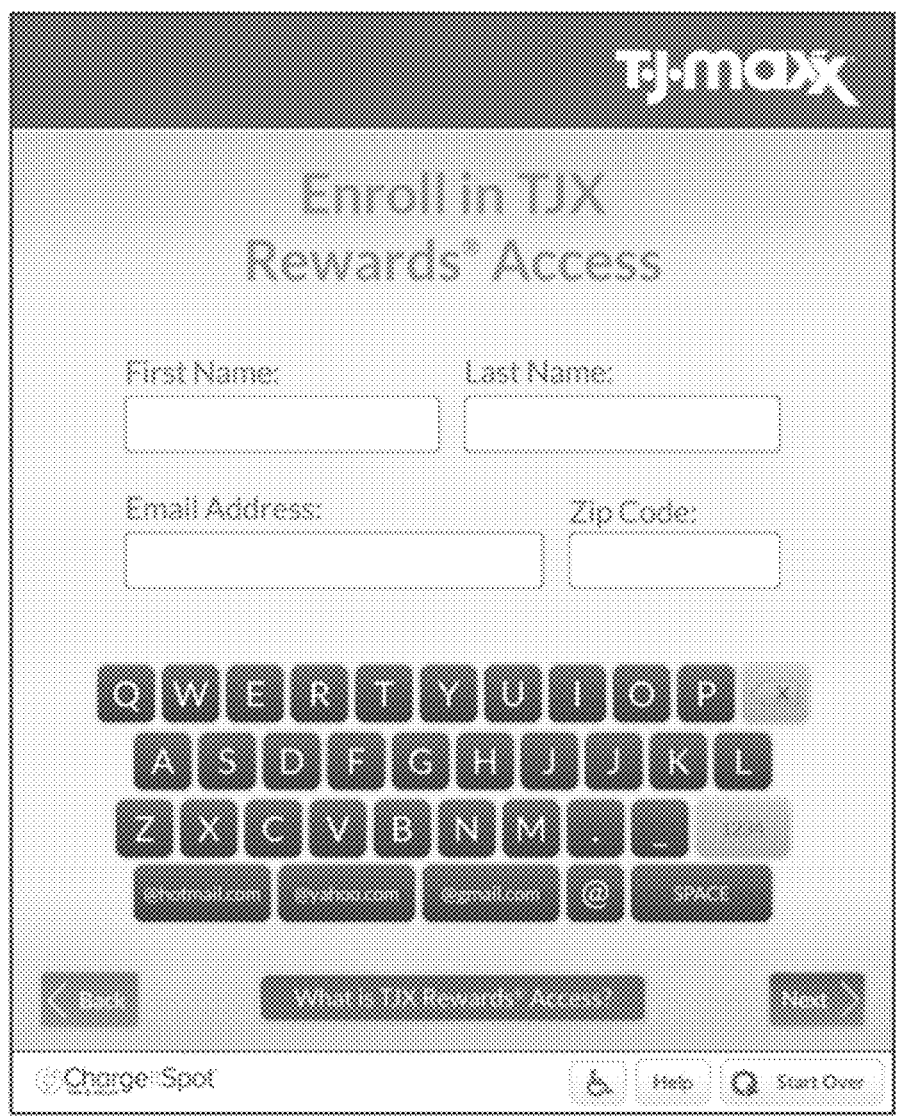
Figure 6D:
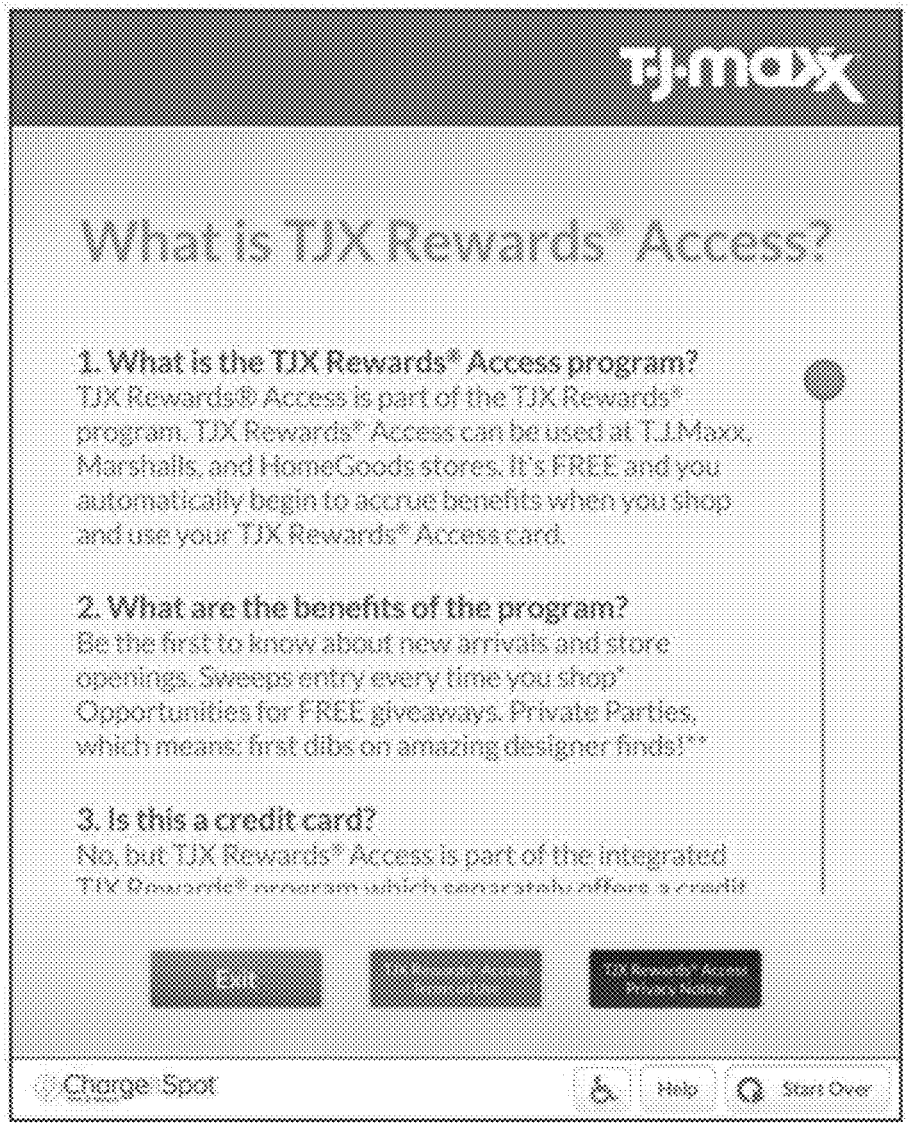
Figure 6E:
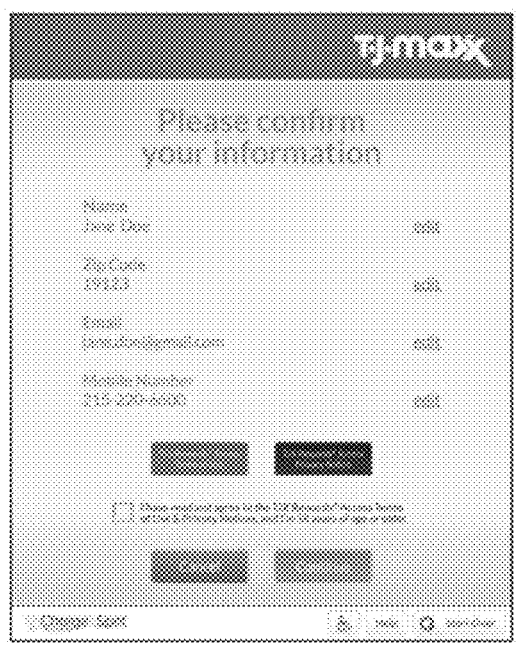
Figure 6F:
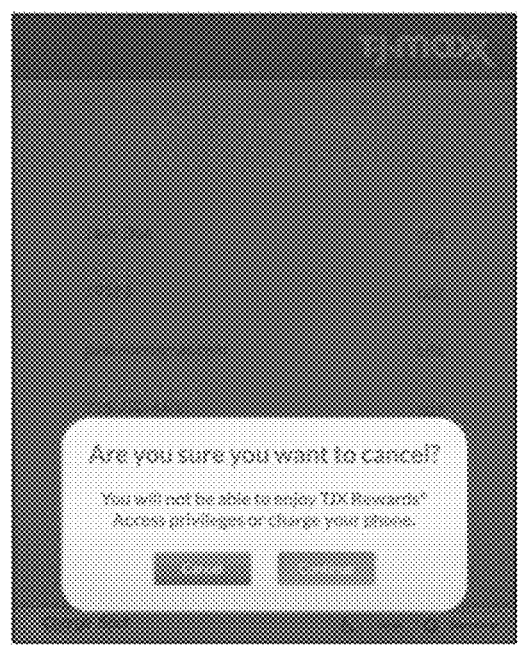
Figure 6G:
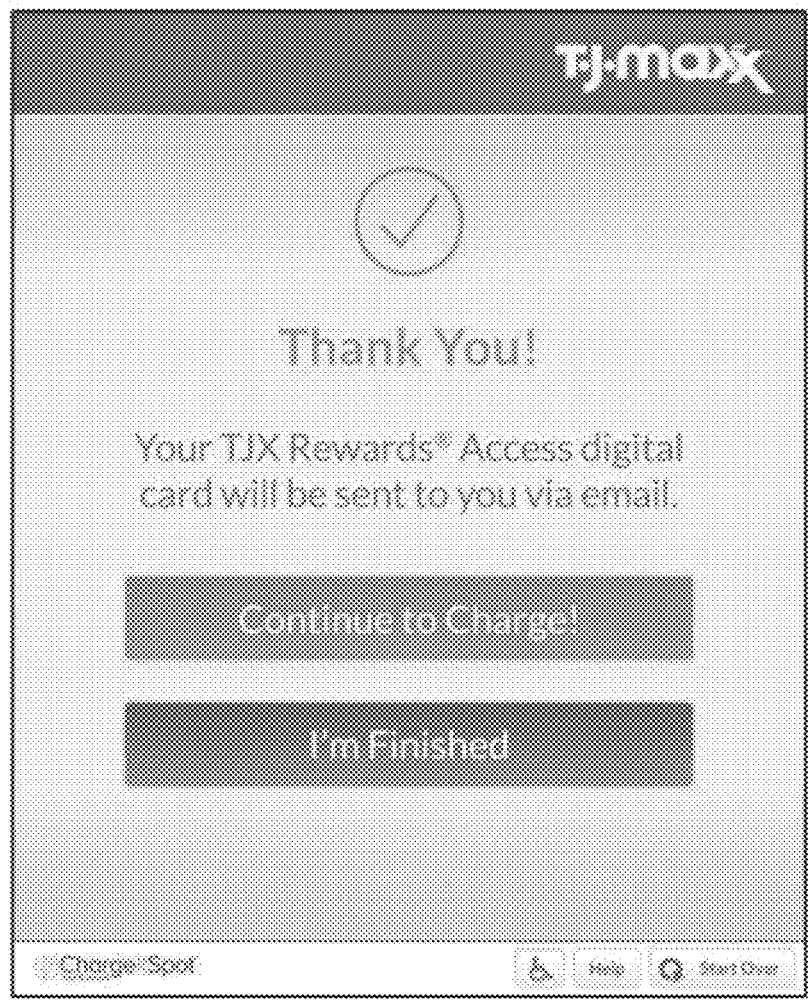
Figure 7A:
Figure 7B:
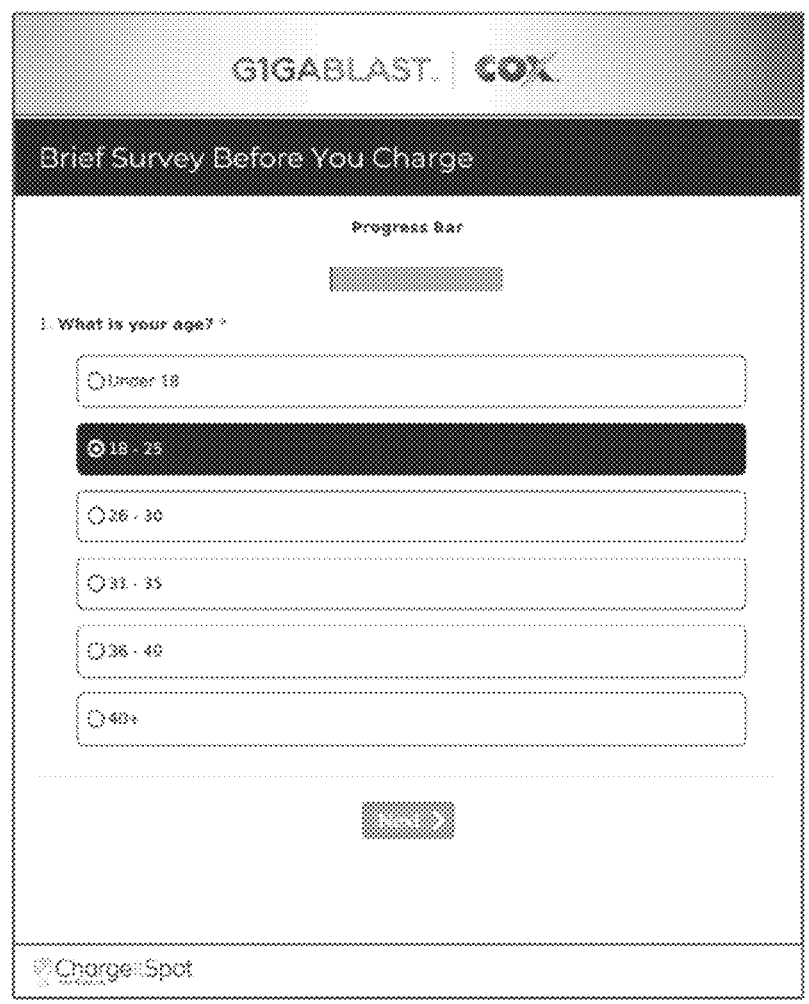
Figure 7D:
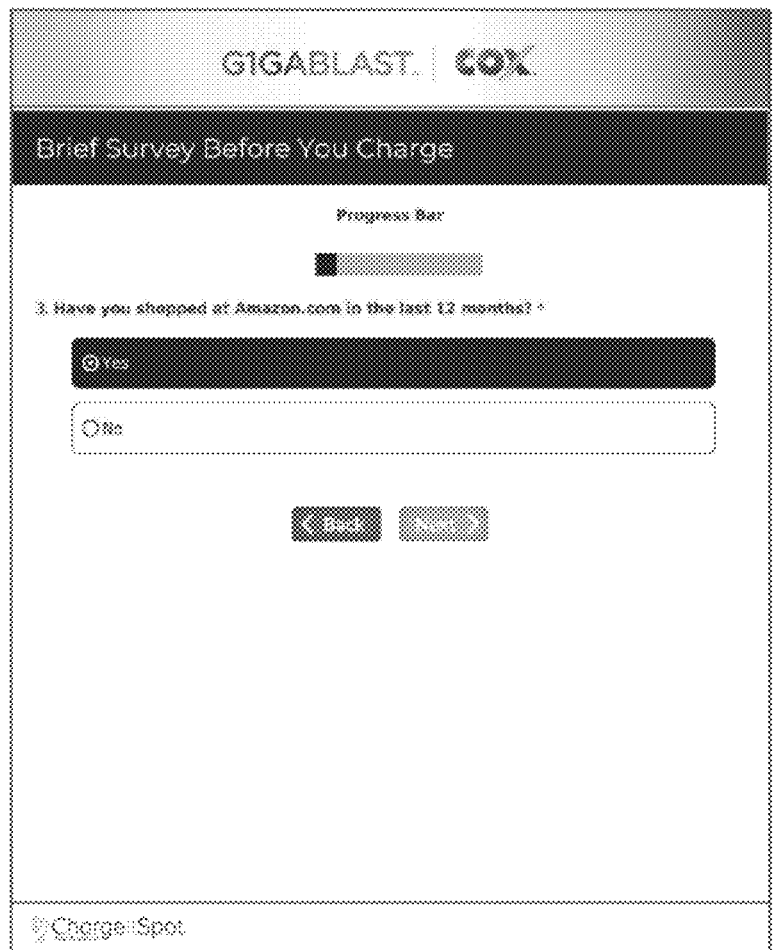
Figure 7E:
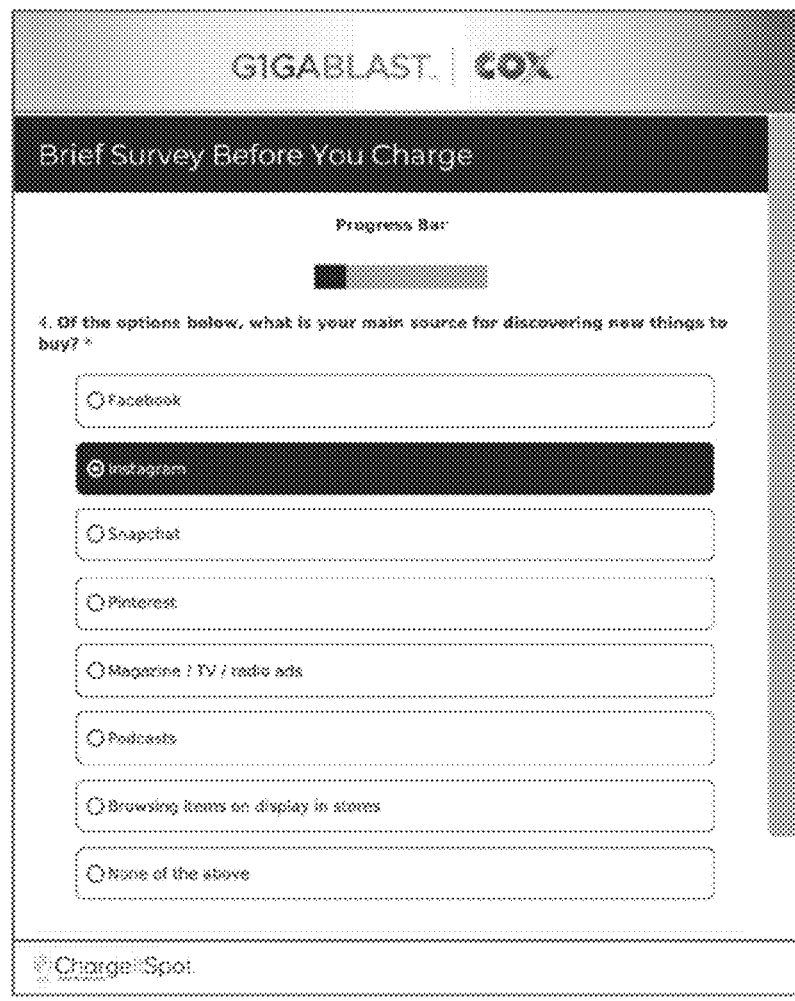
Figure 7F:
Figure 7H:
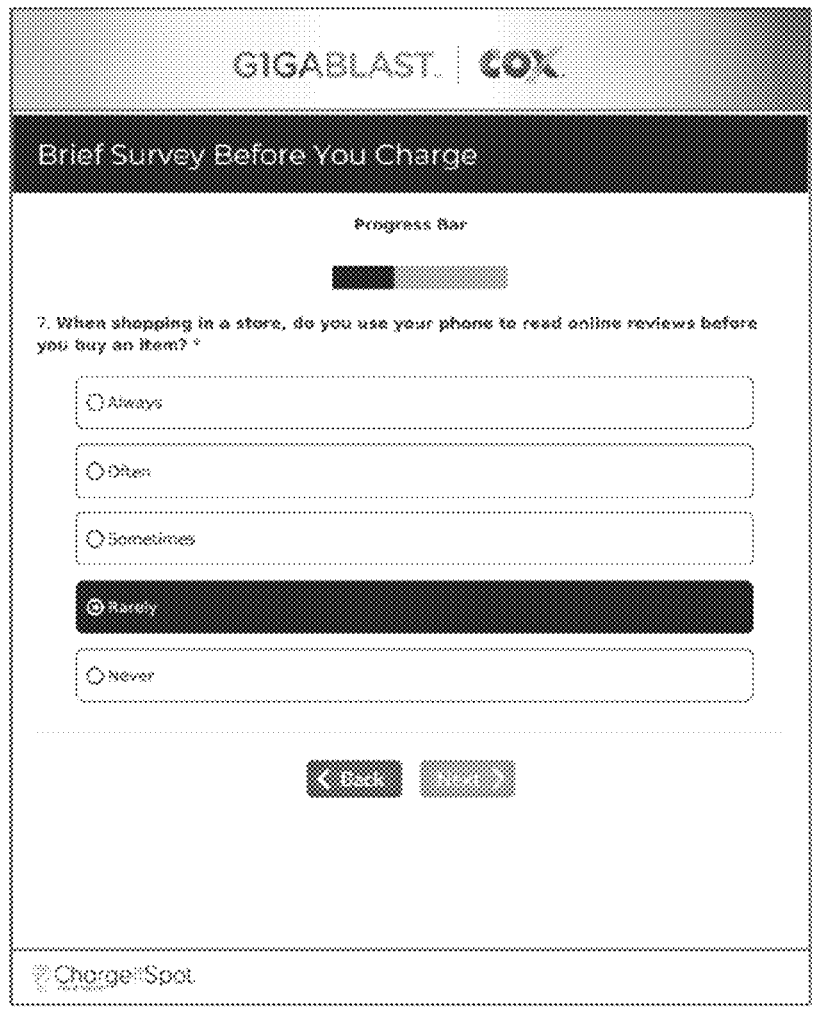
Figure 7J:
Figure 7K:
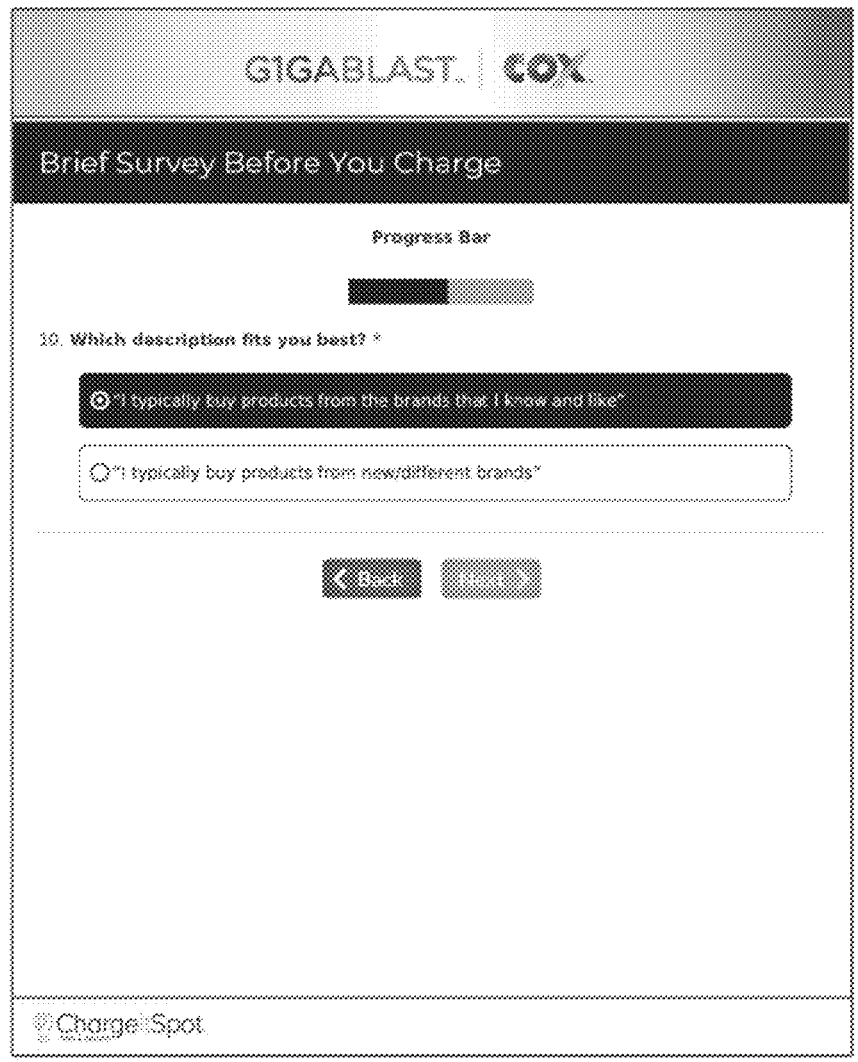
Figure 8A:
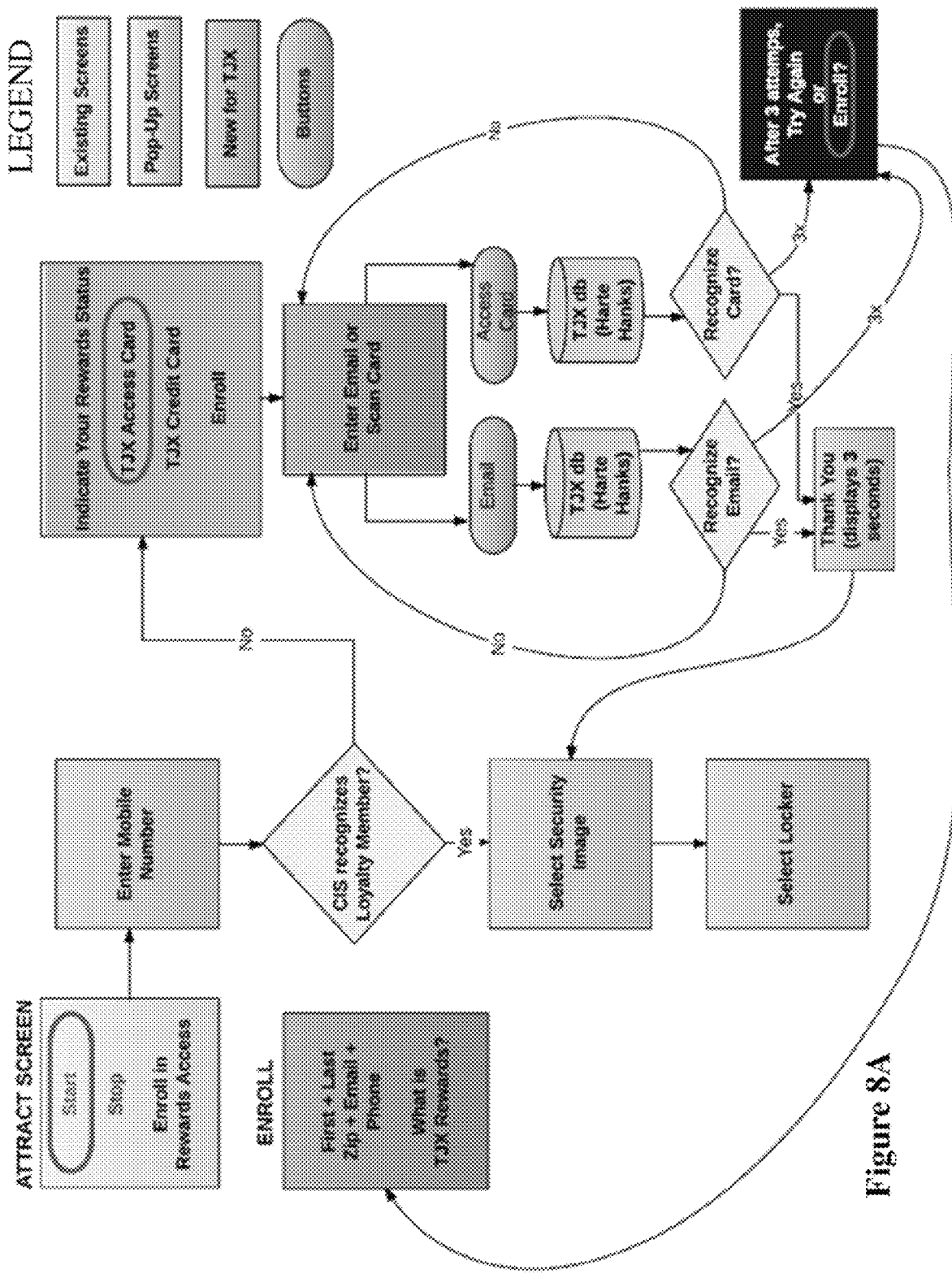
FIGS. 8A-8J illustrate an exemplary charging flow for loyalty members.
Figure 8B:
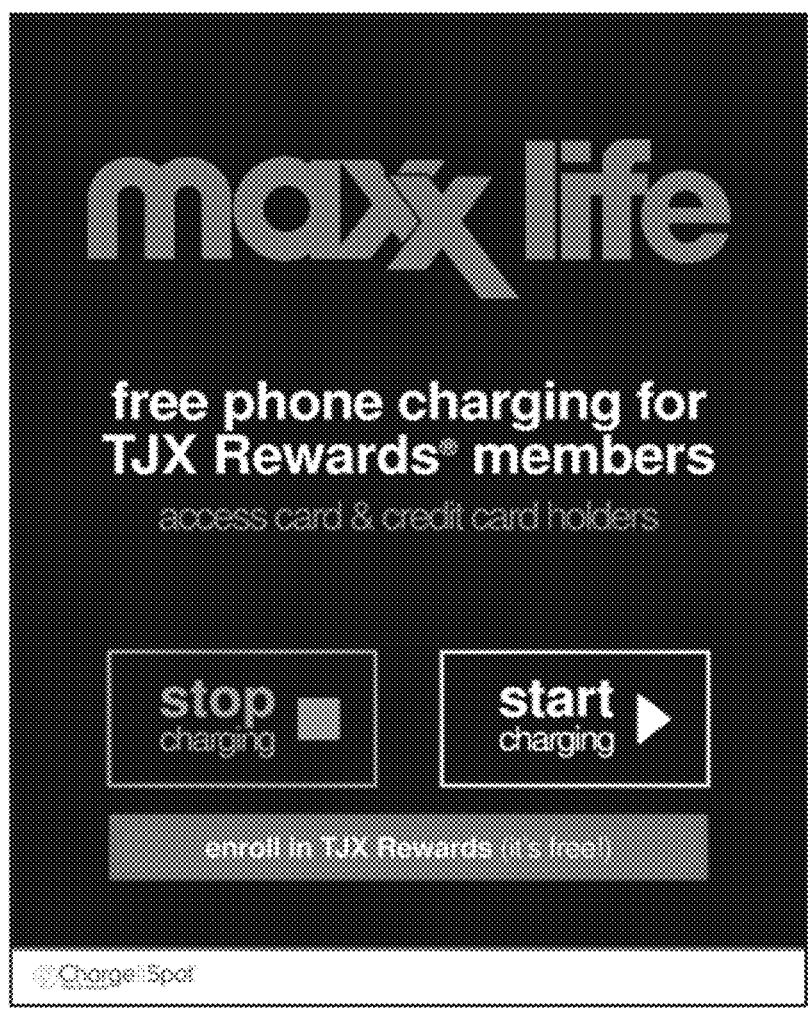
Figure 8C:
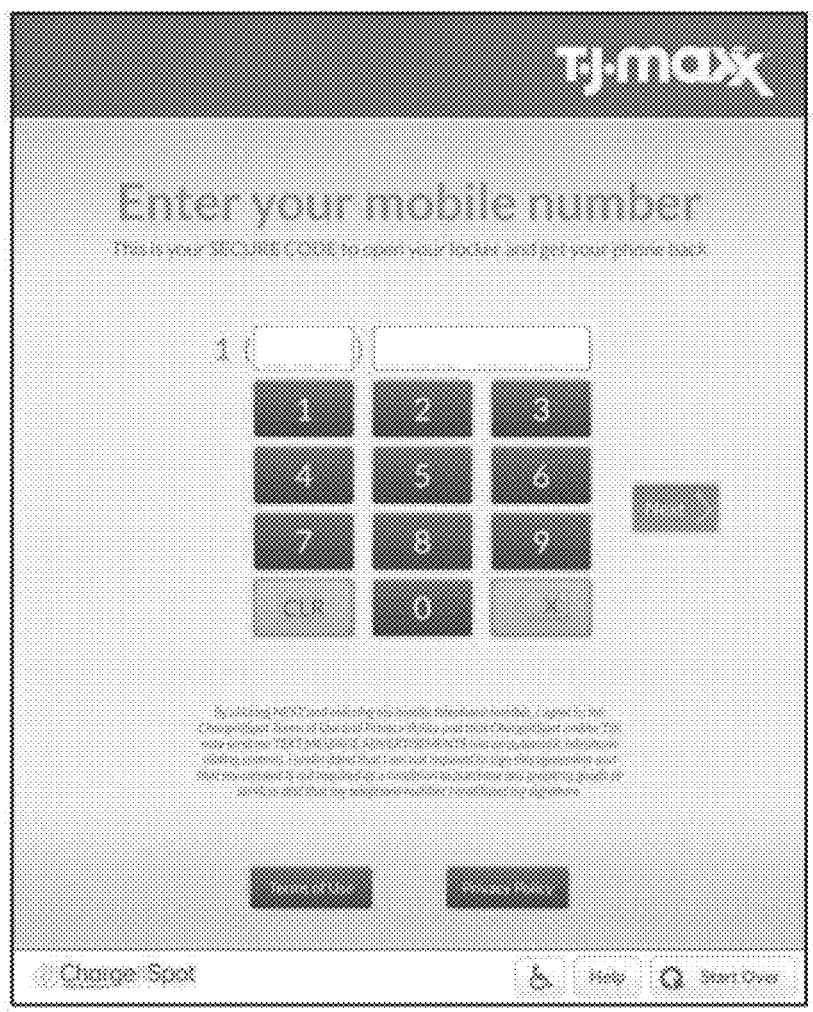
Figure 8D:
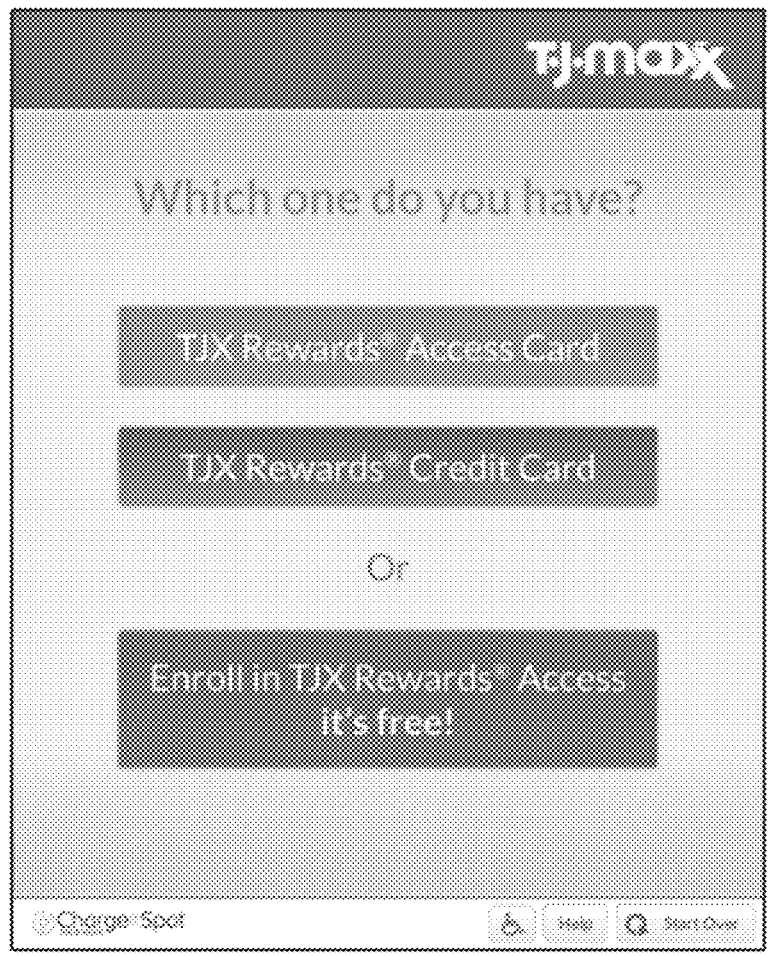
Figure 8E:
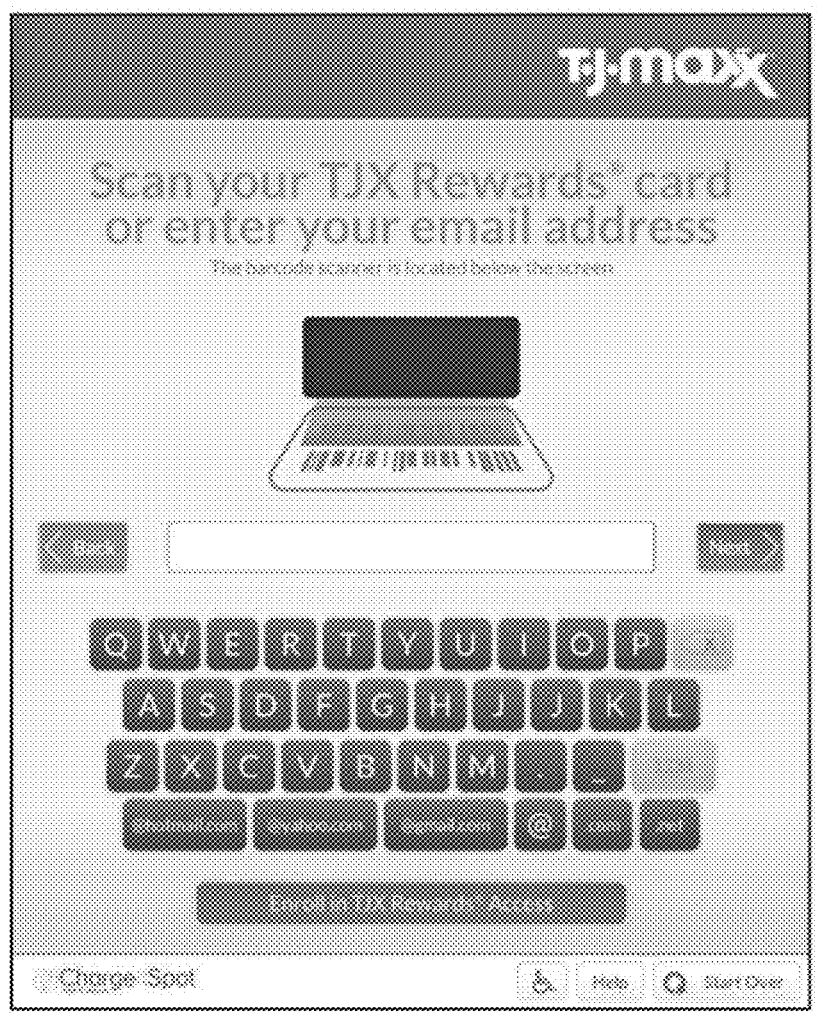
Figure 8F:
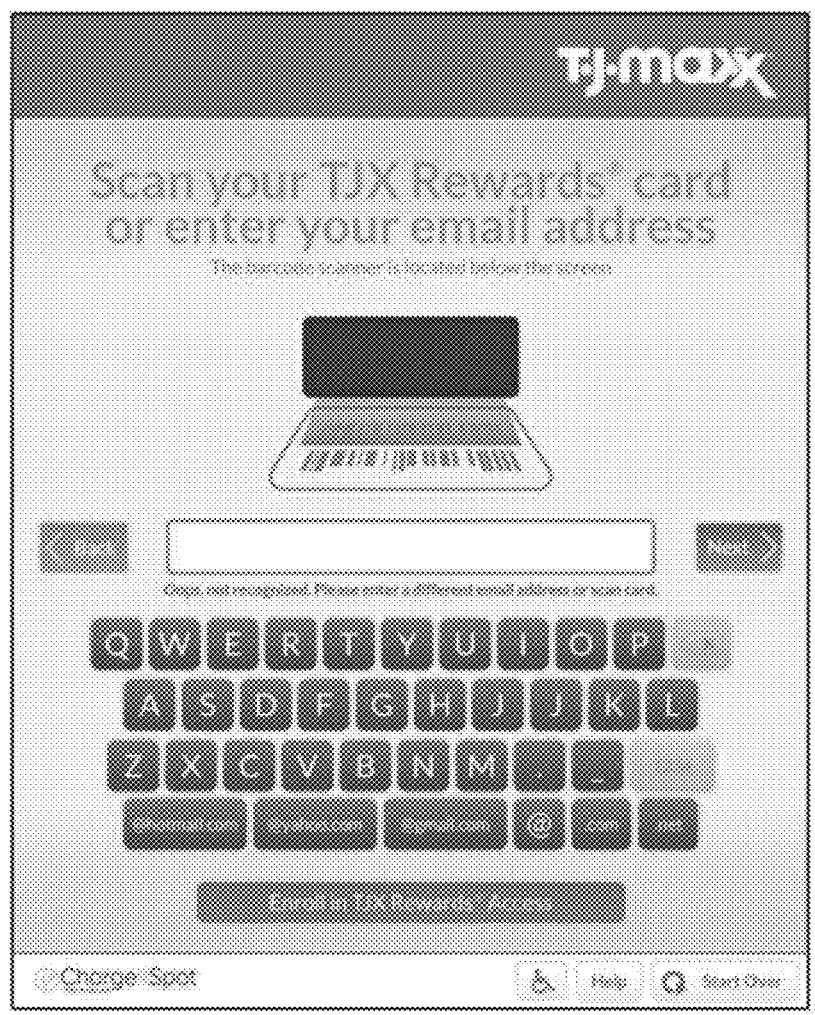
Figure 8G:
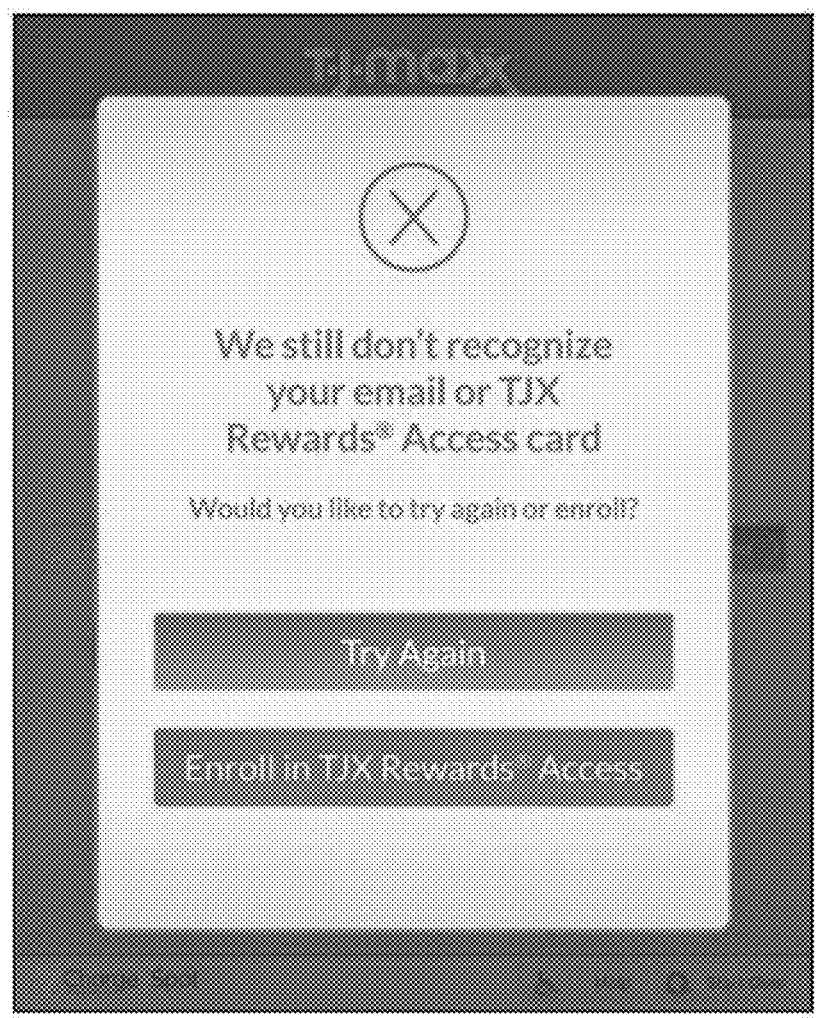
Figure 8H:
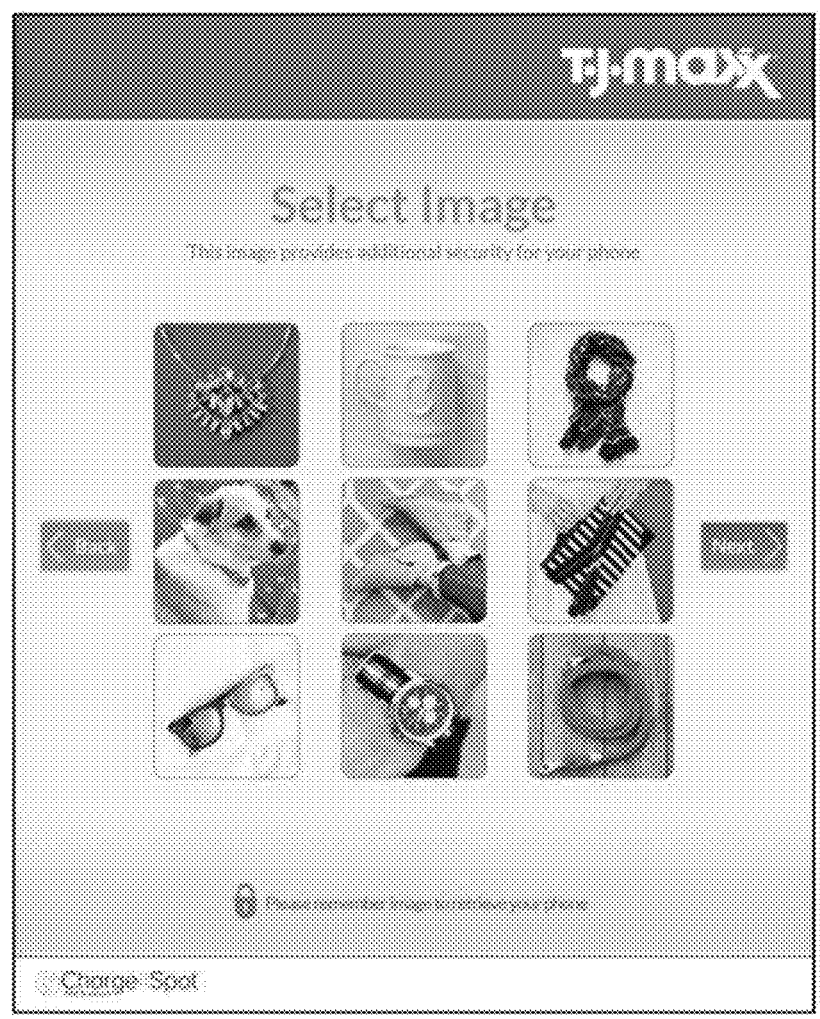
Figure 8I:
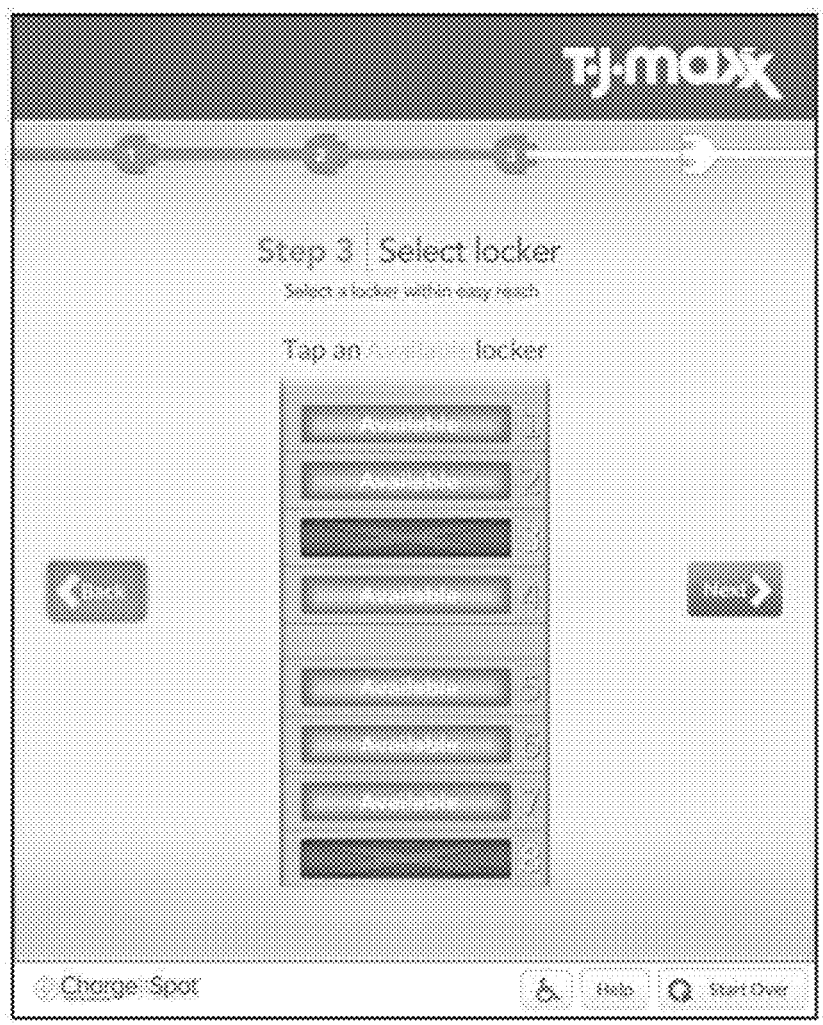
Figure 8J:
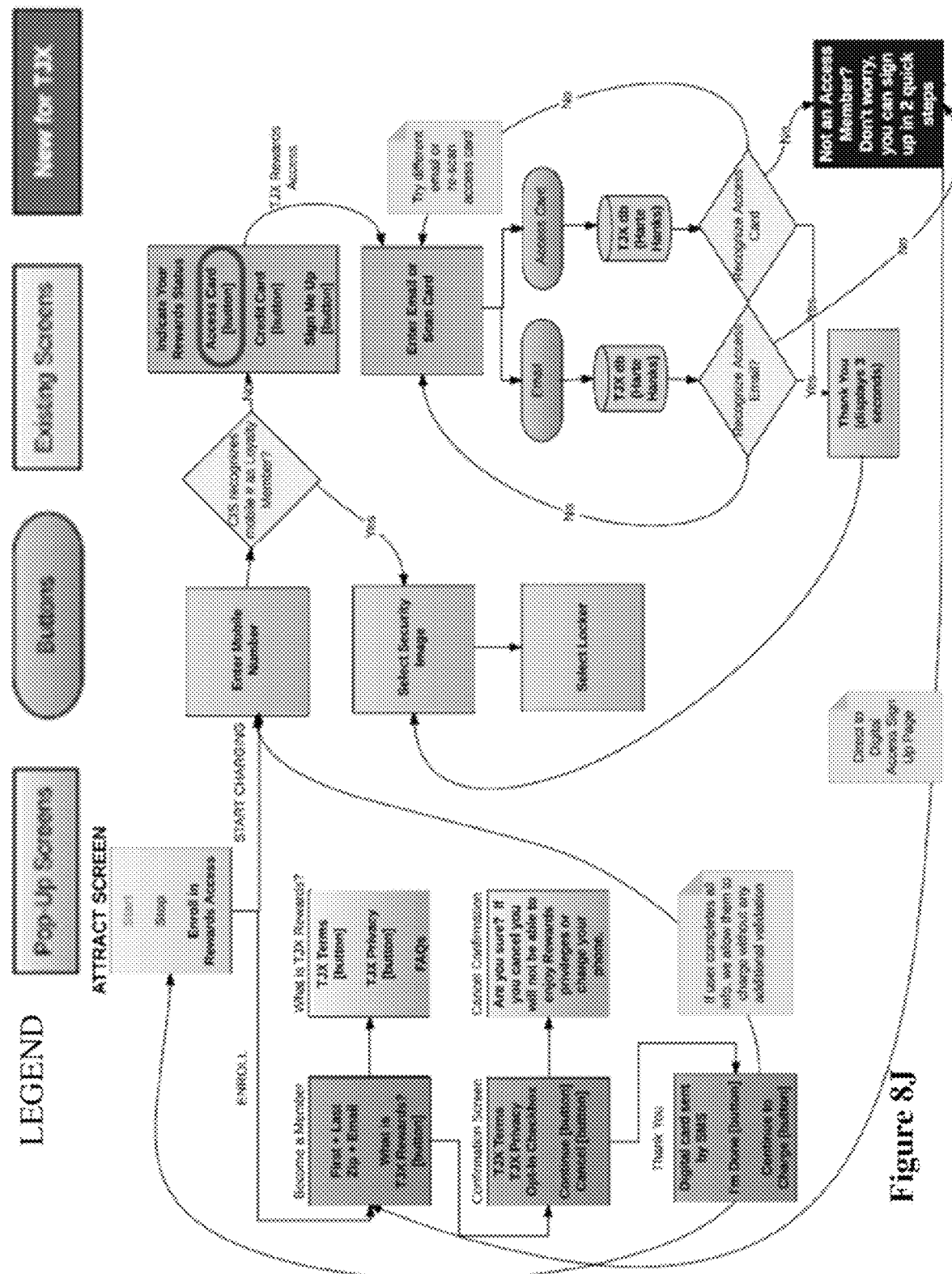

In the known art, codes or magnetic stripe readers are often used to securely identify customers. However, codes may be stolen, or magnetic stripe pre-readers used to steal magnetic strip encoding. Consequently, the security images employed in the embodiments are universal, as shown in FIGS. 5A and 5B, thus presenting no language barrier, and may also be more secure than, or when used in conjunction with, either codes or magnetic stripe readers for the reasons discussed throughout.

More particularly, the multilingual nature, provided, in part, through the disclosed security images, of the disclosed kiosk allows for automated interaction from the kiosk with the user. As such, the kiosk may communicate automatically with the user, such as using preordained scripts for certain circumstances, using any language selected by the user. For example, a user may select French as their preferred language, and if, upon attempting to obtain a charging phone, the user were to get locked out, the automated call to customer service for the lockout may occur, as indicated to the user on the touch screen, in French. The PhotoVerification review may be consistently textually, audibly or visually presented to the user in French, even in circumstances where the user's reply is provided in French, but customer service speaks only English. In such a case, the system disclosed may translate the user's French response into English upon providing that response to customer service. Likewise, the call center may provide a response to the user in English, which may be automatically translated to French upon visual and/or audible presentation to the user.

It should be noted that any suitable type of user interface may be provided. For example, the user interface may be a part of a display 408, such as the aforementioned touch screen liquid crystal display (LCD), and/or may include a display and a separate or discrete keypad 406. Moreover, it should be noted that any known methodologies of data entry may be employed, alone or in combination, including but not limited to a credit card or driver's license swipe, telephone number or other data entry to a keypad, a bar code or QR code scan, a loyalty program card or informational scan, a near field communication scan, or a biometric scan, such as a fingerprint scan, for example.

The touch screen referenced throughout may have a multiplicity of uses and communication linkages. For example, the embodiments may facilitate any type of sign-up for any type of offering via the kiosk touch screen discussed herein. For example, the touch screen protocols may be linked to an external webpage, wherein data is passed directly to the external webpage, or the touch screen protocols and algorithms may be actively associated with a partner system, such as by an API, wherein data may be captured by the touch screen and relayed to the partner. Available sign-ups may include credit card sign ups, utility company sign ups, solar panel sign ups, loyalty program sign ups as shown in FIGS. 6A-6G, and so on. Further, upon sign-up, temporary membership identifiers, such as temporary membership cards, may be provided to the user signing up, such as printing a "hard" card, or providing a virtual card via SMS or through the use of the app discussed herein.

In certain embodiments, upon entry of a telephone number, for example, the user may receive a SMS or MMS message (by way of non-limiting example) containing further information, as discussed throughout. For example, the user may receive promotional information, such as may be used upon reaching a business at which resides the charging units, and such as is discussed in detail immediately above. The user may also receive a call to action, such as to download a mobile app, go to a website, enter a contest, receive a coupon, or the like. Of course, the present invention may employ known technologies to track responses to such calls to action.

An exemplary auxiliary mechanism which may be employed for accessing and using the charging station 110, and/or for accumulating additional user information or security, is a supplemental aspect of user interface 408, such as a card reader (not shown). The card reader (shown in 406 on FIG. 4A) may accept any card identifying a particular mobile device user. The card reader may be configured to accept a user credit card, a driver's license, or a consumer card issued by a particular retailer or establishment, such as a loyalty card, by way of non-limiting example.

For example, users may choose to enroll in user loyalty programs using the disclosed embodiments, either of the kiosk provider or of other commercial entities, or users may already be members of loyalty programs prior to using a kiosk. Users may choose to enroll via the charging kiosk utilizing a graphical user interface 408 provided at the kiosk, or may be enrolled in third party or affiliated programs that provide cards, pins, QR codes, or the like, to indicate loyalty status. The loyalty program enrollment information may be stored in conjunction with the user information stored at the administration server, or the like, or may be uploaded or otherwise made available from a third party for association, such as in a database, with a charging device number at the kiosk (noting that the kiosk may include the aforementioned auxiliary reader for loyalty cards, loyalty pins or QR codes, or the like). Further, via the graphical user interface, a user of the system may participate in completing surveys or polls, which may or may not relate to the loyalty program. For example, users may be polled, such as by a casino, as to, if they were to win a prize from a slot machine, what prize would they like to win.

In certain embodiments, and such in order to use the free charging service, the user may be asked to complete one or more surveys on the touchscreen. For example, a survey may be presented to the user on behalf of a single or multiple sponsors/clients/kiosk providers who are paying to receive customer information in exchange for value, such as in exchange for a location providing charging kiosk access to its customer base. By way of nonlimiting example, the location or venue may thereby have access to the charging station at no charge or reduced charge.

In preferred embodiments, before the start of the charging process, such as prior to the automated opening of the door to a charging locker, the user may be asked to take a survey, such as is shown in FIGS. 7A-7L, in order to obtain the charging for free, or for some predetermined discounted amount. Surveys may be provided in a variety of formats, and may be provided as "integrated" surveys, wherein the presentation of the survey is an aspect of the artificial intelligence/adjustable logic algorithms integrated with the charging process; or "unintegrated" surveys, wherein the charging station calls out to the cloud, such as to third party domain, in order to obtain the survey or the survey logic. In short, the survey logic may include a steady state flow of a predetermined series of questions, or may vary the questions, question content, question type, or the like, based on a user's input or responses to questions. Further, the integrated nature of the survey logic may vary based on the responses, such as wherein, if a user answer is yes to a given question, the survey converts from a non-integrated remote logic to a local logic.

Further, not only may the integration level of the survey algorithm vary, but the types of question may vary, such as between multiple-choice, free-form text, rating scale (e.g., 1-10), conditional logic (e.g., disqualify respondents under a certain age, or having other particular characteristics), visual versus text (i.e., selection of an image or images), and so on. Of note, surveys may be steady state, such as a series of multiple-choice questions, or may, preferably be highly variable, such as in order to maintain user interest across multiple charging events. Correspondingly, surveys, provided through the use of the disclosed kiosk and kiosk system may likewise be multilingual.

In an exemplary embodiment and by way of non-limiting example, surveys may be implemented by institution of an API to a platform that delivers surveys on line and or to mobile apps. The API may be a dedicated, API, such as for a particular platform, or may be a multi-platform API which offers alternative survey platforms. Thereafter, when the user begins the charging process, the user may be presented with a screen that informs the user that she will be asked to take a survey in order to charge her phone for free, and the user may be asked to affirmatively respond in order to continue the charging process. If the user agrees, such as by pressing continue, she is then prompted to enter the mobile phone number, and/or other information, such as an email address and selection of a security image. As discussed herein, the charging kiosk may then call out to a nonintegrated survey URL and present the survey to the user prior to allowing the user to select a charging locker door to open.

Of note, surveys may present any number or type or format of questions. Surveys may be sponsored or unsponsored, such as wherein surveys are sponsored by third-party research companies to obtain research on topics ranging from food delivery to health concerns to movie preferences and so on. In preferred embodiments, the user must complete the survey before selecting a charging locker door. If the user abandons the survey, the screen may timeout and/or otherwise return to a main screen. If the same user returns in an attempt to charge a mobile device, such as may be indicated by entry of a phone number, a survey previously presented may renew at the point where the user left off. Similarly, in order to maintain user interest the same survey may not be presented to a user multiple times, such as may be tracked using a mobile phone number or other identifier, such as a loyalty card, or the like.

A survey may be optional or mandatory. Moreover, not only may the survey be presented in real time at the charging kiosk, but further, a survey may be presented to the user via a follow-up link, such as may be presented in an SMS, email, or the like. As referenced, survey logic may be local and/or integrated, and/or remote or unintegrated. As such, survey response data may be housed in an integrated system, or at a third-party system. As such, data may be delivered to a third party, a survey requester, or any other entity, and may be delivered directly, such as by an API integration, or may be housed/stored in an integrated manner and extracted by a client. Surveys may be employed to obtain information of interest from third parties, such as research companies, but may also be delivered by the charging service provider in order to gain user information, such as customer demographics. Survey results may be gathered and/or housed in substantially real time, such as to allow response or follow-up to occur on the site, such as manually by a clipboard operator.

In a survey, the user may be asked a series of questions (up to 20, by way of non-limiting example) in exchange for having access to a free phone charge. The survey may be configurable, optional or mandatory in the system. For example, users may have the option to take the survey after they lock up their phone (and/or close the door), or users may be presented the survey when they come back to get their phone after they enter their mobile number and security credentials. Moreover, there may or may not be a limit on the number of times that the same user can take a specific survey, for example. Yet further, multiple surveys may be available on the same kiosk, and may or may not be offered to some or the same users on subsequent visits. That is, some users, or the same user on a subsequent visit, may receive different surveys or no survey at all. It will also be appreciated by the skilled artisan that the user would always have the ability to opt-out of the survey by choosing not to charge their phone.

In a manner similar to the presentation of surveys, the charging kiosk may be used to recruit prospective survey participants. For example, a charging user may be presented with a screen prior to beginning the charging process asking the user if she would be interested in taking a future survey, such as with or without being paid to do so. If the user agrees, the user's phone number and/or email may be passed to third party survey company such that the survey company may follow up in the future to enroll the user as a potential survey participant. Needless to say, and as is the case with the surveys discussed throughout, users may be excluded from participation based on any number of factors, such as age or demographics. Moreover, the empaneling of survey participants may be in relation to a single survey over a given time period, a single or multiple surveys over an indefinite time period, or multiple surveys over a particular time period, by way of nonlimiting example.

Moreover, and to the extent data is obtained by an integrated survey system within the charging system, logic, customer profiles and demographics may be relationally obtained by the systems disclosed herein. Thereafter, this integrated database, such as the data warehouse and database(s) 302 discussed throughout, may be used to select participants pursuant to request from third party survey providers. For example, an integrated database of customer demographic information allows for prequalification of participants for a survey, prioritization of specific questions to particular groups of people (e.g., males, aged 30 to 45), the tying of device types to survey participation, such as to allow brands or marketers to target messaging that may or may not be optimized by device, type, and/or the linking of survey results to a location or location type (i.e., a mall, a specialty retailer, and so on).

Accordingly, survey data and/or additional user data, such as kiosk-entered data, app-profile data, and so on, may be appended to kiosk provider databases and/or clients'/sponsors' databases, such as to create a richer customer profile and/or to accumulate market research. Accordingly, survey questions may include demographic information such as gender, race, income level and the like, and/or may also include lifestyle preferences such as hobbies, favorite travel destinations, shopping locations and the like.

This enriched profile and/or enhanced market research may enhance the adoption of kiosks by location providers. For example, a mall customer presently paying a monthly fee for 1 kiosk may expand to 4 kiosks because the additional kiosk costs are partially or fully paid for by the survey provider.

In preferred embodiments, card reading or bar code scanning associated with the kiosk may be for identification and/or data accumulation purposes, and may or may not be for the purposes of charging the user a fee for usage of the charging station. For example, the card reader (as referenced above) may comprise a magnetic card reader, which, upon swiping the user's card on the reader may read the information contained on a magnetic stripe located on the user's card, enabling the charging station to gather and process user identification information, such as for secure access by the user to his device after charging, and/or to accumulate information about the user, such as shopping habits of the user, which, as mentioned above, may be stored by user database 302.

Furthermore, data gained through the use of the method and system of the present invention may be associated with the additional or auxiliary data, such as from the aforementioned card reader. The card reader may allow for a user to use a free or discounted pass, a frequent users' card, a loyalty card associated with a kiosk sponsor, or the like. Accordingly, a large variety of data may be captured and associated with the auxiliary informational items, such as the cell phone number of the user, etc. Such data may include durations at particular locations, such as restaurants or retail, typical charging start times, typical charging end times, most frequently used kiosks, most frequently used lockers, percent capacity of usage, frequently used charging types and correspondingly phone types, or the like. By way of example, the control board discussed herein may receive information about which charging cable is in use in each locker, and may thereby receive information about what type of phone is charging or what type of phone is associated with a particular phone number. This may allow, such as in conjunction with loyalty information of, for example, a casino loyalty program, for the inference of demographic or social information, such as in relation to a particular retail establishment, or the like.

Figure 4C:
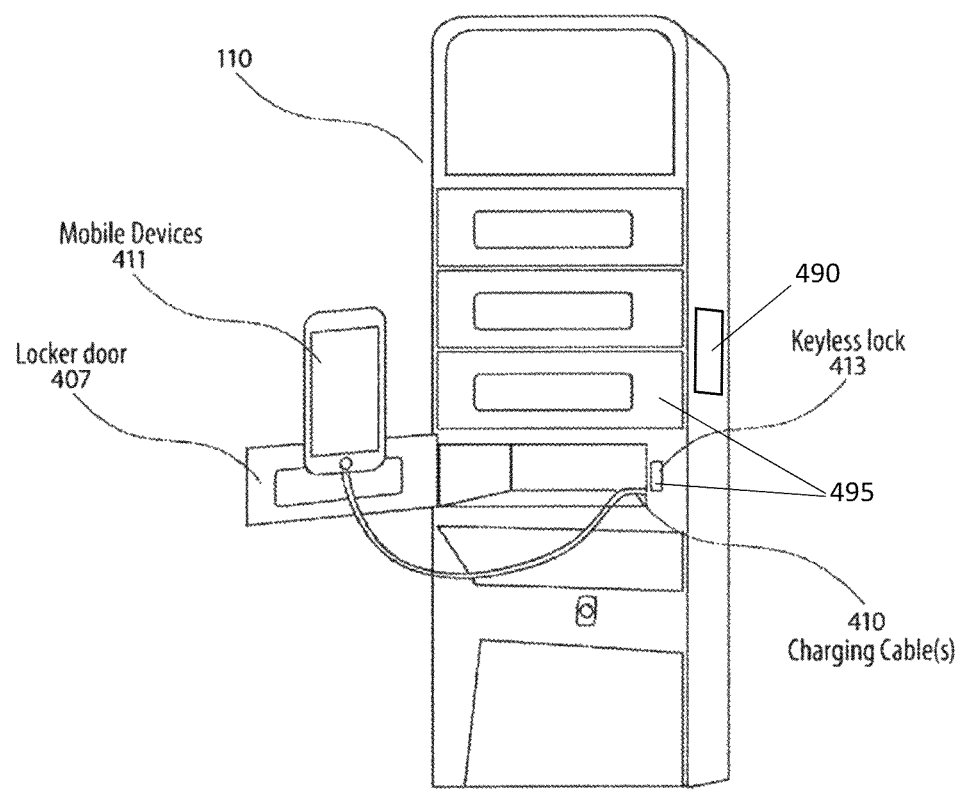
FIG. 4C illustrates an example of an open locker of a mobile device charging station according to embodiments of the present invention.

FIG. 4C illustrates an example of an open locker of the charging station 110 of an embodiment of the present invention. As shown, multiple interfaces and/or universal interfaces 410 may be located inside each locker 407 provided for recharging a given mobile device 411. Each interface 410 may be a unique type of charging interface, may be dedicated for a particular make or model of mobile device, or may be a universal charging interface.

Figure 4D:
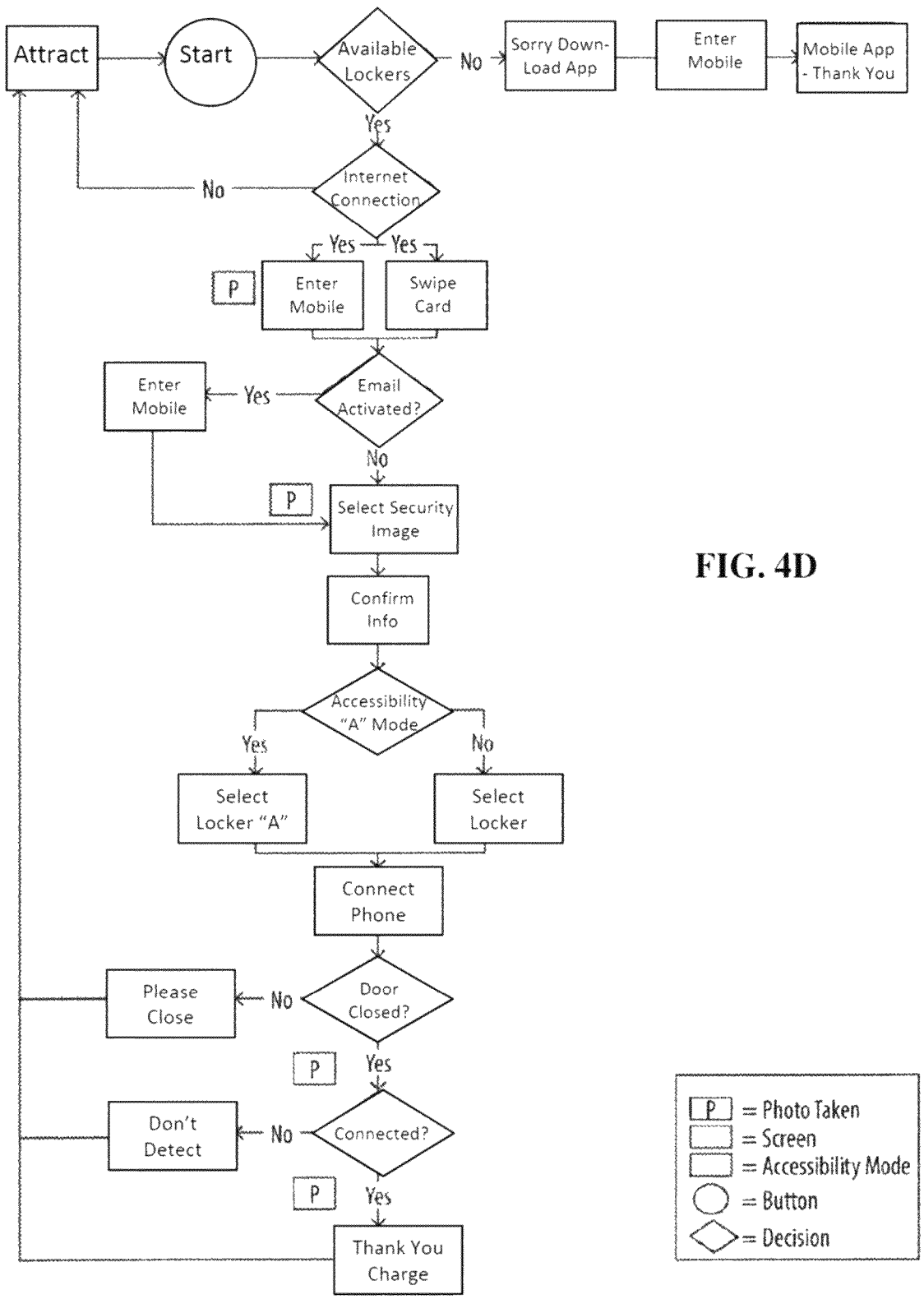
FIGS. 4D-4F are flow diagrams illustrating the use of an exemplary charging station.
Figure 4E:
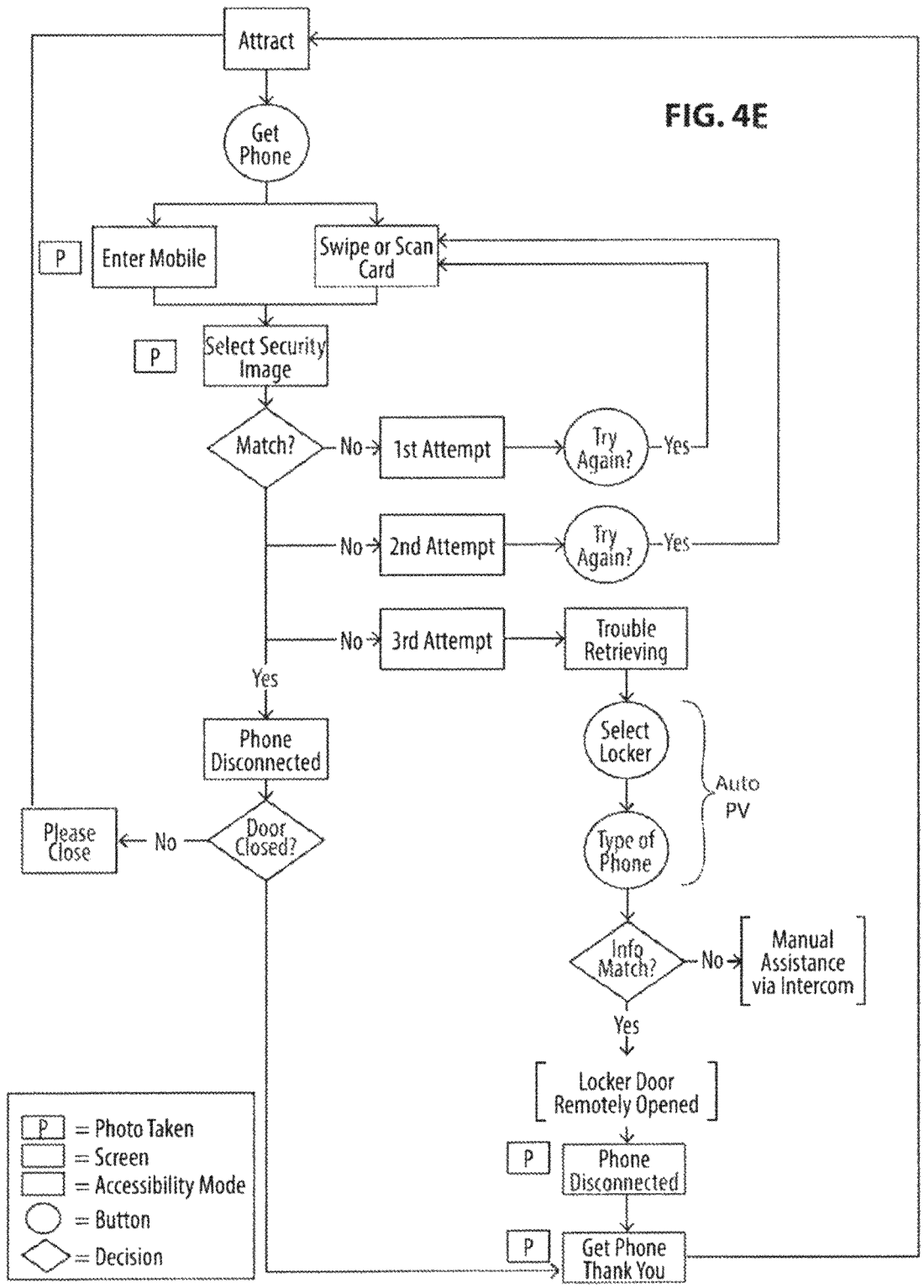

In at least one embodiment, in reference to FIGS. 4D and 4E, there is provided a PhotoVerification process of a user of the system (i.e. kiosk). As used herein, PhotoVerification is a process whereby a customer photo or similar biometric (such as facial recognition, fingerprint, retinal scan, voice recognition, etc.) is taken at the inception of a charging session, and wherein, when a user attempts to retrieve the charged device, the photo/biometric is compared, such as automatically or manually, to the biometric at inception in order to decide whether to release the charged device.

If a user's initial or subsequent security credentials are incorrect (i.e. "First Attempt Incorrect," "Second Attempt Incorrect", etc.), then the kiosk may automatically or manually "escalate" the retrieval security. Needless to say, the user may be precluded from trying an indefinite number of times to enter security credentials, such as wherein, after X number of tries (such as 3 tries), the system is "locked" and each time the user enters the same mobile number (or loyalty number, etc.), the screen may automatically further escalate, such as to a PhotoVerification process.

Further, for example, the kiosk may use a series of photos and/or a cellular, landline, and/or voice over IP conversation directly with the user (such as by a customer service representative) to manually and/or via facial recognition software verify the user's identity ("Please Wait, We Are Using Surveillance Records To Verify Your Identity"). If a match is determined to be made ("Match Verified?"), either via manual or automated check, then the user may receive a success screen and the process continues to FIG. 4F. If a match is not made, then the process may proceed to an Offline process, a more extensive customer service interaction, or locked state, until a successful verification (photo or otherwise) or a manual unlock process is performed. If the customer service representative does not respond within a specified period of time, the PhotoVerification will timeout, thereby making the kiosk available for use by another customer.

Figure 4F:
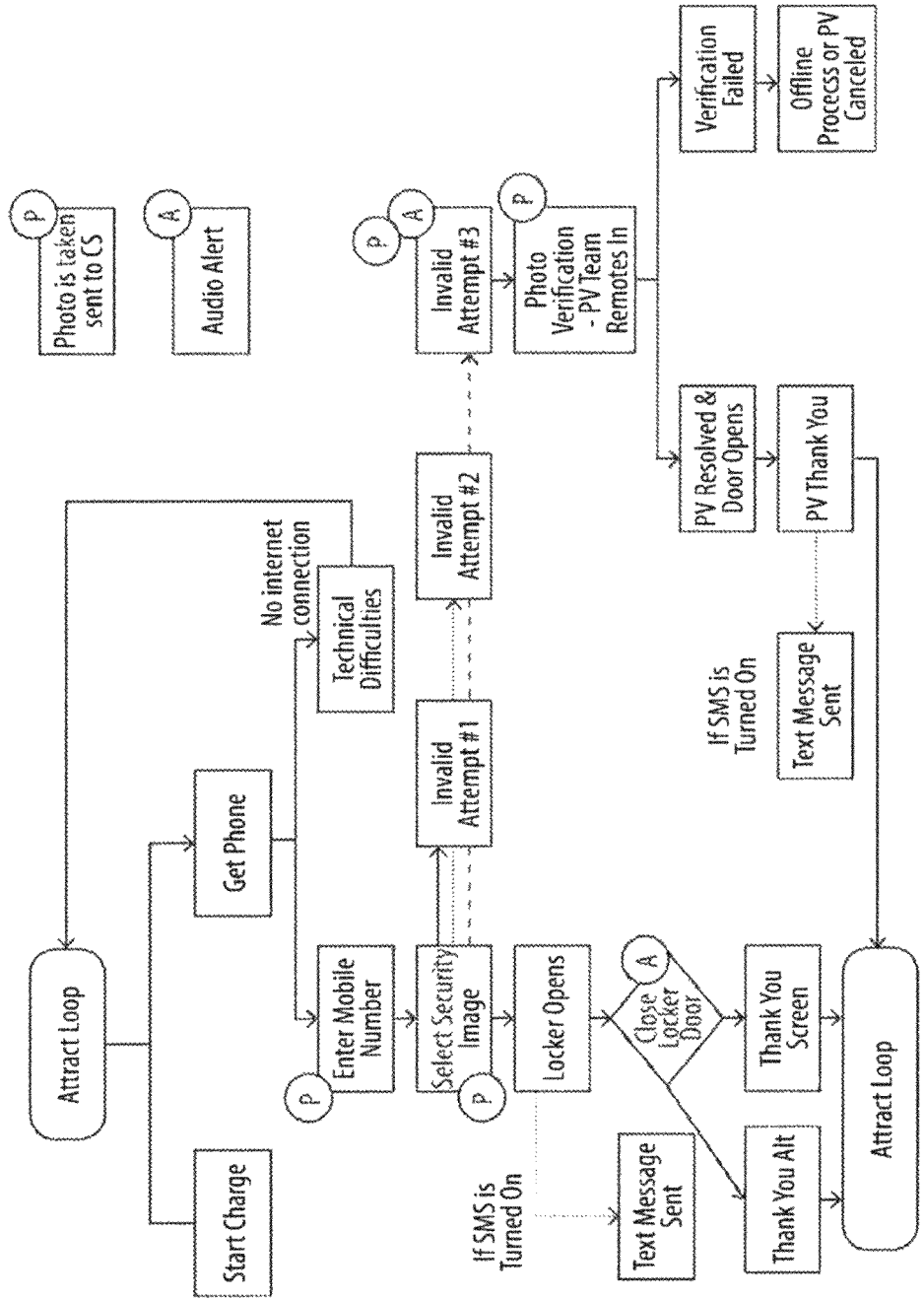

FIG. 4F is a flow diagram illustrating combinations of the foregoing aspects. In short, the flow diagram illustrates various methodologies whereby a charged device may be obtained by the owner of the device, including the use of a PhotoVerification in the event of a lockout from a locker.

The kiosk may include various other hardware and/or software and/or firmware under the control of the kiosk control board referenced herein, and which may be employed in conjunction with the PhotoVerification process. By way of example, the kiosk may include the user interaction screen discussed herein, such as a touch screen akin to those employed at automated teller machines, as well as a camera proximate to, such as above, the user interaction screen, under the control of a control board. Accordingly, a user's first interaction with the kiosk may be with the screen while standing in front of the camera, thereby the camera may take a series of images, video, audio, or the like, of the user placing the phone into a locker and/or interacting with the screen.

Confirmation of user identity, for example, may occur via remote access to the server, such as with the kiosk initiating all requests to the server. In short, this provides a security feature in that the server cannot push information (such as new configurations, software updates, restart commands, etc.) to the kiosk, but rather the kiosk periodically "pings" the server for information.

The foregoing may be due to a master-slave relationship between the server and kiosk. That is, the kiosk may be programmed to ONLY be able to communicate with one master, i.e., the server. This security precaution prevents a hack that tunnels into the kiosk from another source, such that the kiosk may be disabled to communicate or accept any commands. This is further buttressed in exemplary embodiments in which kiosks cannot "talk" to each other.

Thus, confirmation may be available at a later point, such as via the camera, that the same user is attempting to retrieve the phone as had initially placed the phone into the locker. In this manner, by way of non-limiting example, a user who has been locked out from retrieving his or her phone may be able to readily confirm with customer service that he or she should be able to retrieve the phone. Upon such confirmation using, at least in part, the camera, a remote customer service representative may, for example, open a locker, ask security questions, or the like.

This security may be enhanced by any known method. For example, security may be enhanced by allowing a user to pick, such as on the aforementioned screen, a secondary security image that the user may have to reselect as a security measure, or security measures may include PIN codes or the like in association with the user having entered his or her phone number in order to access the kiosk in the first instance. Moreover, the use of security images may additionally provide a branding or advertising opportunity, such as wherein various security images are provided to a user to select from that are representative of endorsers of the brand with which the kiosk is branded.

In at least some exemplary embodiments, the exemplary disclosed system for verifying the identity of a user may include a door that selectively opens to allow access to a cavity and selectively closes to block access to the cavity; a lock configured to selectively lock and unlock the door when the door is closed; a camera configured to image a user area adjacent to the door; computing memory having associated therewith code; and a processor communicatively coupled with the computing memory, configured to execute the code and to control the camera to record a first image data of the user area at a first time; store the first image data; control the camera to record a second image data of the user area at a second time; and selectively unlock the door based on comparing the second image data to the first image data. Comparing the second image data to the first image data may include transmitting the first and second image data to a remotely-located device and subsequently receiving an operator data from the remotely-located device. Transmitting the first and second image data to the remotely-located device may occur after the user in the user area inputs incorrect input data. The door may be unlocked when the first image data defines a first set of images of the user in the user area at the first time and the second image data defines a second set of images of the user in the user area at the second time. The door may be maintained in a locked state when the first image data defines a first set of images of the user in the user area at the first time and the second image data defines a second set of images of a different user in the user area at the second time. The lock may lock the door at the first time. Comparing the second image data to the first image data may include using facial recognition software. The operator data may be visually or audibly presented to the user in the user area. The operator data may be selected from the group consisting of a security question and a security instruction instructing the user to remove a hat or change position in the user area. The incorrect input data may be selected from the group consisting of an incorrect security image selection and or incorrect PIN code. For example, if the image data (e.g., photos) do not match, an operator may use another technique to verify an image data match. In at least some exemplary embodiments, the technique may include asking a user (e.g., a customer) located in front of a station or a kiosk for additional information or photos. For example, the technique may include pushing a screen to the user interface (e.g., providing an on-screen display requesting additional information), speaking to the user via an audio device (e.g., speaker and/or microphone) disposed at the station or kiosk (e.g., using VPN, VOIP, or other telephony method), calling the user on a phone in the store (e.g., or a contact's or friend's phone), or any other suitable technique. The communication between the operator and user may involve any suitable verification information or action. For example, using the exemplary disclosed communication techniques, the operator may request the user to remove a hat, request the user to provide information such as the user's type of device or phone, a time the user's device was dropped off, a user's alternate contact number or information, and/or any other suitable type of verification information.

In at least some exemplary embodiments, the exemplary disclosed method may include providing a door that selectively opens to allow access to a cavity and selectively closes to block access to the cavity; using a lock to selectively lock and unlock the door when the door is closed; using a camera to image a user area adjacent to the door; providing computing memory having associated therewith code and a processor communicatively coupled with the computing memory to execute the code; controlling the camera to record a first image data of the user area at a first time; storing the first image data; locking the door; controlling the camera to record a second image data of the user area at a second time; and selectively unlocking the door based on comparing the second image data to the first image data. Comparing the second image data to the first image data may include transmitting the first and second image data to a remotely-located device and subsequently receiving an operator data from the remotely-located device. Transmitting the first and second image data to the remotely-located device may occur after a user in the user area inputs an incorrect security image selection data or an incorrect PIN code data. Selectively unlocking the door may include unlocking the door when the first image data defines a first set of images of a user in the user area at the first time and the second image data defines a second set of images of the user in the user area at the second time. The processor may maintain the door in a locked state when the first image data defines a first set of images of a user in the user area at the first time and the second image data defines a second set of images of a different user in the user area at the second time. The operator data may be visually or audibly presented to a user in the user area. The operator data may be selected from the group consisting of a security question and a security instruction instructing a user in the user area to remove a hat or change position in the user area.

In at least some exemplary embodiments, the exemplary disclosed system may include a door that selectively opens to allow access to a cavity and selectively closes to block access to the cavity; a lock configured to selectively lock and unlock the door when the door is closed; a camera configured to image a user area adjacent to the door; computing memory having associated therewith code; and a processor communicatively coupled with the computing memory, configured to execute the code and to: control the camera to record a first image data of the user area at a first time; store the first image data; control the camera to record a second image data of the user area at a second time; and selectively unlock the door based on comparing the second image data to the first image data. Comparing the second image data to the first image data may include transmitting the first and second image data to a remotely-located device and subsequently receiving an operator data from the remotely-located device. Transmitting the first and second image data to the remotely-located device may occur after the user in the user area inputs incorrect input data. The incorrect input data may be an incorrect security image selection or an incorrect PIN code. The door may be unlocked when the first image data defines a first set of images of the user in the user area at the first time and the second image data defines a second set of images of the user in the user area at the second time. The door may be maintained in a locked state when the first image data defines a first set of images of the user in the user area at the first time and the second image data defines a second set of images of a different user in the user area at the second time. The lock may lock the door at the first time. Comparing the second image data to the first image data may include using facial recognition software. The operator data may be visually or audibly presented to the user in the user area. The operator data may be selected from the group consisting of a security question and a security instruction instructing the user to remove a hat or change position in the user area.

Figure 4G:
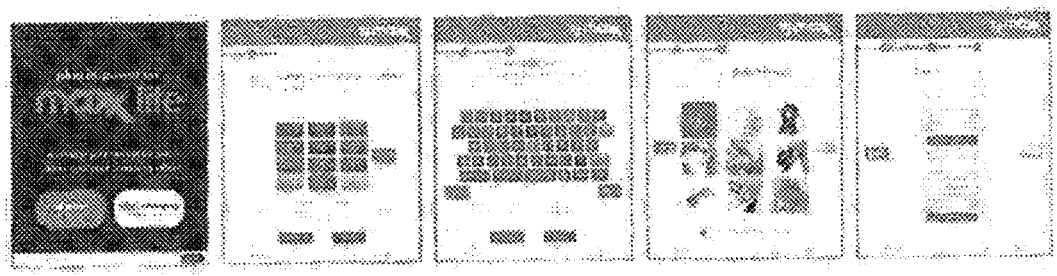
FIGS. 4G and 4H illustrate a charging sequence and a "get phone" sequence.
Figure 4H:
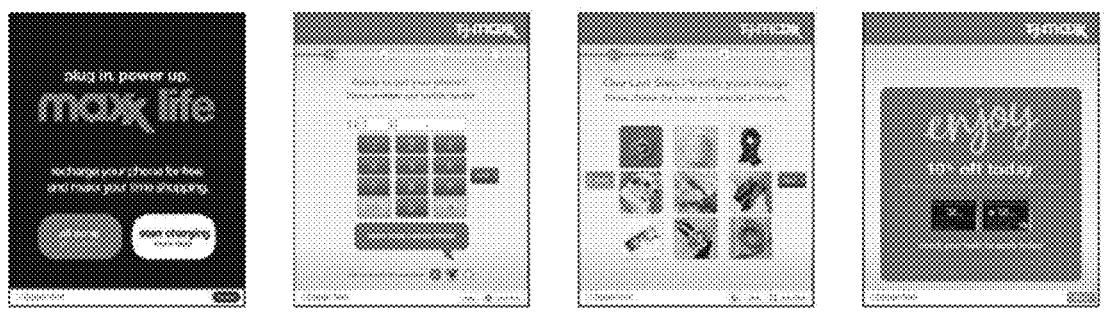
Figure 4I:
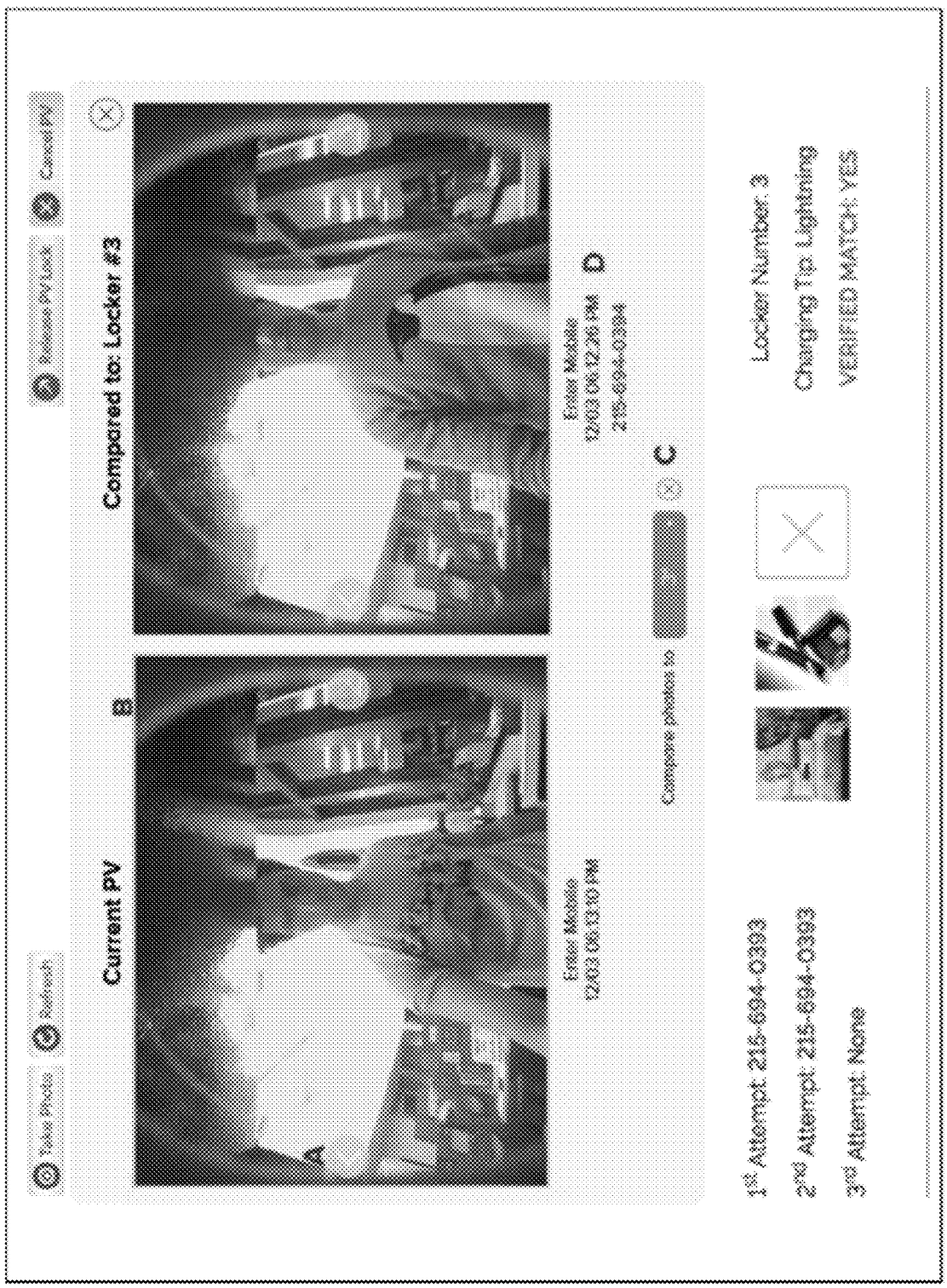
FIGS. 4I and 4J illustrate an exemplary disclosed photo comparison process.
Figure 4J:
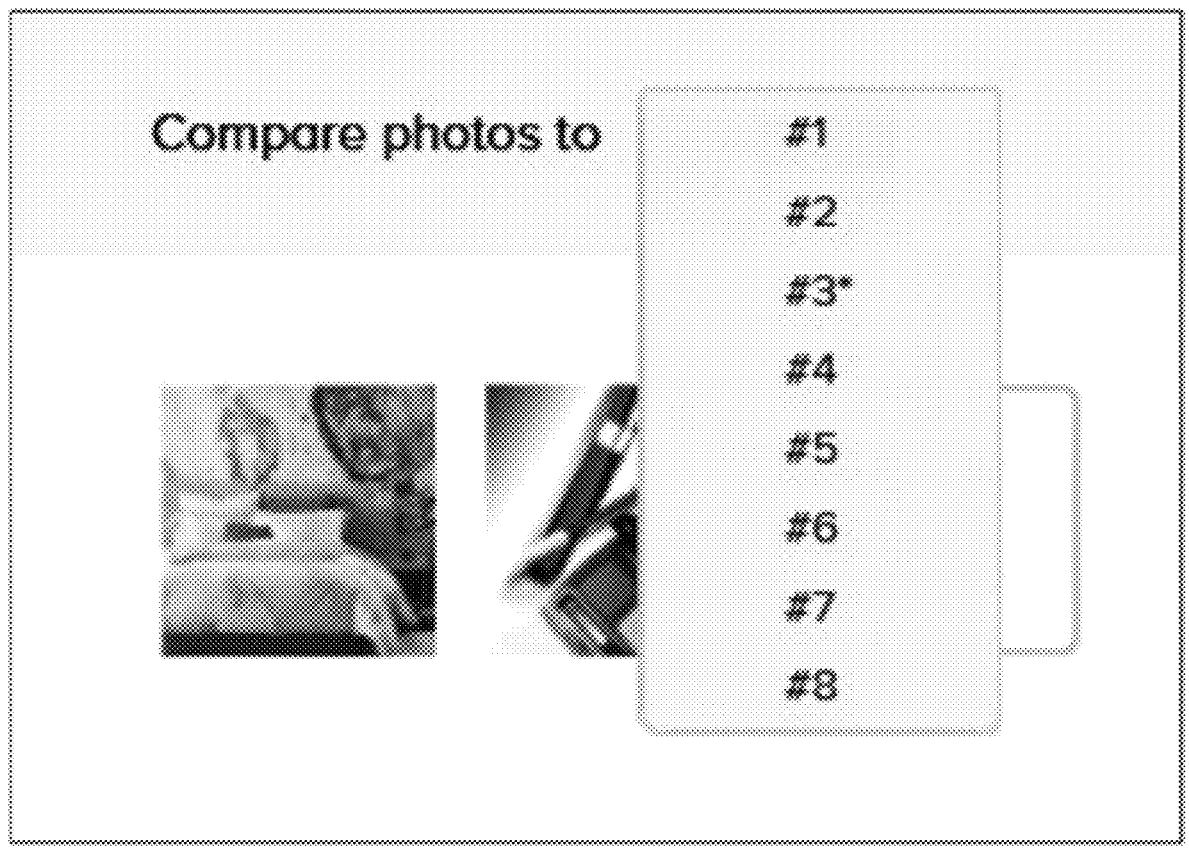

The exemplary disclosed PhotoVerification process and system may include a photo comparison module. For example as illustrated in FIGS. 4I and 4J, the exemplary disclosed PhotoVerification process and system may include a functionality (e.g., graphical user interface functionality such as a software functionality) and a screen layout that may provide a system operator with a comparison module. For example, the exemplary disclosed PhotoVerification process and system may provide a comparison module for a system operator such as a customer service representative or customer service team (e.g., remotely-located operator). As illustrated in FIG. 4I, the exemplary disclosed PhotoVerification process and system may display a first image (e.g., photo or video feed) and a second image (e.g., photo or video feed) adjacent to each other (e.g., side-by-side) on a user interface of a system operator. For example, the exemplary disclosed PhotoVerification process and system may provide a side-by-side comparison module for use by a system operator. The exemplary disclosed PhotoVerification process and system may display a first image recorded at a first time in the exemplary disclosed user area by the exemplary disclosed camera and may also display a second image recorded at a second time in the exemplary disclosed user area by the exemplary disclosed camera. The exemplary disclosed PhotoVerification process and system may process the image data from the first time and the second time (e.g., using facial recognition software and/or any other suitable technique for comparing data) to compare the first image data and the second image data. Also, a system operator may directly compare the first and second image data by comparing the data directly using the exemplary disclosed user interface (e.g., as illustrated in FIG. 4I). Also for example, as illustrated in FIG. 4J, the exemplary disclosed PhotoVerification process and system may provide drop-down menus, thumbnails, and any/or suitable graphical user interface element for facilitating comparison of image data by a system operator. The exemplary disclosed PhotoVerification process and system may thereby provide a user operator with an efficient and effective process for comparing images of users to verify if the user imaged in the first image or image data (e.g., at a first time such as when an object such as a mobile device is stored in a locker) is the same user as the user imaged in the second image or image data (e.g., at a second time such as when the object such as a mobile device is attempted to be removed from the locker).

The exemplary disclosed PhotoVerification process and system may allow a system operator to view images of users (e.g., to view locker photos of customers) to compare image data recorded and collected at different times (e.g., and/or may perform comparison processing of the image data such as, for example, including facial recognition processing and/or algorithms). The exemplary disclosed PhotoVerification process and system may thereby compare a first image data collected (e.g., photos and/or video taken) at a first time (e.g., when the locker was first accessed or any other desired time) to a second image data collected at a second time (e.g., photos and/or video being captured in real-time as a user attempts to retrieve a device for example with incorrect credentials). The exemplary disclosed PhotoVerification process and system may thereby improve a system operator's (e.g., a customer support team's) efficiency and accuracy.

For example as illustrated in FIGS. 4I and 4J, the exemplary disclosed PhotoVerification process and system may be accessed by a system operator (e.g., accessed by an operator located remotely from the station or kiosk having the exemplary disclosed cavity) based on the system operator clicking any desired image, pull-down, thumbnail, or other desired element depicted on the exemplary disclosed user interface (e.g., displayed on a page illustrated on the user interface). In at least some exemplary embodiments, a lock-out image may continuously or constantly appear on the module displayed on the user interface. For example as illustrated in FIG. 4I, the lock-out image may be the image or video depicted under "Current PV" that provides data of a user attempting to gain access to the exemplary disclosed locker. The exemplary disclosed PhotoVerification process and system may provide the "lock-out" image data in real-time or near real-time as the user is attempting to gain access to the exemplary disclosed locker. For example when a user enters incorrect security credentials, the exemplary disclosed PhotoVerification process and system may display the "lock-out" image of the user entering incorrect security credentials in real-time (e.g., immediately) or in near real-time to a system operator. The exemplary disclosed PhotoVerification process and system may alert a system operator to a user entering incorrect security credentials by displaying and maintaining the "lock-out" image data on a system operator's user interface. A system operator (e.g., customer support user, manager, technician, or any other suitable operator) may select one or more other images (e.g., image data collected at other times and/or locations) to use for comparing to the "lock-out" image for example as illustrated in FIGS. 4I and 4J and described herein. For example, a system operator may select from a dropdown list displayed on the user interface and/or select a thumbnail image (e.g., imaged at any desired time period) from the exemplary disclosed locker or location (e.g., location where the incorrect security credentials were provided). In at least some exemplary embodiments, the system operator (e.g., customer support representative) may carousel through a set of images (e.g., a movable or selectable carousel of images or videos) using a touchscreen, arrow buttons or directional keys on a keyboard, voice-activation, and/or any other suitable techniques for manipulating graphical user interface elements. For example, the movable or selectable carousel may be a variable display that the user may manipulate to display a desired image of the carousel set of images or videos. The exemplary disclosed user interface may depict the carousel feature in any desired manner such as, for example, a linear or circular display of movable thumbnails, a pull-down, or any other suitable technique for allowing a user to quickly scan through several or many images or videos (e.g., video clips). For example, FIG. 4J illustrates an exemplary disclosed carousel feature that may reduce a possibility of error when comparing image data (e.g., photos or video), which may in turn reduce a chance of poor user experience (e.g., an owner of a device being inappropriately locked out) and/or stolen devices (e.g., a theft of stored devices).

Once the user has entered the phone number and any required additional information, such as an email address, the user selects a charging locker and it is then opened, the screen may prompt the user to connect his or her phone for charging. An exemplary flow of the inception of device charging is illustrated in FIG. 4G, and may include ADA compliance, such as in the form of making available lower level lockers for persons in need of such service.

Further and as referenced herein, once the phone is plugged in for charging, an optimal charging profile may be sought, and such an optimal charging profile may include charging rates, such as whether high level charging should be an initial occurrence, or should be ramped to slowly, and additionally the proper rate of ramp down of charging for optimal charging of a particular device as discussed herein. This provision of the charging profile may occur by the offering, by the kiosk, of various charging profiles until a profile is accepted by the device. Accordingly, although there is no synchronization with the phone, the optimal charging profile may nevertheless be obtained. The lack of synchronization in the disclosed embodiments is yet an additional security feature, in part because it protects: a) the data on each individual phone (as there is no means to pull data from the phone); b) servers from being subject to viruses carried by users' phones; and c) other users' phones from being infected by a virus-infected phone that might transmit a virus to the servers.

As referenced, customer service may preferably be available by the touch screen, microphone and/or speakers 412 as shown in FIG. 4A, associated with the kiosk. This customer service may allow for a user to indicate a problem with the kiosk, such as the user being locked out of retrieving his or her phone. In exemplary embodiments discussed herein, customer service may have a variety of methods through which to confirm the propriety of the user's attempt to access the phone, such as via the customer service representative looking at pictures taken by the camera when the phone was placed in a locker, an assessment of the phone number entered or any security images or PIN numbers selected or provided by the users, charging tip type, or a series of questions asked of the user for security purposes. Such questions/actions may include, for example, the approximate time the phone was placed in a locker, the phone number of the phone associated with the particular locker for which access is requested, and the ability to contact local security personnel if a user fails to properly address security when trying to retrieve a phone. Furthermore, customer service may have a variety of abilities, such as may be provided by the network infrastructure and the kiosk control board, to remotely access features of the kiosk. For example, a customer service representative may be able to open locks and/or otherwise open lockers, change lights, force onto the user screen certain information, or the like. Moreover, customer service representatives may have particular controls available to them in relation to the aforementioned PhotoVerification period. For example, a customer service representative may be able to take a photo on demand of a user for comparison to earlier photos. He or she may be able to indicate to the user to please take off a hat, for example, to improve the ability to compare photos, may position a user in relation to the camera to provide for a best comparison of photos, or the like.

Customer service representatives may additionally have access to a variety of information in relation to the kiosk, such as usage, lockers then in use, phone numbers associated with locker, pictures taken by a camera associated with the kiosk going back in time, or the like. Much of this same information, and additional information, may preferably be available to kiosk administrators, who may oversee operation of one, multiple, or many kiosks, such as associated with a given geographic location, a given brand's campaign, a particular data type, or the like. Such administrators may be provided with a dashboard that yields real time access across a network of kiosks, which may include all kiosks or particular portions of kiosks. Using this dashboard, an administrator may be able to investigate all actions over configurable time periods, may be able to schedule maintenance, may be able to oversee customer service or the like, and needn't be at a centralized location.

In further embodiments of the invention, photo or video records of users may be stored remotely, such as on an administration server which may be accessed by the customer service or administrator during the PhotoVerification process set forth herein. Further, not only may the system store records of end-users or customers, but it also may log all actions taken by administrative users, including login/logout time, configuration changes, tasks that are sent from server to kiosk, and the like, and may additionally log all actions taken within the system.

The administration server securely stores the user records and makes the user records available on an as-needed basis utilizing secure communication lines. The processing power of a centrally located admin server is considered far greater than the processing power of the charging station, or kiosk, therefore the verification process time is much quicker and results in improved overall user satisfaction. Moreover, security is enhanced by the PhotoVerification process, such as because the subject data remains firewalled.

In the event that a secure connection cannot be established with the administration server (i.e. an Internet connection is down), the authentication process for PhotoVerification may be halted and a user might thus be prevented from initiating the charge phone process, or from retrieving a device if they forgot their mobile number and security credentials. However, if the user correctly enters their mobile number and security credentials while the kiosk is offline, since the information is stored locally on the kiosk for a short amount of time, the user would still be able to retrieve their phone.

Once a device is connected to the charging cable, charging pad, or other wireless method of charging, the charging process may begin. A charging negotiation process may be undertaken, such as at the direction of control board associated with the charging station. The one or more printed circuit boards may provide local hardware interaction and control for various features of the cabinet. By way of example, such as in an eight-locker embodiment, two locker control boards may be provided—one for the upper four lockers control, the other for the lower four lockers control. This provision of multiple locker control boards may allow for a failsafe in the event one locker fails, i.e., the cabinet can continue to operate with the remaining lockers, or may correspond to different uses administratively prescribed to various parts of the cabinet, such as in embodiments where only the lower four cabinets are available for charging if the user requests accessibility mode for use of the cabinet.

More specifically, devices using the offered connectors may be sensed when connected, and may be offered a sequence of charging profiles to identify the most efficient charging standard for the device. In no circumstance is data synchronized between the kiosk and the device in this negotiation.

By way of example of this negotiation, devices being charged may vary the amount of current drawn depending on their battery level. That is, nearly empty devices may draw more current than partially charged devices. A kiosk may ultimately supply 3.0 A or more to one or all lockers simultaneously.

By way of additional example, because the Americans with Disabilities Act may necessitate that only those lockers that can be readily physically accessed by a user may be selected and opened by that user, selection of an ADA accessibility mode on the user screen may indicate to the control board that only the lower lockers, such as lockers five through eight in an eight-locker example, may be opened for a particular user. In addition, all buttons on the touch-screen interface are ADA compliant.

The exemplary disclosed process and system may include ADA-compliant hardware and an ADA-compliance module that may provide configurations and/or processes that comply with the Americans with Disabilities Act (ADA). In at least some exemplary embodiments, the kiosk software and hardware may provide for ADA-compliant operation of the exemplary disclosed system.

The exemplary disclosed ADA-compliance module may operate via the exemplary disclosed user interface so that displays of the exemplary disclosed user interface may be ADA-compliant. For example, some or substantially all displays (e.g., screens) of the exemplary disclosed user interface (e.g., kiosk user interface) may display or exhibit a minimum color and/or font contrast level that is appropriate for visually-impaired users.

The exemplary disclosed system may include hardware (e.g., kiosk hardware or supplemental hardware) to which visually- or auditorily-impaired users may connect their assistive technology devices to facilitate use of the kiosk. For example, electrical outlets and electrical connection ports may be disposed at between about 12" and about 60", or between about 15" and about 48" above floor or ground level. The exemplary disclosed system may also include any suitable electrical connectors for connection to assistive technology devices such as, for example, connectors including Braille descriptions, suitable tactile devices, and/or any other suitable assistive connectors or devices. The ADA-compliance module may recognize a connection of assistive technology devices to the exemplary disclosed system (e.g., to the kiosk). For example based on the identification of assistive technology devices that are connected to the exemplary disclosed system, the ADA-compliance module may operate (e.g., via the exemplary disclosed user interface) to provide suitable display, information, options, and instructions to a user. For example, the ADA-compliance module may operate (e.g., via the exemplary disclosed user interface) to tailor the user experience to one or more connected assistive technology devices for example by automatically playing a series of instructional recordings and/or receiving tactile inputs from the exemplary disclosed supplemental hardware of the exemplary disclosed system.

The exemplary disclosed system may include components configured to provide ADA-compliance. For example, the exemplary disclosed system (e.g., components of the system) may be wall-mounted or placed on a table-top or other suitable surface. For example, the exemplary disclosed system may include a charging station that may include a wall-mounted display and/or a table top or may be a free-standing kiosk that may be designed to comply with ADA criteria to facilitate wheelchair accessibility. For example, the exemplary disclosed system may be configured so that an individual seated in a wheelchair may reach substantially all touchable areas of the exemplary disclosed user interface (e.g., substantially all buttons on a screen of the user interface). Also for example, the exemplary disclosed system may be configured so that the system is wheelchair accessible (e.g., the kiosk may be installed at a location that is accessible by wheelchair). Also for example, the exemplary disclosed system may include a kiosk that may be installed at a location that is suitable (e.g., not a safety hazard) for visually-impaired individuals who may navigate the kiosk using a cane.

The control board may also provide various other functionality, such as charging control, kiosk remote interaction, control of the LEDs or added features, control of the user interaction screen and cameras, and so on. The board may additionally have software or firmware resident thereon that provides optimization functionality, such as by interaction through the aforementioned charging cables. By way of non-limiting example, the board may be comprised of firmware that controls the offered charging profile to the connected phone, and the phone accepts its optimal profile.

As a non-limiting example, the charging board may be pre-programmed with information pertinent to various charging profiles, or may retrieve the information from an external server. Based on this information, the charging process can provide the optimal amount of current to best charge the phone.

More specifically, the optimized charging process may be provided by the board, as discussed throughout. In sum, the disclosed exemplary embodiments provide that a phone may accept only the highest amperage for charging that the phone can handle without degradation. Accordingly, under the control of the aforementioned control board, the kiosk charging cables in the exemplary embodiments may offer various power profiles to the phone and allow the phone to draw optimally at a particular power profile, thereby indicating that power profile to be the proper one for optimal charging of the phone. Moreover, available optimal charging profiles provided by the kiosk control board may include a default profile, such as the lowest charging profile acceptable to all phones, i.e., a laptop phone charging profile of 500 mA. Thereby, the phone may be charged using a default profile, which is typically the lowest profile available, if none of the other profiles are accepted by the phone.

In at least some exemplary embodiments, the exemplary disclosed system may include a cable tester. For example, the exemplary disclosed system may include a consistent technique to test the exemplary disclosed universal interfaces 410 (e.g., charging cables) across a plurality of stations or kiosks (e.g., across the fleet of interconnected charging stations in the field). Consistently using one type of cable tester may avoid inconsistent reporting due to operators (e.g., field technicians) using their personal cable testing devices (e.g., different devices). For example, different cable testing devices and techniques may have unsuitable deviation or lack of precision in charging cable test results based on factors such as battery percentage, type of phone (e.g., type of cable and/or cable testing device), and other criteria. Accordingly, the exemplary disclosed system and process may include operators using a single type of cable testing device and/or cable testing process (e.g., a same or similar technique) for some or substantially all charging cable testing performed by operators such as field technicians. For example, the owner or operator of the exemplary disclosed system may include a customized cable testing device design and testing technique that consistently tests charging cables across a plurality of stations or kiosks of the exemplary disclosed system (e.g., that may be distributed to some or all operators such as to a global team of field technicians). In at least some exemplary embodiments, the exemplary disclosed charging cable testing device may be a handheld charging cable testing device. The exemplary disclosed charging cable testing device and process may thereby provide substantially consistent testing results that may not vary or deviate from each other because they may avoid using variable types of testing devices and/or techniques. The exemplary disclosed system may thereby reduce or substantially prevent inappropriate replacement of suitably operational cables and/or may avoid excessive costs for replacement parts. The exemplary disclosed system may also identify and remove from circulation unsuitable cables that may not provide sufficient charge (and/or that may result in a less than favorable user experience) in a quick, efficient, and consistent manner.

Further in relation to the physicality of the electronics and hardware associated with a kiosk, in typical known kiosk style embodiments, a real estate-style hardware key—based model is employed, wherein a lockbox having a code associated therewith includes there within a key to unlock some aspect of the kiosk. However, once the lock code is given out, such as to a technician or employee, that person forever has access to the key resident within the lockbox. Further, if the key is removed from the lockbox, it can be duplicated or stolen. Moreover, it is often the case that the same key is used across multiple kiosks. Yet further, a hardware lockbox may be "hacked", such as wherein a lockbox code is changed by a skilled artisan, such as a locksmith. Finally, without the algorithms or artificial intelligence that may be provided by software, there is no means of recording or tracking who it is that is entering a kiosk through the use of a code or a key.

Figure 21:
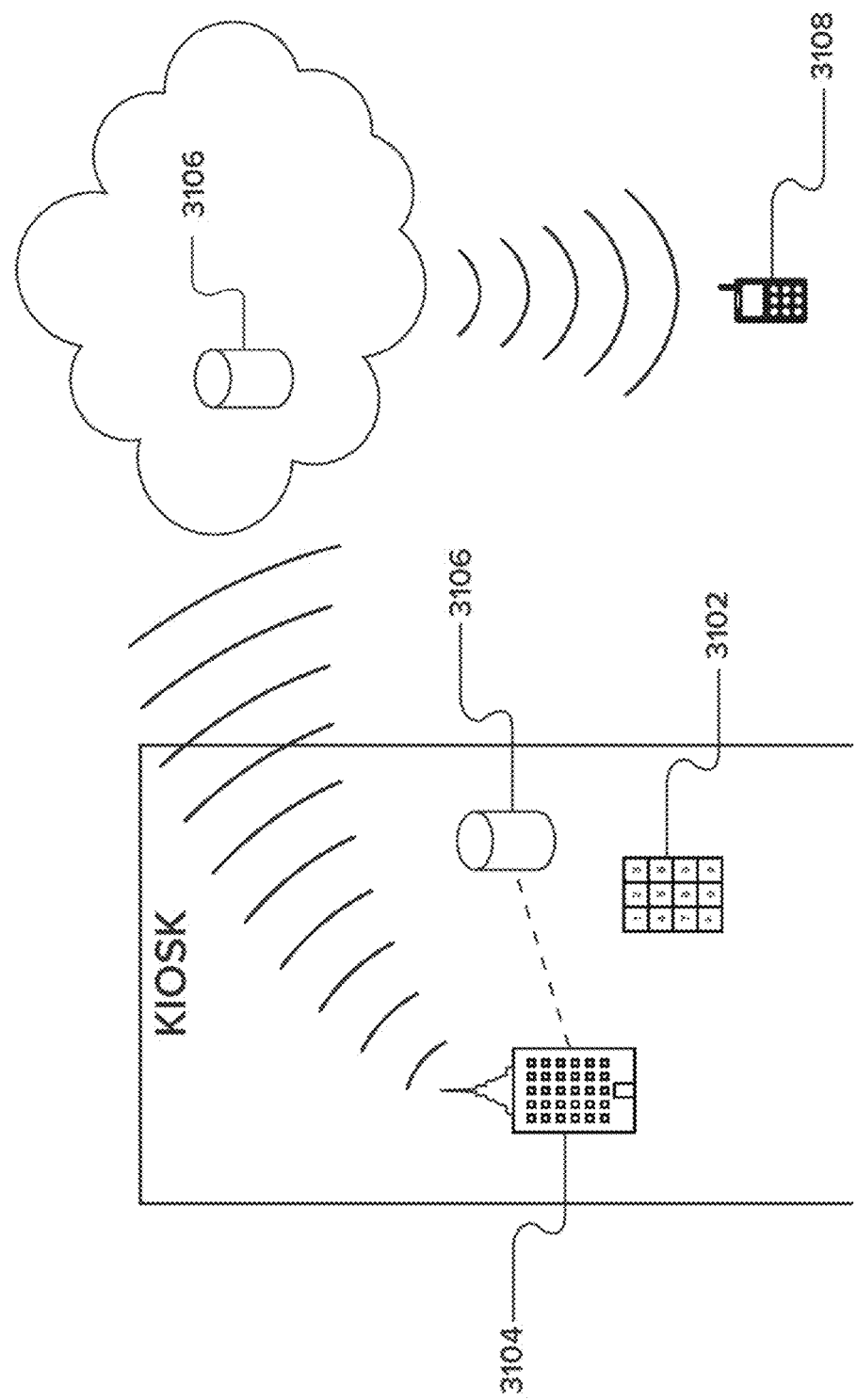
FIG. 21 illustrates a rear electronic keypad as an exemplary embodiment of the invention.

Therefore, the instant embodiments, as illustrated in the example of FIG. 21, may eliminate keyed locks and single perpetual key codes to enter a kiosk, in part by providing a system comprised of a keypad, control board, electronic lock, and power supply and/or a battery backup, which may communicate over 4G LTE (by way of example), such as to the servers, and which may communicate to a master board locally. More particularly, an electronic keypad lock 3102 may have a dedicated controller board 3104 to interact with the "master" kiosk board discussed above, or may be provide as part of a kiosk's on-board computer. The keypad lock may be remotely programmable, and codes may be issued remotely (or locally), such as from an administrative randomized database 3106. Accordingly, an electronic code suitable to operate the electronic lock may be issued from a remote administrator, and may be used only for a single use, a particular number of multi-uses, or over a predetermined timeframe, or for a specific kiosk or group of kiosks, by way of nonlimiting example. Additionally and alternatively, codes may be cached locally in the memory of the computing system on board the kiosk, and such codes may also be single or multiuse. In such embodiments, the codes may be stored on the memory in association with the board attached to the keypad, such that the door may be opened even if the kiosk is off-line or operating only on onboard battery power. That is, a battery backup may be included in the kiosk such that the door may be opened using a locally cached code if the power goes out. Upon use, or after the expiration of a predetermined timeframe, a new code may be issued.

As referenced, codes may be assigned via the remote servers discussed throughout, and may be monitored remotely or downloaded locally for operations, as discussed above. Thus, codes may be changed, revoked, issued, or reissued at any time, either automatically or manually, and locally or remotely. Codes may be assigned by a random generator, by way of nonlimiting example.

Codes may be assigned manually or automatically, as referenced above, and may be downloaded from a manual or automated administrator to a code-user either by push, such as wherein the codes are automatically sent to, for example, a secure app associated with a mobile device 3108 of an authorized user, or by pull, such as wherein an authorized unit or user may request a code in order to open a kiosk. Accordingly, the issuer of the code, the date and time stamp of issuance, and the recipient or recipients of a code may be tracked using the embodiments. The remote manual or automated pushing of codes may require network conductivity, such as to a remote administrative server, although, as referenced above, codes may be batch-replenished so that sufficient numbers of codes are always available, such as in the event of a loss of power. In accordance with the foregoing, employees, technicians, company administrators, representatives, kiosk sponsors, or the like may be issued single use or multiuse codes. Such codes may be revoked or new codes issued in the event the authorization status of one or more recipients of a code changes, by way of nonlimiting example. Further, codes may be region, kiosk, or user specific, such as to enhance security. Codes may also be reusable or non-reusable, such as based on the user, code issuer, use of the code for an entire brand, set of sponsors, region, or kiosk, or status of a code. Use may be for an indefinite time period or may be time-limited. Moreover, codes sent remotely to a kiosk may be sent at regular intervals, by a specific automated or manual push, or the like.

Accordingly, not only may the occurrence of access to a kiosk be recorded, but further, the particulars of who accessed the kiosk and when that access occurred may also be recorded, such as based on electronic signatures from mobile devices at the time of access, the identity of code recipients, and the like. Needless to say, an access methodology such as is discussed above may have applicability outside of the particular embodiments discussed above, such as for any embodiments that employ hardware lockboxes, keyless entry systems, tumbler-based systems, and so on.

During or following charging, the invention may provide a notification process. The notification process may be initiated at discreet events such as upon start charge, upon the completion of a device being charged fully, etc. Users may be notified in a myriad of different ways, including, but not limited to, SMS text message, an email, or the like. Further, once placed in a locker, the phone may remain in a locker for an unlimited period of time or for a pre-determined allowable period of time. Moreover, charging in association with particular phone numbers may allow for tracking not only of time of use and location of use for an individual user, but additionally if no use occurs over a period of time. For example, if a user has not charged in 30 days, a text may be sent to the user's phone advertising a particular business previously frequented by the user at which the user charged at a kiosk, from a brand, from a kiosk sponsor, from a particular kiosk location, or the like. The user may be additionally provided with an advertisement, a coupon, a suggested app download, or the like, if the user fits certain use criteria, time of use criteria, or time without use criteria.

Figure 9A:
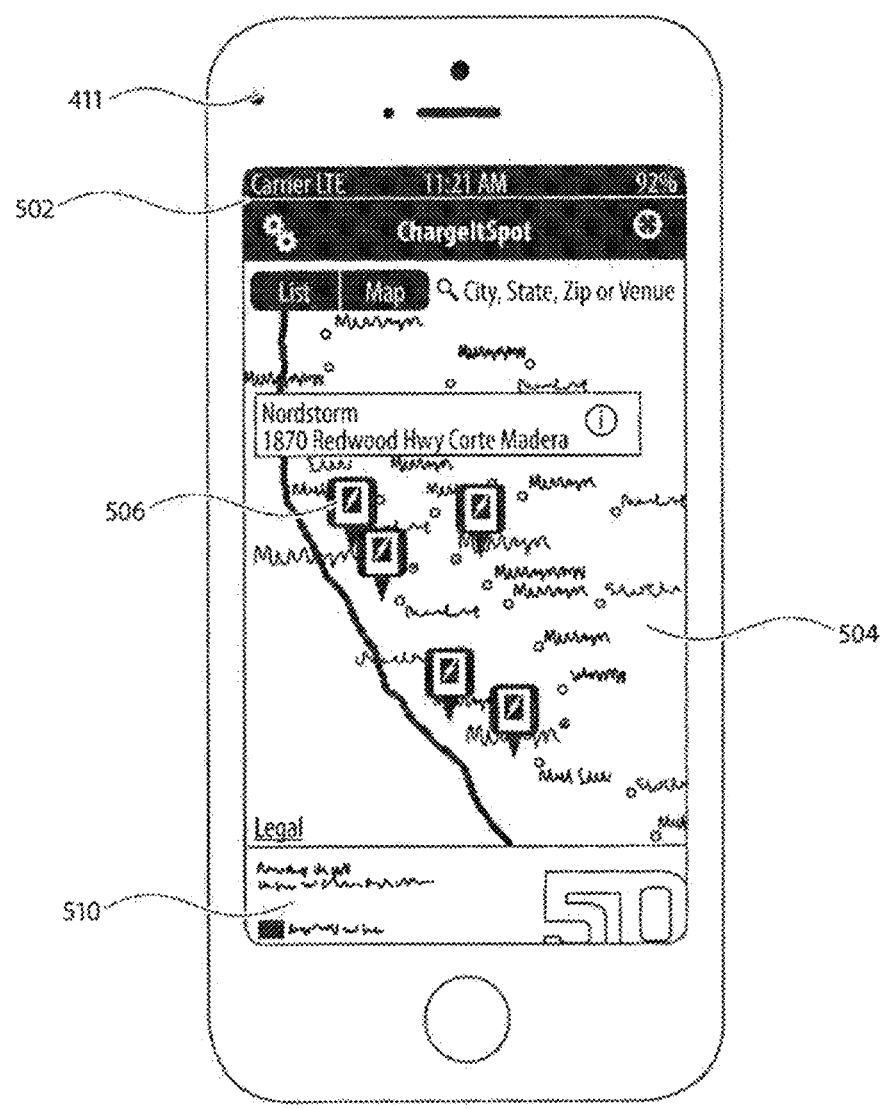
FIGS. 9A-E illustrate exemplary map displays on a mobile device according to embodiments of the present invention.
Figure 9B:
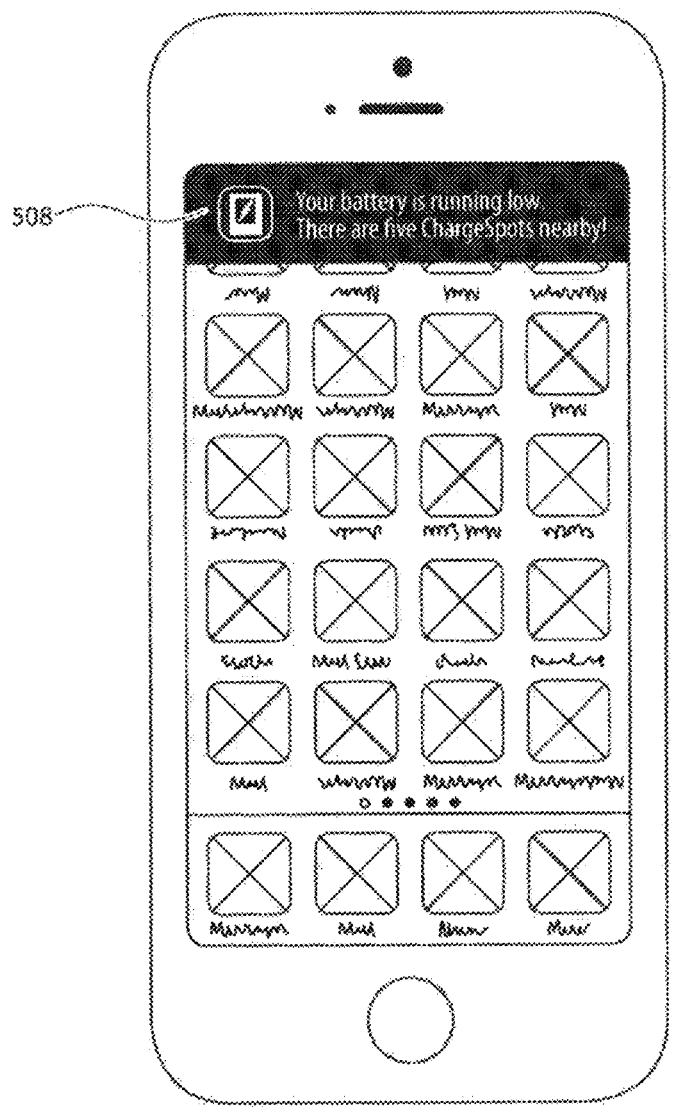

FIGS. 9A and 9B illustrate examples of a map displayed on a mobile device, such as by a mobile application associated with the disclosed systems and methods. As shown in FIG. 9A, for example, the mobile device has a display screen 502. The server (not shown) may access the mobile application on the device, such as upon sensing by the mobile application on-board that battery power has fallen below the predetermined threshold, and may cause the display of a map 504, a notification (such as to allow for subsequent display of a map), or a like-alert on the display screen 502, such as to indicate the need for charging, and/or to recommend prospective charging kiosks.

Of course, the skilled artisan will appreciate that an assessment of user location in relation to a low battery threshold may vary by device/platform type. By way of non-limiting example:

```
Android Battery Low Notification Algorithm
================================
Android OS notifies application battery level has changed
IF battery Level <= minimum charge THEN
    Find current device location
    FOR EACH CIS location DO
        IF CIS location latitude and longitude are set THEN
            compute distance to CIS location from current device location
        END IF
    DONE
    Sort CIS locations by distance from current device location
    Take nearest CIS location
    IF nearest CIS location distance < maximum distance THEN
        Show low battery notification dialog
    END IF
END IF
iOS Battery Low Notification Algorithm
================================
iOS notifies application that location region has changed
IF battery Level <= minimum charge THEN
    FOR EACH CIS location DO
        IF CIS location latitude and longitude are set THEN
            compute distance to CIS location from current device location
        END IF
    DONE
    Sort locations by distance from current location
    Take nearest location
    IF nearest location distance <= maximum distance THEN
        Show low battery notification dialog
    END IF
END IF
```

The map may populate with certain icons 506 superimposed thereon, such as for denoting the location of certain available charging stations and/or registered businesses having charging stations to the user, and/or how many charging units are available (if any) at a given location, such as responsive to a push notification to a low-battery device, or such as responsive to a user search (such as by proximity, venue, city, state, zip code, etc.). By way of non-limiting example only, a large upside-down "teardrop" icon may denote the location of a charging station 110 with at least one locker currently available for charging. Also displayed on the display screen 502 may be a notification area 508 as shown in FIG. 9B, in which the mobile application may notify the user that his battery power level has decreased to a predetermined level, and that the battery may need to be recharged soon to maintain operation of the mobile device. As shown, the notification area 508 may be located above the map, by way of nonlimiting example.

Figure 9C:
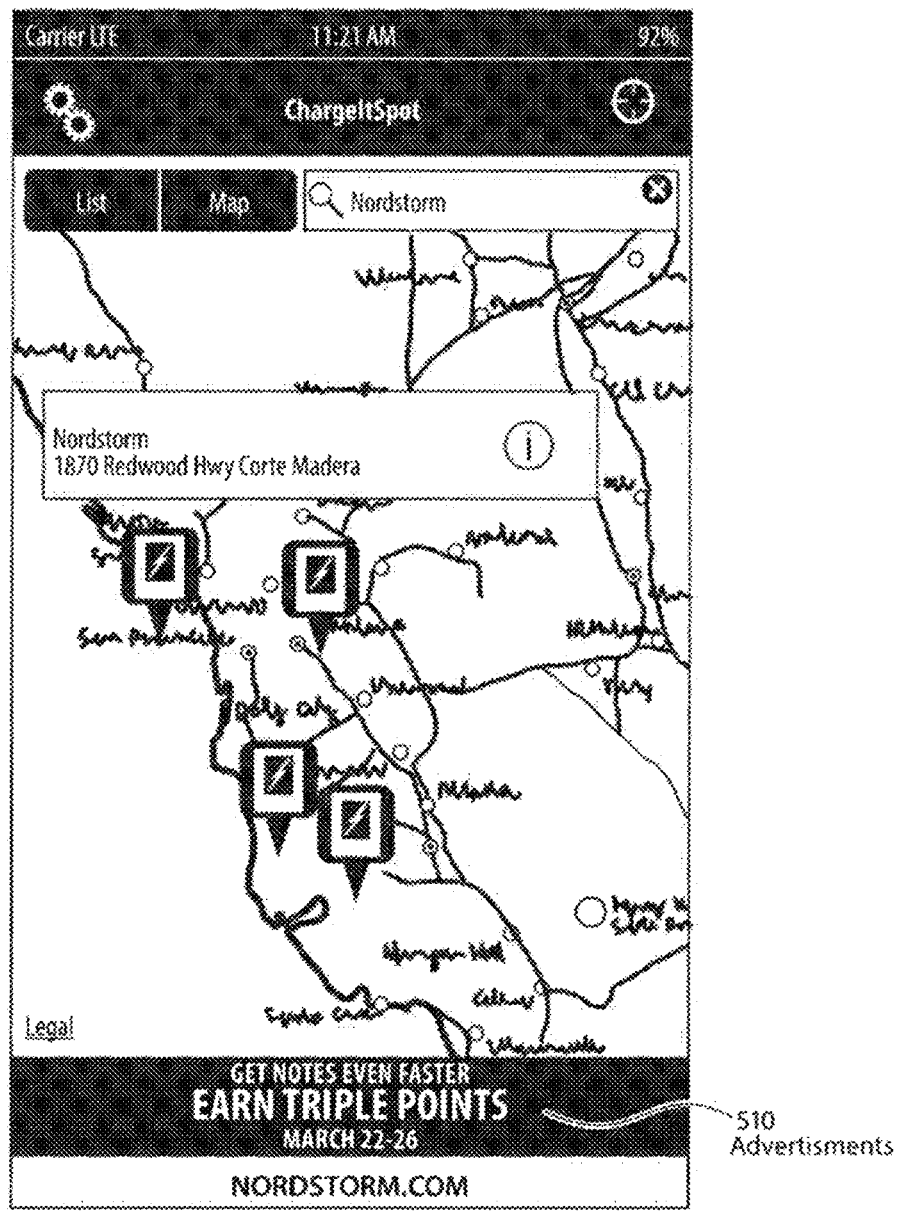

However, embodiments of the present invention are not so limited, as the notification area 508 and/or map may be of any known type, may be tiled or "windowed" in any manner, and/or may be located anywhere on the display screen 502. In an embodiment of the present invention, as illustrated in FIG. 9C, the user may toggle between the map view discussed herein and/or a list view of location which may more clearly identify the most convenient location for the user. Such a list view may, for example, note the distance between the user and the provided locations and may be sorted, for example, from closest to furthest from the user geographically. Similarly, using traffic reporting systems known to those skilled in the art, the sorting may also account for travel time due to road conditions and may sort accordingly.

Further, the configurability of the user presentation in the instant embodiments may include that the user can configure the battery percentage level that triggers a low battery notification, and/or the distance to the closest charging station in order for an alert to be delivered, by way of non-limiting example.

As further illustrated in FIG. 9C, 510 ads may be served within aspects of the GUI and may, for example, be served along with the list of possible charging locations. In an embodiment of the present invention, the served ad may be in the form of a banner ad. The served ad may be used to self-promote features and services provided by the present invention and/or may be sold to third parties. Third party ads may be associated with one or more identified locations and may pertain to that location's particular goods/services offered for sale. For example, a location having a charging station 110 may be predominately in the business of selling shoes, and, more particularly, athletic shoes, and may pay for the delivery of an ad promoting its business and/or offering a coupon for the purchase of shoes. Such a promotion may, for example, offer an additional discount/incentive based on use of the charging station 110.

Further, as referenced herein, once the app is downloaded to the user's phone, information can be readily provided to the user associated with that phone number, such as the pushing not only of ads, but also of data, an app, or the like. Moreover, an app associated with the instant invention, the screen of the charging kiosk, or simple text message may request information from one or more users, wherein that information is desired or needed by locations, sponsors, or the like. For example, email addresses may be requested, such as an association with a retail embodiment and in order to correspond to a particular phone number. Thereby, that retail establishment may develop data regarding phone numbers and matched email addresses of frequent shoppers at that establishment, whereby coupons, advertisements, or the like may be provided to that frequent shopper.

As would be appreciated by those skilled in the art, ads may also be delivered based on location and may be dynamically delivered based on user attributes. For example, an ad may be served according to the proximate of a user to a location where the ad may be relevant, whether or not the relevant location and/or ad is related to a charging station 110 location. Similarly, an ad may be served based on the type of phone used by the user and/or the apps loaded thereon or browsing history. For example, the app of the present invention may query the bookmarks or other internet browsing activity logged on the user device and may use that information when serving an ad.

As would be appreciated by those skilled in the art, ads may be scheduled with a start and end date over a specific time period. The use of revolving and/or multiple ads may be presented to a user and may, for example, create a user specific "playlist". Such ads may be configured as an attribute in any of various available programs known to the skilled artisan.

Figure 9D:
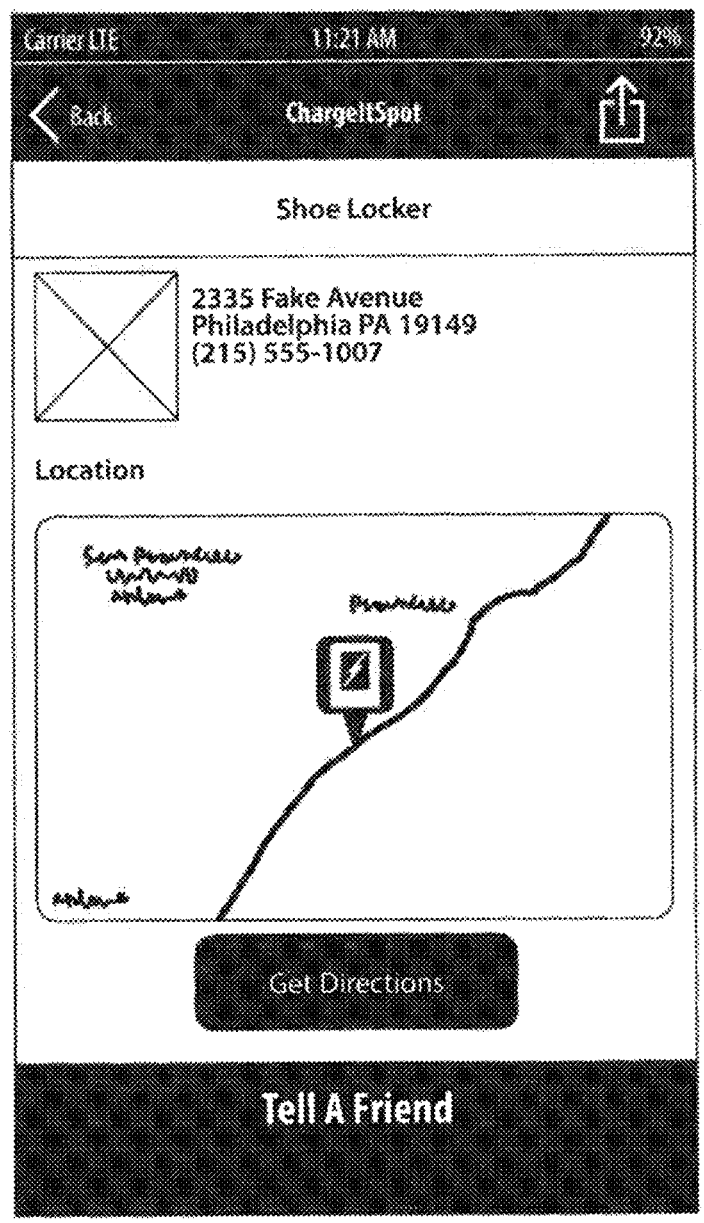

Any selection of a location, whether by selection of a graphically presented location, a listed location name, and/or automatically delivered to the user, may include a detailed map representation and/or the option to obtain directions to the selected location, as illustrated in FIG. 9D. Information provided may also include location details, including contact information, and may allow for the sharing of the location information with other contacts through conventional communication means, such as email and texting, for example, and through social networks, such as Facebook, for example. As would be appreciated by those skilled in the art, obtaining directions to the selected location may include launching a GPS aided mapping app which may be resident on the user device, such as, for example, MapQuest or Google Maps, which may give "turn-by-turn" directions to the user.

Figure 9E:

According to exemplary embodiments, advertising content 510 may also be provided to the user on the display screen 502, such as via the mobile application. The advertising content 510 may include instructions on how to take advantage of special offers or deals mentioned in the advertising content 510. For example, upon reaching a charging location, the user may, either prior to recharging or upon at least partially recharging his device at the participating location, show or play (e.g., in the case of audio-based advertising content) the advertising content on the mobile device to the cashier or other staff at the advertised location, such as to obtain any advertised prices, offers or deals, and/or to be given a coupon or the like. In other embodiments, as illustrated in FIG. 9E, the mobile device user may only have to mention that they received advertising content 510 to receive any relevant special offers. In still other embodiments, the user may be given a code, such as a numeric code, a keyword or password, or other like indicator that, once passed to a cashier or store personnel, indicates to the store personnel that the user has indeed received a special offer on his device to use a charging station at that store. In yet further embodiments, upon accessing the advertisement and/or upon reaching the charging location, a credit, such as may be accessible only in the event of a purchase, may be added to a shopper's card, store card, credit card, user account, or the like of that user.

Embodiments may allow for ordering and/or purchasing and/or searching via the disclosed kiosk, such as in relation to provided advertisements. For example, the kiosk may be communicatively integrated with a kiosk venue's database, and/or with the remote database 302 discussed throughout. Thereby, an order may be sent, such as by SMS, to a user's phone, whereafter the user brings the electronic "receipt" or Q.R. code from the SMS to obtain the ordered product.

Similarly, coupons or similar discounts may be provided to the user through the use of the kiosk in the manner discussed above.

Additionally, in some embodiments, advertising content 510 may include an indication that the mobile device user is already heading toward, or is likely to pass, an advertised location. In other embodiments, advertising content 510 may include directions to the advertised location, and/or may link to a website of the location upon accessing by the user, for example.

Situations may arise where multiple nearby businesses may house a charging station, thus driving competition for the user's "foot traffic," and/or for advertising content space (and/or business location recognition by icon 506) on the user's mobile device display screen 502. Therefore, the server (not shown) may employ a prioritization algorithm to determine which participating business or businesses gets to provide an advertisement (and/or location recognition by icon 506) at any given time and location of the user's mobile device, and/or in what order advertisements are listed, displayed, or preferentially listed or displayed. This prioritization algorithm may be based on any number of factors, which may include, for example, user shopping characteristics and a known relation (such as a known preference) to the items of a participating business or business type, the relative location of the user and participating business, the level of participation of the participating business in the disclosed systems and methods (e.g., the fee amounts paid to house a charging station, paid for user access via the mobile application, paid for user data access and/or accumulation, or the like), and the like. It should be noted, however, that these factors should not be so limited, as the prioritization algorithm may apply other information related to consumers or businesses to determine the advertising content (and/or location recognition by icon 506) to be displayed on the display screen 502 at any given time.

As will be understood to the skilled artisan in light of the discussion herein with respect to FIGS. 9A-9E, a software developer's kit ("SDK") may allow for any of the variety of aforementioned notifications to be made to a mobile user in possession of a device suffering from a low battery. More specifically, a brand or charging provider 4100 may embed the ChargeItSpot SDK into their mobile "app" 4101 that a user downloads to a device. The app may communicate, such as via the cloud 4102, with ChargeItSpot's Location Database 4104, by running code provided by the SDK in order to provide aspects of the functionality discussed throughout.

By way of non-limiting example, the app 4101 may recognize that the battery level of the phone on which the app resides is low, such as that the battery level has fallen below a predetermined threshold, such as 20%. This may trigger a notification 4110, such as per the SDK, to the user, such as from the brand or charging provider 4100 that the users battery is low and a charging station exists at a location within a preconfigured proximity of the user's device. Similarly, the app could simply provide a notification of the existence of a charging station based on an algorithm employed by the SDK within a nearby location user's device, based on proximity alone. This notification may be delivered in a manner predetermined from the SDK, such as via in-app notification, a banner notification, a push notification, one or more of the above, or via any other known notification means.

Of course, other predetermined triggers may be employed besides current battery level, such as an assessment of low battery without indication to the user that the battery level is known; low battery once a battery threshold is reached, regardless of current battery percentage; loss of an additional threshold of battery level, i.e., the loss of an additional 5% or 10% since the last notification; a periodic recommendation to charge; periodic in-app ads as discussed above; and so on. This is further made evident by the illustration of FIG. 23.

The notification that is thus delivered may be of any suitable type provided to and by the SDK. For example, a low battery notification may stimulate a notification, such as in-app, of geographically proximate (such as within a predetermined geographic radius based on interaction with the SDK) locations of the brand or charging provider at which the device's battery may be charged, and/or at which charging lockers are available, and so on. Needless to say, certain types of notifications may require certain permissions from the device OS, such as the use of location services by the app, the use of local notifications in-app or via push notification, and/or other necessary background processing functionality, in the foregoing example.

Moreover, other thresholds may be set according to the SDK, and in relation to the notifications discussed throughout. For example, if a user agrees or otherwise acts to seek out the location of the nearest brand-owned charging location, the user may receive no additional notifications. However, if the user closes the notification, the notification may be provided anew, such as with increasing frequency after each time the user closes the notification.

Yet further, the mobile device suffering from low battery needn't be the same mobile device that receives the notification. By way of example, the SDK may provide for an app on a second mobile device to receive a notification based on the battery threshold on a first mobile device, wherein the first mobile device may or may not include the same app, or a second, communicative app, as the second device's app.

Furthermore, the SDK technology to provide notifications of nearby charging stations within partner apps that may not have any of their own charging stations. For example, an app that drives a customer into a store to redeem a coupon could also provide their users notice that a charging station is located within. Or an app that provides low battery notifications could provide users with information on where the nearest charging stations are located. And so on.

Figure 10:
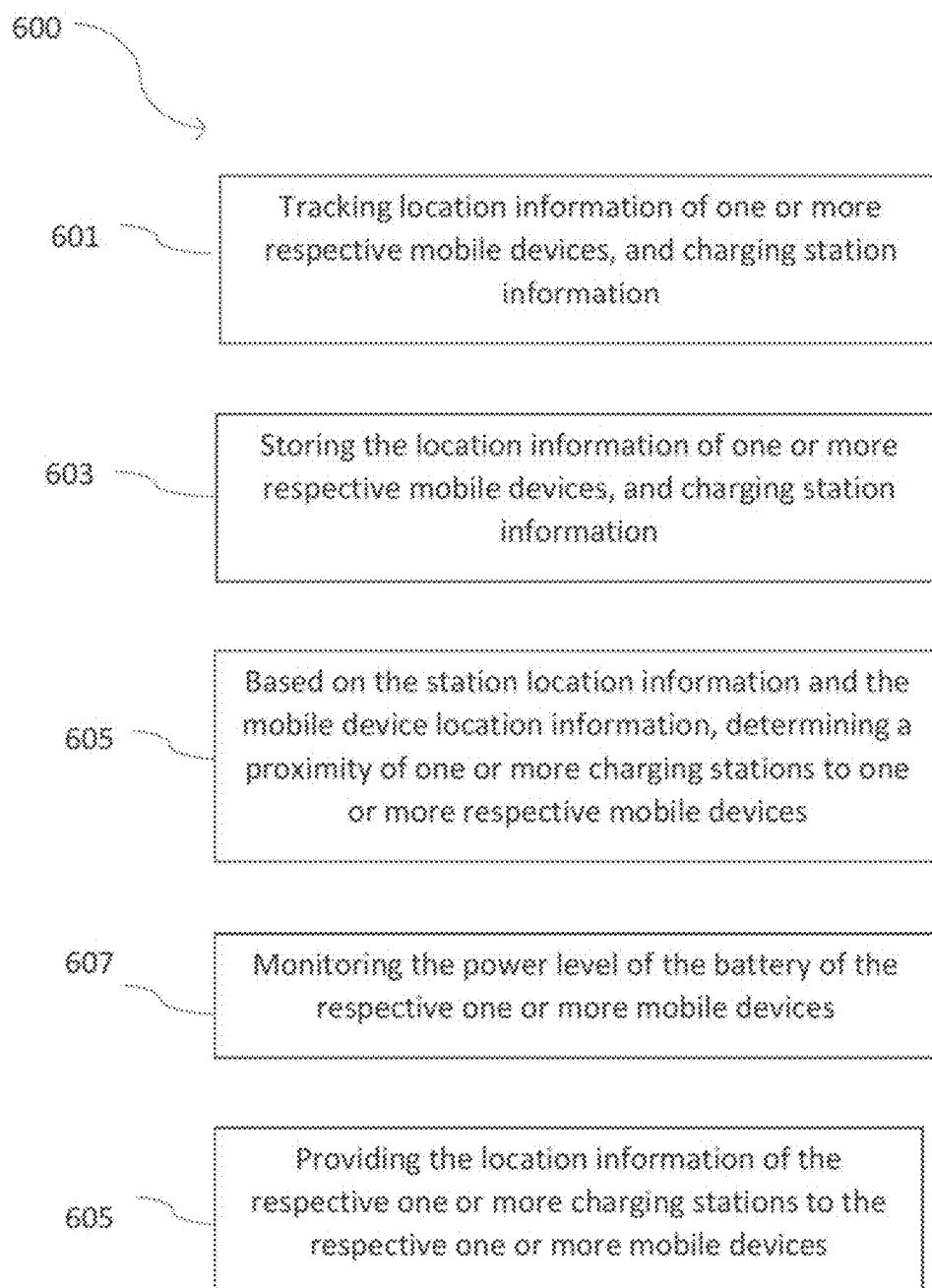
FIG. 10 is an exemplary method employed by the system according to embodiments of the present invention.

In accordance with one or more embodiments described herein, and with reference to FIG. 10, there is shown a methodology 600 operable by a system according to embodiments of the present invention. It is noted that numbers associated with the blocks of FIG. 10 do not imply a particular order in which the corresponding steps are to be performed according to the method 600.

In FIG. 10, step 601 includes having location information of one or more respective mobile devices, and charging station information. Step 603 may include having the location information of one or more respective mobile devices, and charging station information. Based on the station location information and the mobile device location information determining at step 605, a proximity of one or more charging stations to one or more respective mobile devices. Step 607 may include monitoring a power level of the battery of the mobile device. Step 609 may include alerting a mobile device user and providing the location information of the respective one or more charging stations to the mobile device. The location information may be provided to the mobile device based on a power level of the battery of the mobile device decreasing to a certain power level and/or based on a determined proximity of one or more charging stations to the one or more mobile devices.

Further, the mobile app may provide, such as on the map, or in a list or secondary window in conjunction with the map, an indication of one of the registered businesses with local charging stations available and which are making special offers, such as sales, coupons, targeted offers based on the user's history (in the mobile app and/or on the device more generally), and/or unique deals for users of the present invention.

The aforementioned mobile app may serve to monitor a mobile device charge, and alert a user to a need for recharge, i.e., the disclosed mobile app may be a stand-alone mobile app for alerting a user to a low device battery. The charge threshold for an alert may be predetermined, such as by being preset in the phone or app, or entered by the user, as discussed herein.

Once the user selects one of the registered businesses on the mobile app, the user may seek out and/or be directed to the selected business. Upon arrival, the user may or may not be provided with advertising at the charging station, such as by a display associated with the station. Further, the user may be asked, such as via the same display or via a second display, to enter user information which provides security for the user's device once placed into a charging unit. Additionally or alternatively, the charging unit may secure the device by a physical key.

Via any user-entered information and/or via a profile entered by the user (such as into the mobile app), and/or via user actions, a user profile may be created. For example, redeemed deals and special offers made in the mobile app may be tracked by the disclosed system as an indication of user product and service preferences. The profile may be maintained by the system discussed above, and may allow for targeted marketing, both of the charging services discussed herein, and of third-party goods and services, such as those provided by the registered business and/or by other businesses. For example, geo-targeted ads may be offered via the mobile app.

Moreover, the accumulation of user data from the mobile app and phone battery, in conjunction with charging behavior at locations, creates an opportunity to develop user profiles. These profiles may include recency and frequency of visits to locations, charge duration, charging tip type, battery life by device type, by usage type, or the like. The data may thus serve as a research tool for device manufacturers, researchers or marketers, or as a purchase tool (i.e., which device has the best battery life, to the extent the data is made publicly available) for a user and/or for a non-user.

Figure 11:
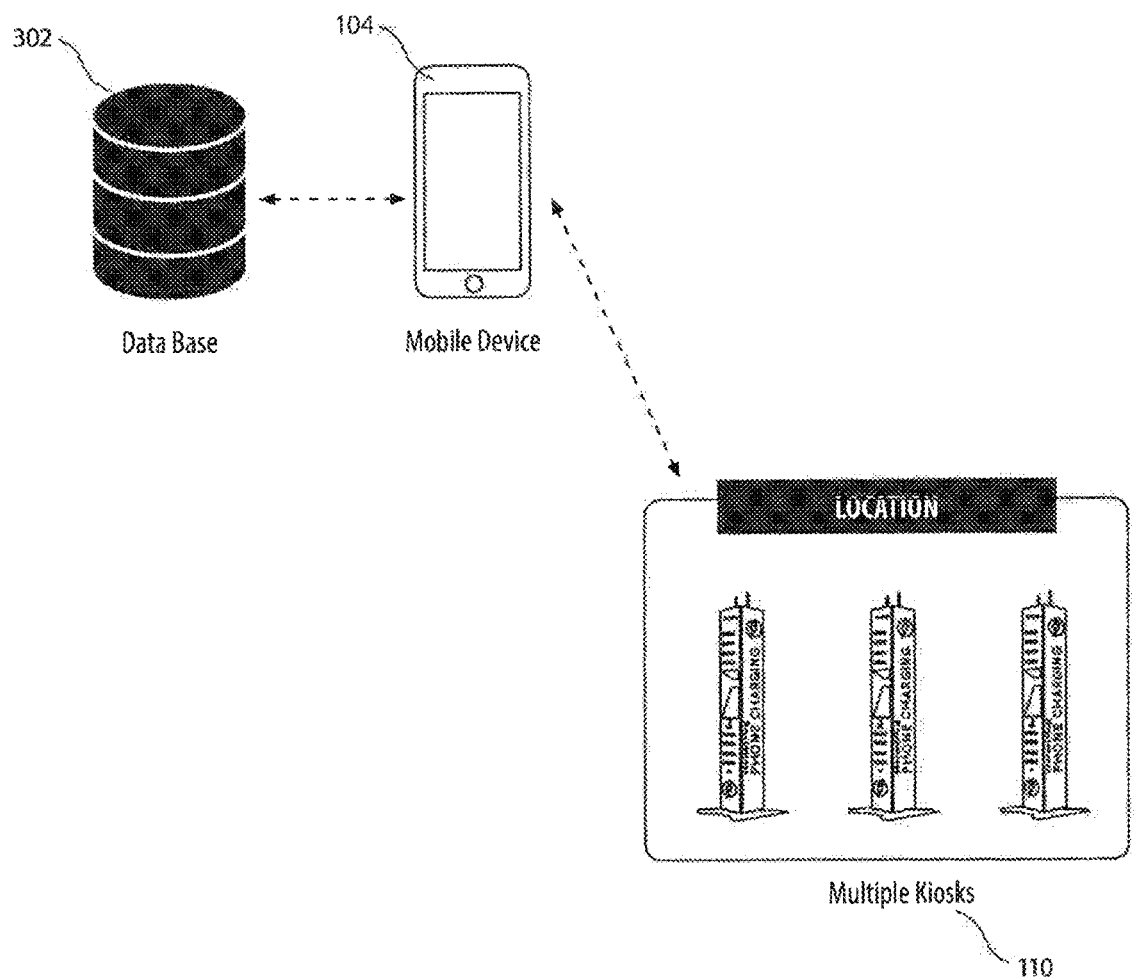
FIG. 11 is an exemplary embodiment of the present invention.

In accordance with the foregoing, and as illustrated in FIG. 11, the disclosed embodiments may provide a network, such as may be formed by the disclosed charging stations 110, businesses (which, although shown in the figure as a "shop," may be any type of public or private business), and mobile devices 104, and, more particularly, as between communicative interconnectivity, advertisers, and user mobile apps. In an example of the disclosed systems and methods, a user may download a mobile app to his device, and may set a 20% level for battery recharging—meaning the user will receive an alert from the mobile app once his phone has less than a 20% battery charge.

By way of non-limiting example, after charging his phone for the first time, the user may be prompted via SMS or other method to download the mobile app. Further, the mobile app, and/or participation in the disclosed systems and methods, may be free for consumers, and available for a monthly fee to the registered businesses. Alternatively, a fee may be charged to consumers, or a charge to consumers may vary based on consumer actions. For example, a user's willingness to accept/view/watch one or more advertisements or promotions may cause a modification, such as a decrease or elimination of, any fee due from consumers for the mobile app, the mobile app services, or the charging services. Moreover, the present invention may be free to some businesses, such as those willing to sponsor or host charging units, but may be available at a fee to other businesses.

By way of further, non-limiting example, the charging units/kiosks/lockers discussed throughout may be placed in a registered business subject to, for example, payment of rent. This and other costs to the charging unit provider may be recouped by charging consumers for the services discussed, by accepting sponsorships, by accepting advertisements or promotions to be provided to consumers (which may be from the registered business ultimately used by the user and/or from other registered businesses and/or sponsors) for a fee, and the like. Additionally, payment may be received for other occurrences, such as revenue sharing. For example, a credit card company, such as VISA, may sponsor a kiosk, and thereby the kiosk may be free to use for consumers who swipe a VISA card. For users who do not hold a VISA card, the use of the unit may be free to those consumers if they agree to apply (such as conveniently through an electronic interface at the kiosk) for a VISA card. Upon receipt of an application for a VISA card, VISA may pay a fee to the kiosk provider.

Kiosks/charging stations may be provided by any number of charging models. For example, in a first model, the kiosk may be leased, such as monthly. In such embodiments, maintenance may be provided as part of the lease, and other features, such as providing brand wrapping, may be provided for fees. In a second embodiment, a kiosk may be sold to a client. In such an instance, a charge may occur for any maintenance of the kiosk, as well as providing of other aspects, such as providing a brand wrap for the kiosk.

In yet a third model, the kiosk may be provided based on a branding or sponsorship model. In this model, a particular brand may pay to have a kiosk placed at a particular location, such as a retailer, or the brand may pay for data collected from kiosk usage. By way of nonlimiting example, such payment may be in the form of a monthly fixed fee, or based on data gathered through kiosk usage, or based on the number of users per month. The retailer may allow placement for free, or may request a revenue share with the provider of the kiosk. In such embodiments, maintenance may or may not be an additional charge to the paying brand, and wrapping of a kiosk for advertising purposes, such as on the outer portions of the kiosk, a header panel, such as a backlit header panel, of the kiosk, a kick plate or ad plate at the bottom of the kiosk, or the like, may again constitute an additional charge to the brand payer for the kiosk.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium, and preferably on a non-transitory computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Figure 12:
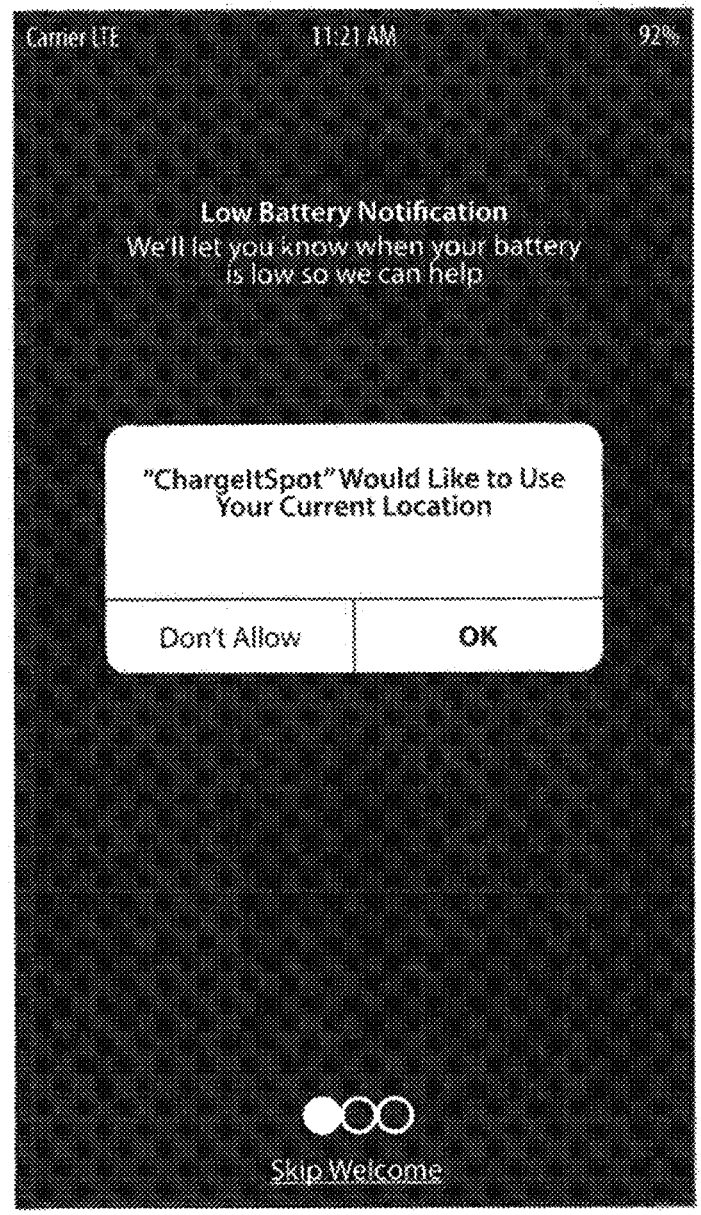
FIGS. 12-15 illustrate exemplary mobile app screens for the present invention.

As illustrated in FIG. 12, a graphical user interface ("GUI") of the mobile app associated with the present invention may be provided through an app which may be obtained through any convention means, such as through an app store, for example. Although certain features offered through the GUI may be activated and/or deactivated by the user at any desired time, the app may prompt the user to allow for location based services to provide the most useful user experience in relation to the features described more fully herein.

Figure 13:

The GUI may provide an indication of the charge capacity, as shown in FIG. 12, and the charge remaining in at least one battery and/or battery cell, associated with mobile device 104. The GUI may also include indicators as to page and/or content amount and the location of the user among such options. For example, as illustrated in FIG. 13, pagination of the GUI may be exemplified by the use of small circles which may allow the user to more easily navigate between screens of the GUI. Although many forms of navigation may be used, in a preferred embodiment, the user may toggle between GUI pages by swiping to the left and/or to the right.

Figure 14:
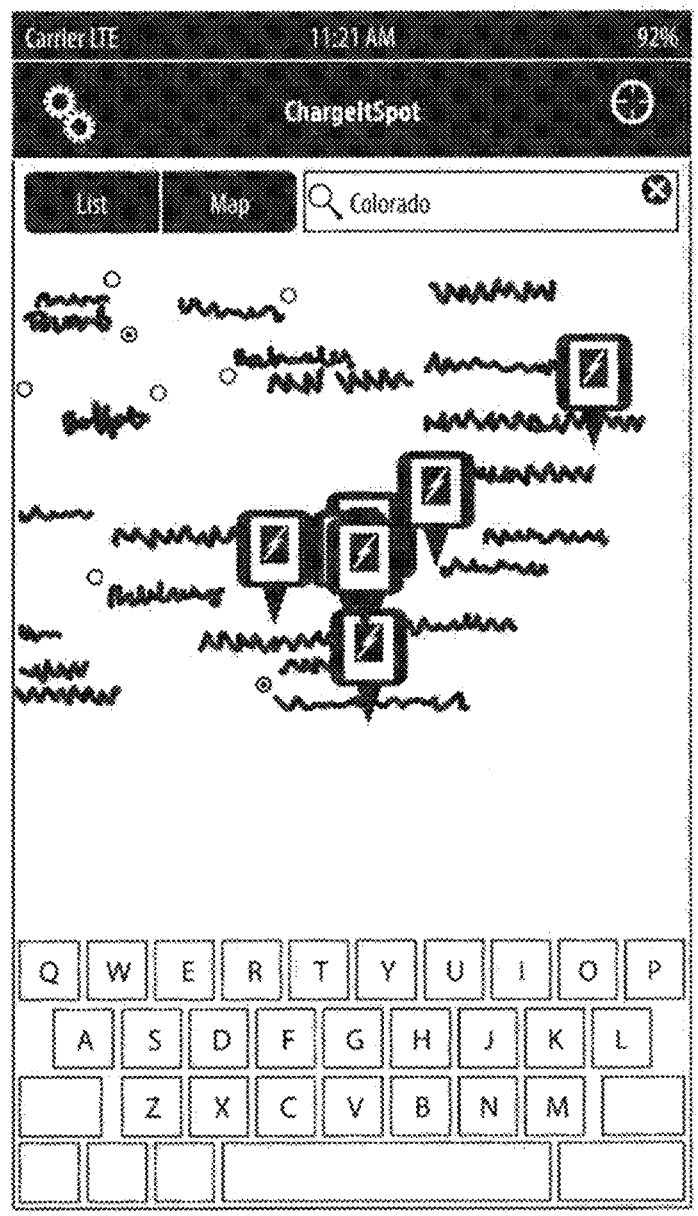

As illustrated in FIG. 14, search functionality may be presented through the GUI and used to identify the closest charging location to the user. If, for example, there are not locations within a defined range of the searcher, which range may be predefined or set by the user, the app may collect that information and allow such information to be collected by a third-party administrator to inform the administrator of user desired locations. Similarly, such information may allow for the delivery of ads based on the user's location and may allow for the delivery of ads outside the network of ads related to charging locations. Furthermore, a user may select a proximity distance which may be selected from a list having ¼ mile, ½ mile, 1 mile, 2 miles, 5 miles, and/or 10 miles as choices, by way of non-limiting example.

The exemplary disclosed process and system may include a safety system having safety components such as, for example, gloves, styli, shields, and other suitable safety components. For example as illustrated in FIG. 4C, the exemplary disclosed system may include a safety assembly 490. Safety assembly 490 may provide one or more safe and/or contactless techniques for users (e.g., consumers) to interact with stations or kiosks (e.g., phone charging kiosks) of the exemplary disclosed system. Safety assembly 490 may include a dispenser that may be provided on a station or kiosk housing and that may operate to dispense gloves that a user may wear while interacting with the exemplary disclosed user interface (e.g., a touch screen). The gloves may be dispensed manually or automatically by safety assembly 490. For example, safety assembly 490 (e.g., or the exemplary disclosed system) may include a motion sensor that detects a presence or approach of a user (e.g., or may detect when users wave their hands), and based on this detection safety assembly 490 may automatically dispense a glove or pair or gloves to the user. The gloves may be single-use gloves (e.g., latex, PVC, PVA, neoprene or any other suitable type of glove for preventing a transmission of bacteria, viruses, or other pathogens), which may provide a contactless experience (e.g., avoid direct contact).

Safety assembly 490 may also dispense contact devices such as styli, "hooks," or other similar contact devices similarly to the exemplary dispensing of gloves described above. A user may utilize the manually or automatically dispensed contact devices to press buttons on the exemplary disclosed user interface of the station or kiosk (e.g., screen) and/or to push a door (e.g., locker door) closed after a device such as a user phone is connected or disconnected (e.g., to a charging cable of the exemplary disclosed station or kiosk).

Safety assembly 490 may also include a glove, styli, and/or waste disposal bin that may be attached or mounted to the station or kiosk to provide an efficient and effective technique for a user (e.g., customer) to dispose of any materials used to facilitate touchless interaction. Users and/or venue operators may opt into one or more of the exemplary disclosed components of safety assembly 490 as add-ons (e.g., via entering input or making selections via the exemplary disclosed user interface) to utilize to reduce the spread of germs and viruses from the kiosk at a given venue. For example, users and/or venue operators may provide suitable payment to have access to the exemplary disclosed components of safety assembly 490 (e.g., and to pay for use of one-time use components of safety assembly 490) to reduce a probability of infection to a user or to users at a given station or kiosk located at a given venue.

The exemplary disclosed system may also include a shield component 495 disposed at any desired components, for example as illustrated at FIG. 4C. Shield component 495 may be for example a shield layer. For example, shield component 495 may be disposed at the exemplary disclosed user interface (e.g., touchscreen) and/or other touchable areas of the station or kiosk. Shield component 495 may be an anti-pathogen shield such as an anti-virus shield. For example, shield component 495 may be a layer that is mechanically attached (e.g., or magnetically attached) or adhered to surfaces of the station or kiosk. For example, shield component 495 may be formed from thin transparent or translucent (or opaque material). Shield component 495 may be formed from any suitable metallic or plastic material. Shield component 495 may include materials that may prevent pathogens such as viruses and bacteria from replicating or spreading, thereby rendering the pathogens inactive over a period of time (e.g., with no additional cleaning involved to maintain sanitization).

The exemplary disclosed process and system may include a location module. The exemplary disclosed location module may provide a functionality for verifying location functionality (e.g., on a tool menu of an exemplary disclosed graphical user interface such as a Tools Menu PM Workflow).

The exemplary disclosed location module may provide for when operators, users, and/or clients move an exemplary disclosed kiosk to a new location such as, for example, a new location within a venue (e.g., a same venue). Regarding such changes in location, the exemplary disclosed location module may substantially prevent disadvantages such as a precise location of a kiosk no longer being accurate in view of Internet resources or other resources (e.g., Google maps, website locators, mobile apps, and/or any other desired locator resources). For example, the exemplary disclosed location module may substantially prevent a change in location of a kiosk (e.g., being moved from a select coffee chain store to a location at an escalator, or any other move) from resulting in kiosk customers not being able to find the kiosk, which may potentially lower kiosk usage. The exemplary disclosed location module may help customers and/or technicians who service kiosks to find new locations of kiosks that have been moved. The exemplary disclosed location module may provide system users and operators with an additional and/or alternate process of being updated with changes to locations of kiosks in addition to being informed by a customer or field technician via phone, email, and/or any other suitable technique.

Figure 22:
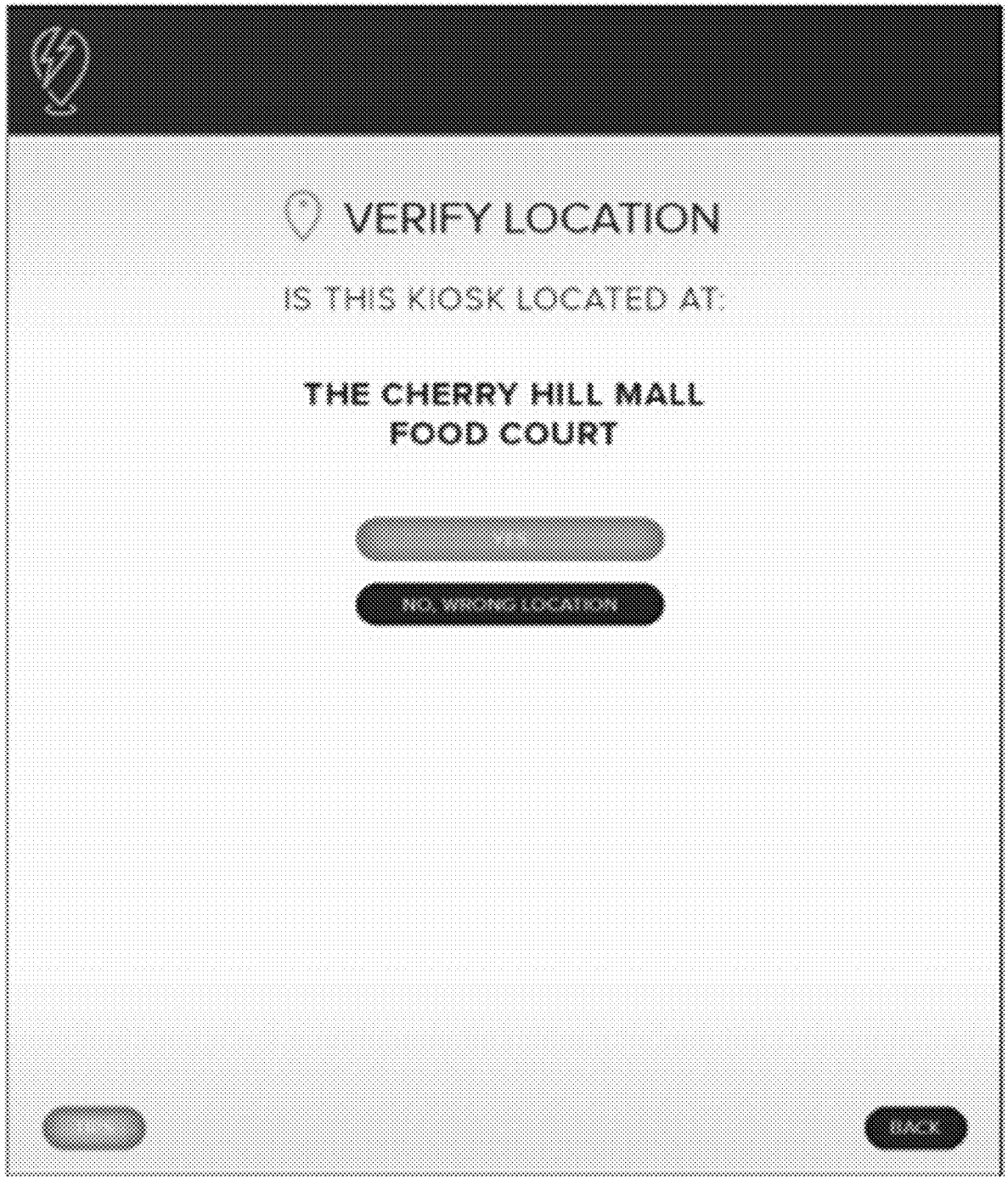
FIG. 22 illustrates an exemplary disclosed location module display for an exemplary disclosed user interface.

The exemplary disclosed location module and process may include using the exemplary disclosed user interface of the kiosk such as, for example, a Kiosk Tools Menu (e.g., special operator menu of a graphical user interface). The exemplary disclosed location module may periodically (e.g., weekly, bi-weekly, monthly, at each service time, and/or any other desired time period) query a field technician who is servicing the kiosk for location data. The exemplary disclosed location module may query an operator such as a service technician for location data each time the field technician accesses or logs on to a given kiosk (e.g., enters security credentials or uses any other digital, biometric, and/or mechanical access technique). For example, the exemplary disclosed location module may query an operator via a user interface (e.g., of the kiosk or a user interface of the operator) each time the operator accesses a given kiosk. FIG. 22 illustrates an exemplary location query for an operator, which may direct the operator to enter input indicating whether or not the kiosk is located in the location currently stored by the exemplary disclosed system. If the operator enters input indicating that the location has been changed, the exemplary disclosed location module may query the user for additional location data. For example, an operator may type in details about the location using an exemplary disclosed user interface (e.g., of the kiosk, operator, and/or any other suitable user interface). For example, the exemplary disclosed module may prompt the operator (e.g., technician) to upload one or more photos of the kiosk in its present (e.g., new) location. The operator may enter data using the Tools Menu of the exemplary disclosed user interface. The exemplary disclosed system may then be updated based on the data, with the updated data of the kiosk location being cascaded to some or all desired systems (e.g., kiosk website locator, mobile app, and/or any other desired data system may be updated).

The exemplary disclosed location module and process may also provide a suitable update data packet for poor connectivity locations such as, for example, a partial software update for poor connectivity locations. As new versions of the exemplary disclosed system are released, data updates such as software updates may be pushed to some or all system locations (e.g., kiosk locations). For example, the exemplary disclosed system remotely pushes data packets (e.g., software updates) to some or all locations (e.g., kiosks of the exemplary disclosed system's fleet). In at least some exemplary embodiments, an update data packet or package (e.g., a software package) may be up to 150 MB or more in size (e.g., and may include some or all elements of a software update).

Some locations (e.g., kiosk locations) may be located in areas with relatively low connectivity (e.g., for internet, Wi-Fi, data, cellular, and/or any other suitable system for transmitting data) and may be unable to receive an entire data packet (e.g., software package), which may result in a failure of the update. Because many or most elements of the software of the exemplary disclosed system (e.g., kiosk software) may not change from one release to the next release, the exemplary disclosed system may provide a reduced data packet. The reduced data packet may include data elements that have changed between given releases, and may not include data elements that have remained the same between given releases. The reduced data packet may be sent to some or substantially all locations (e.g., kiosks). For example, the reduced data packet may be sent to kiosks that have been identified to be in low connectivity areas for example based on data query and input similar to the exemplary disclosed location change process described above (e.g., regarding FIG. 22). Also for example, the reduced data packet may be sent to substantially all locations, for example including both locations that are in relatively good connectivity areas and location in relatively low connectivity areas (e.g., and/or any desired portions or subsets of locations may receive complete software updates or reduced software updates). The exemplary disclosed location module may thereby reduce operational costs and may also efficiently provide the latest software updates to a substantially entire fleet of locations. For example, the exemplary disclosed location module may avoid costs associated with sending a technician to manually update software of locations in relatively low connectivity areas.

The exemplary disclosed location module and process may also provide for efficient and effective use of international phone numbers. The exemplary disclosed system may use a user's mobile phone number (e.g., 10-digit mobile number) that may be entered by a user via a location user interface (e.g., a touchscreen of a kiosk user interface) to gain access to a locker. The phone number may for example be a main or primary user identifier (e.g., key identifier). In addition to querying users to enter 10 digits on an "Enter Mobile" page or other suitable input field, the exemplary disclosed system may also provide international-location-based data entry based on a nation in which a kiosk is located. For example, many international or foreign mobile numbers include a different number of digits than a 10-number U.S. mobile phone.

The exemplary disclosed location module and process may include a process for receiving entry of international phone numbers. For example, the exemplary disclosed module may query a user for a mobile number based on predetermined nation data associated with a given kiosk, based on GPS or other location-positioning data or sensing of a given kiosk, and/or based on a user inputting country location data in response to an input inquiry made by the location module via the exemplary disclosed user interface. For example using the exemplary disclosed location module and user interface, a user may select a country code and/or any other suitable entry format based on selecting a nation or other suitable data from the exemplary disclosed user interface (e.g., pull-down on a touch-screen of a kiosk). A user may thereby select a mobile phone data entry field having a correct number of digits for that user's nation. In at least some exemplary embodiments, a user may select from a country code or other list to be provided with a proper format for entry of the user's mobile number using the exemplary disclosed location module and user interface.

The exemplary disclosed location module and process may automatically detect a locale (e.g., a country) in which the user is located and automatically present a correct format for entering a mobile number. For example if the kiosk is located in Mexico, a default format for Mexican phone numbers may be presented to users via the exemplary disclosed location module and user interface. Also for example, a user from the U.S. visiting Mexico that may be using the same kiosk may press an "international button" on the exemplary disclosed user interface to enter for example a number having 10 digits (e.g., U.S. mobile phone format) so that the user may still utilize the kiosk in Mexico using a U.S. phone number while the user is traveling.

The exemplary disclosed location module and process may also provide for reliable and secure entry of a mobile phone number to the exemplary disclosed system. To provide for security, when a phone number is entered by a user via the exemplary disclosed user interface (e.g., a touch-screen), the digits may appear as asterisks in a displayed phone number field. The exemplary disclosed location module and process may reduce a probability and/or substantially prevent a probability of a user making an error (e.g., mis-keying or mistyping) entering the user's number and not being able to detect the error because the phone number may be obscured by asterisks or other suitable objects. The exemplary disclosed location module and process may thereby reduce a probability and/or substantially prevent a probability of the user being unable to later retrieve the user's phone because the phone number entered upon retrieval may not match an incorrect number first entered by the user. For example using the exemplary disclosed user interface, the location module may for example provide an option (e.g., display an eye icon on a screen) for displaying either asterisks or digits. Using this option (e.g., using the graphical user interface element to toggle back and forth between digits and asterisks), users may see the numbers they have entered in the case they desire to verify a number. For example, the exemplary disclosed location module may instruct the user to toggle back and forth between asterisks and digits to confirm the entered number. The user may use the option (e.g., tap an "eye" icon again or other suitable element) to hide the numbers as asterisks or other suitable objects for maintained security. Also for example, after a correct number of digits has been entered by a user via the user interface, the exemplary disclosed location module, via the user interface (e.g., keypad), may not allow the user to enter in additional numbers. For example, the exemplary disclosed system may subtly gray out the asterisks or digits (e.g., numbers) to provide a visual cue to the user that no additional digits may be entered (e.g., based on the predetermined number of digits for a selected country for example as described above being entered).

Figure 15:
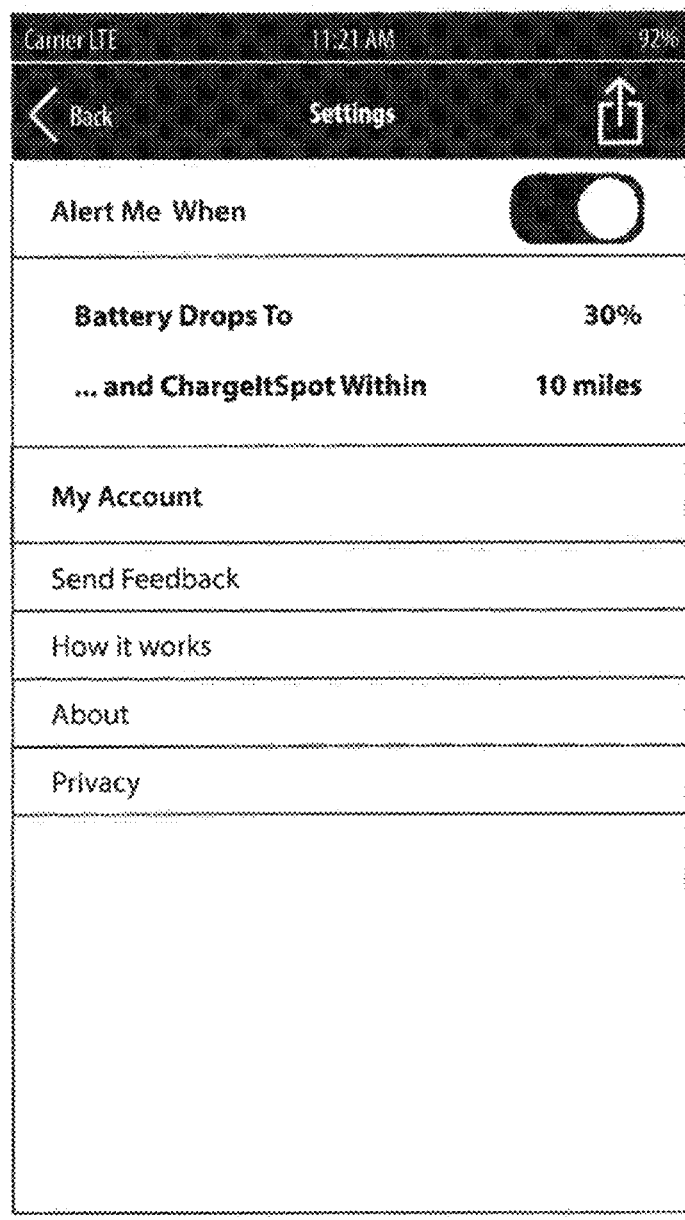
Figure 16:
FIGS. 16-20 illustrate exemplary kiosk user interface screens of the present invention.
Figure 17:
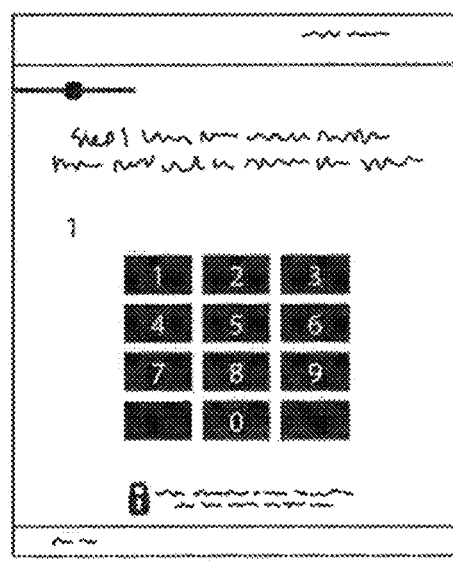
Figure 18:
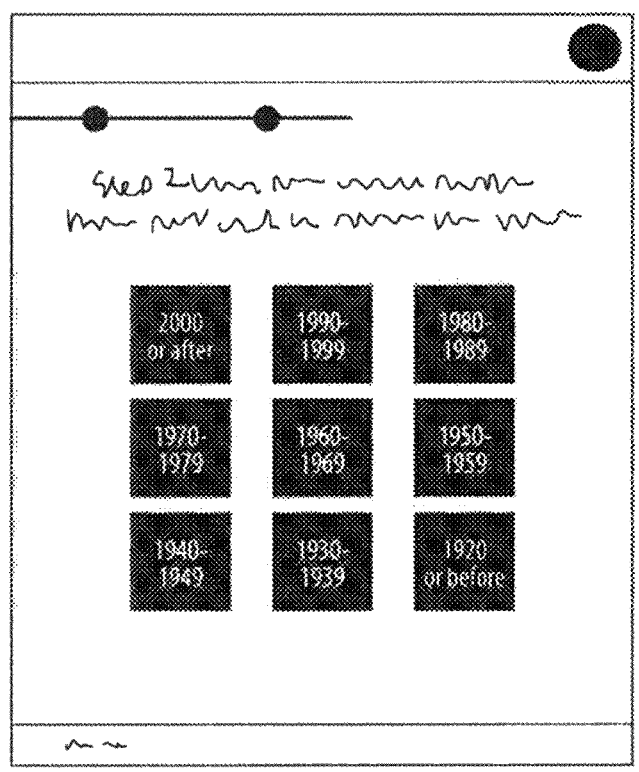
Figure 19:
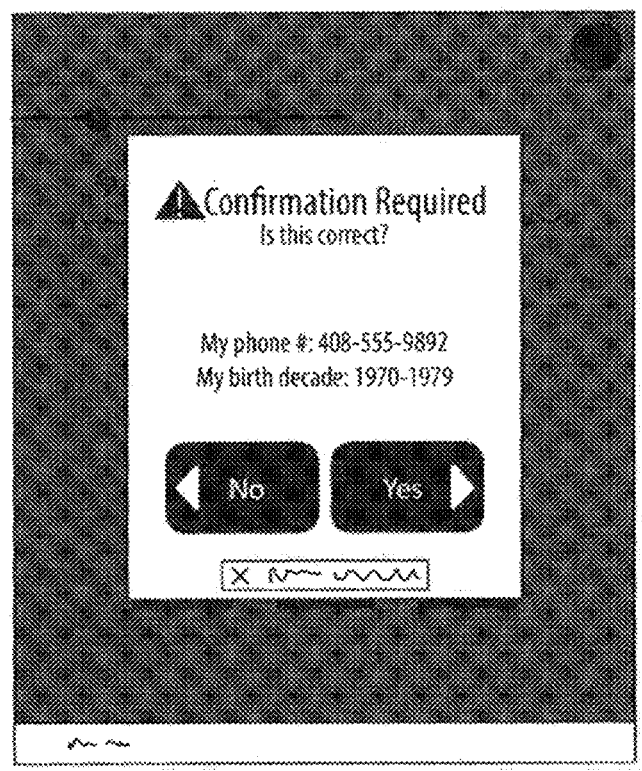
Figure 20:
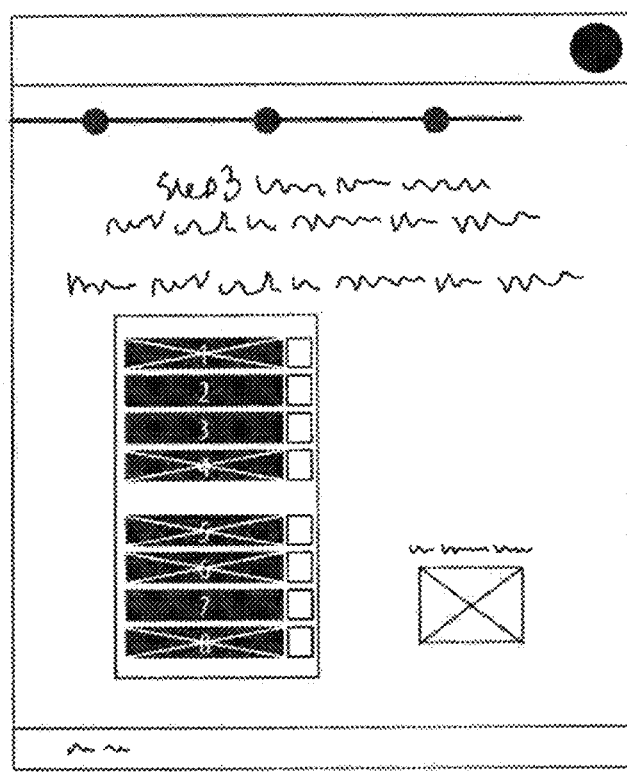

As discussed herein, the battery level of the phone may be brought to the attention of the user and, as illustrated in FIG. 15, such alerts may be customized by the user. The user may activate and deactivate any alerts and may, for example, select a desired level of battery charge for which an alert may be triggered. For example, a user may choose that an alert as to battery life be presented when the phone has only about a 30% charge remaining. Although any level of charge may be used to activate an alert, a user may select between 10% and 80% such as in increments of 10%. As would be appreciated by those skilled in the art, a battery may fluctuate over time and the percentage charge may be considered an approximation rather than an absolute direct measurement of remaining charge.

Administrative and operational alerts and notifications may be sent to and from each kiosk or subsets of kiosks, and to or from devices of authorized users, such as technicians, from one or more administrative servers using known communication methodologies, such as SMS, email, group email, mesh network communications, and the like. Such alerts or notifications may also be provided locally, via local communications, such as bluetooth or NFC, from an individual kiosk, such as in the event of a power outage. Accordingly, alerts may occur "online", and "off-line".

Alerts may include, by way of nonlimiting example, alerts and notifications related to the customer or Photo Verification as discussed throughout. Such customer service alerts may include, by way of example, management alerts regarding the start and end of employee shifts to provide customer service, notifications related to PhotoVerification (such as non-resolution of a PhotoVerification using automated systems within a given time frame), and the like.

Automated alerts may streamline the process of remotely managing a fleet of hundreds or thousands of kiosks by immediately notifying the operations and management team of issues that either require attention, or by confirming successful ongoing operation of the fleet. By way of non-limiting example, alerts may include management alerts regarding the start and end of customer service employee shifts; customer service alerts related to PhotoVerification and/or non-resolution of a PhotoVerification in an acceptable amount of time; operational alerts when a kiosk is offline or a certain hardware component is failing; or the like.

Alerts may also include, by way of example, exception alerts, such as may be unique to a store, kiosk, or the like. Other reports and alerts may include, by way of nonlimiting example, a daily charge report indicating a number of charges by kiosk, by day; an extended charge report, such as may include a number of lockers by kiosk that are not cleared within a day; environmental reports, such as high or low temperatures; movement reports, such as, due to movement or tilting of a kiosk; hardware or power malfunctions; all lockers full; firmware update needed; data usage or storage availability alert; and general data logs, such as may include security opening of a kiosk using, for example, a rear keypad, locker doors open over time limit, and the like.

The exemplary disclosed process and system may include a control module that may perform artificial intelligence and machine learning operations. The exemplary disclosed control module may perform a plurality of operations for providing efficient and effective control of the exemplary disclosed system.

The exemplary disclosed control module may provide usage monitoring and control of the exemplary disclosed system. Based on a venue or a location at which a station (e.g., a charging station or "kiosk") is located, the station may be utilized (or heavily utilized) during certain times and not utilized (or not heavily utilized) during other times. For example, a station (e.g., kiosk) may be utilized during a venue's open hours or during peak times (e.g., heavily utilized during peak times). The exemplary disclosed control module may monitor (e.g., keep track of) and store data indicating the internet connectivity of a plurality of stations (e.g., a worldwide fleet of kiosks). For example, the exemplary disclosed control module (e.g., including kiosk software) may provide one or more data transmissions (e.g., may employ a series of "heartbeats" such as "adaptive heartbeats") to notify or alert a server or other suitable component of the exemplary disclosed system that the station such as a kiosk is online and functioning properly. The one or more transmissions may include data (e.g., a small, discrete packet of data) that may be sent back and forth between the kiosk and a server or other suitable component of the exemplary disclosed system. These transmissions (e.g., heartbeats) may also define a speed or interval at which configuration updates may be shared between the station (e.g., kiosk) and a server or other component of the exemplary disclosed system. This exemplary disclosed speed or interval may be the time it may take for data (e.g., a new charge transaction) to reach the server or other suitable component of the exemplary disclosed system from the station or kiosk. These transmissions (e.g., heartbeats) may be sent at any regular interval, such as every 30 seconds or any other desired interval, and/or any other desired regular or variable intervals (e.g., any desired pattern or predetermined schedule).

The exemplary disclosed control module may operate to vary the transmissions (e.g., heartbeats). For example, in cases in which the transmissions (e.g., heartbeats) are partly or primarily used to troubleshoot station or kiosk issues by operators (e.g., a team of remote employees who work during a certain time interval each day), the exemplary disclosed control module may include software that may be configured to reduce a frequency of transmissions (e.g., heartbeats) outside of a desired interval (e.g., "working hours" interval) or increase the frequency of transmissions within the desired interval (e.g., "working hours" interval). The exemplary disclosed control module may also include software that may be configured to allow the transmission interval (e.g., heartbeat interval) to be adjusted based on any desired factors such as, for example, a time of day, type of venue, user behavior, usage patterns at a kiosk, and/or any other suitable factor. The exemplary disclosed control module may thereby reduce an operation cost of the exemplary disclosed system because for stations or kiosks that achieve connectivity through 4G LTE or other cellular data techniques, each transmission (e.g., heartbeat) may incur a data cost and such transmission may be reduced by an operation of the exemplary disclosed control module. For example, the exemplary disclosed control module may include software that may be programmed to extend a transmission or heartbeat interval, such as from once every 30 seconds during a desired interval (e.g., predefined "working hours") to once every 5 minutes outside of the desired interval (e.g., outside of predefined "working hours"). As another example, during a venue's closed hours or off-peak hours, such as when the kiosk has not been utilized in the past hour, the exemplary disclosed control module may include software that may be programmed to decrease the transmission or heartbeat frequency to a station or kiosk located in that venue to reduce costs (e.g., data costs). In doing so, the exemplary disclosed control module may operate using artificial intelligence and machine learning processes for example as described herein.

In at least some exemplary embodiments, the exemplary disclosed control module may vary the frequency of transmissions based on usage of a station or kiosk by users. For example, in the event that a user utilizes a station or kiosk during a period in which the transmissions or heartbeats are sent relatively less frequently or at extended intervals (e.g., outside of "working hours" of a venue in which the station or kiosk is located), the exemplary disclosed control module may operate to send transmissions or heartbeats at greater frequency (e.g., reduce the time interval or period between transmissions) immediately and/or shortly after the user begins to interact with the kiosk. The exemplary disclosed control module may continue to send transmissions at an increased frequency following the user interaction. For example, the exemplary disclosed control module may maintain a "standard" transmission frequency (e.g., "working hours" heartbeat frequency) for any desired time period following the user interaction at the kiosk such as, for example, a predefined time period of 60 minutes or any other suitable time period.

The exemplary disclosed control module may provide for connectivity monitoring and data usage monitoring to reduce monthly connectivity data usage and expenses. For example, when the exemplary disclosed system includes a plurality of stations (e.g., a fleet of interconnected kiosks) that may be partially or primarily dependent on 4G LTE and other data connectivity services, it may be desirable to monitor data usage to reduce monthly data expenses. Accordingly, the exemplary disclosed control module may utilize any suitable tools or algorithms (e.g., business intelligence tools) to continuously monitor data usage across the plurality of stations (e.g., the fleet) in real-time or near real-time. The exemplary disclosed control module may send or transmit alerts (e.g., automatic alerts) when a data usage at a particular location exceeds a predetermined or pre-defined threshold. For example, the exemplary disclosed control module may transmit the exemplary disclosed automatic alert to a plurality of operators (e.g., a pre-defined group of employees) or users, who may be tasked with the job of investigating the data overage and identifying a root cause, to prevent further overages. The exemplary disclosed control module (e.g., and/or system operators) may operate to make any suitable change to correct one or more issues causing the data usage overage such as, for example, making a software modification, recommending a kiosk location change within a venue, recommending a hardware modification or upgrade, or any other suitable action (e.g., including operating using artificial intelligence and machine learning processes for example as described herein). Also for example, the exemplary control module may utilize any suitable tool or algorithm (e.g., business intelligence tools and/or machine learning processes) to track monthly data expenses to budget for future station kiosk expansions and planning.

The exemplary disclosed control module may provide alerts to operators and users such as, for example, a warning alert (e.g., sound and/or image) to direct a user's attention to a user interface (e.g., screen) of the exemplary disclosed system. A station (e.g., kiosk) of the exemplary disclosed system may provide a user flow that involves a user interacting with a user interface (e.g., digital screen displayed on a touchscreen). The exemplary disclosed control module may call a user's attention to a particular state of the kiosk (e.g., as illustrated on the user interface) or may provide instructions for a user to perform a desired action (e.g., to complete the user's charging transaction or to enhance or ensure security of the user's device). In selecting a warning, the exemplary disclosed control module may use artificial intelligence and machine learning processes for example as described herein. The exemplary disclosed control module may guide or influence user behavior for example by controlling a station (e.g., kiosk) to flash lights disposed in one or more cavities or lockers, display flashing or moving images or videos (e.g. GIFs) on a display of the exemplary disclosed user interface (e.g., on a screen), emit audio recordings or warning sounds that project from kiosk speakers, and/or any other suitable actions for providing an alert.

The exemplary disclosed control module may provide a plurality of tools for use by station or kiosk technicians (e.g., for mobile application use, inventory tracking, and/or after-hours or emergency visit assignments and tracking).

For example after a station or kiosk is installed at a venue, routine preventative and/or emergency maintenance may be appropriate to maintain the station or kiosk in a fully operational status. Although a portion of this maintenance may be performed by a venue staff in some cases, some of the maintenance may be performed by system operators (e.g., part-time or full-time employees, e.g. "field technicians"), who may receive instructions and inventory via the exemplary disclosed system (e.g., from a company or organization operating the exemplary disclosed system). These instructions may include data identifying parts or components of the station or kiosk to be investigated, replaced, or repaired, a time or due date by which each visit is to be completed, and/or any other suitable technician data. The exemplary disclosed system may utilize any suitable software or algorithms to assign field techs to a particular "work order," such as a computerized maintenance management software and/or machine learning processes.

While onsite at a station or kiosk location, an operator such as a field technician may log into the exemplary disclosed system via a user interface of the kiosk or the operator's user interface (e.g., based on running Kiosk Tools Menu software) using a secure code. This login to the exemplary disclosed control module may provide the operator access to diagnostic tools and data indicating components that are to be repaired via access to the exemplary disclosed user interface and system. The operator such as a technician may interact with the exemplary disclosed control module via any suitable user interface such as a kiosk touchscreen, a mobile app connected to the kiosk server, and/or any other suitable user interface for example as described herein. The operator may thereby receive instructions, input data including notes about their visit, request additional inventory, and/or transmit or receive any other suitable data from the exemplary disclosed control module.

The exemplary disclosed control module may thereby track parts inventory in real-time or near real-time while an operator (e.g. service technician) is onsite at a station or kiosk. The exemplary disclosed control module may utilize machine learning processes to develop analytical models to predict rate of failure of parts over time and/or future desired hardware inventory amounts. The exemplary disclosed control module may thereby provide forecasts for inventory and leverage bulk component purchases to achieve cost savings. The exemplary disclosed control module may also recommend allocation of resources for components identified with a relatively highest or high failure rate and/or overall failure cost to continue to improve a product offering and to reduce costs.

The exemplary disclosed control module may provide for management and/or assignments for work groups. The exemplary disclosed system may include a plurality of stations or kiosk (e.g., a system of interconnected kiosks), in which those stations or kiosks are tracked from a secure server by the exemplary disclosed control module. Further, a plurality of operators (e.g., including employees and/or field technicians) may each have unique login credentials to the server of the exemplary disclosed system. The exemplary disclosed control module, via a server or other component, may assign operators to a particular kiosk or set of kiosks, restrict access to a set of kiosks, and/or assign work on a particular kiosk to a user or set of users (e.g., via data transmitted to and from operators via the exemplary disclosed system). For example, the exemplary disclosed module may provide data to operators regarding installation of a kiosk in a new location or removal of that kiosk from its current venue and/or any other suitable instructions or data via a user interface and/or other components of the exemplary disclosed system. In doing so, the exemplary disclosed control module may operate using artificial intelligence and machine learning processes for example as described herein.

The exemplary disclosed control module may perform calculations and/or utilize machine learning to leverage a business intelligence tool to gain insight and perform analysis regarding kiosk usage and customer behavior. The exemplary disclosed control module may utilize a business intelligence tool (e.g., Looker) to analyze data including kiosk usage and customer behavior. Using machine learning processes, the exemplary disclosed control module may analyze and identify optimal installation venues for future expansion, identify trends such as charging trends over time, identify, monitor, and analyze a status of routine software updates, and/or receive or transmit notifications and alerts regarding kiosks (e.g., of a fleet) that are to be serviced.

The exemplary disclosed control module may operate to perform uptime and/or downtime calculations. For example, the exemplary disclosed control module may perform calculations to determine (e.g., tabulate) and provide data of an amount and/or percentage of time during which a kiosk may be online and/or available for users (e.g., uptime) over a given period of time. Also for example, the exemplary disclosed control module may perform calculations to determine (e.g., tabulate) and provide data of an amount and/or percentage of time during which a kiosk may be offline and/or unusable for users (e.g., downtime) over a given period of time. The exemplary disclosed control method may automatically calculate uptime and downtime based on any suitable factors such as, for example, connectivity, power outage, parts failures, screen errors, and/or any other suitable criteria. The exemplary disclosed system may operate to collect or derive operational time periods (e.g., store hours) from any suitable data source such as, for example, a live API/data feed and/or web-based services (e.g., Google Location). For example, the exemplary disclosed control method may define downtime using any suitable parameters such as, for example, excluding instances of lost power connectivity outside of business hours (e.g., the exemplary disclosed control module may perform a downtime calculation according to this and/or other parameters). The exemplary disclosed control module may operate to transmit data of the exemplary disclosed calculations and analysis (e.g., percentages over time, discrete instances of downtime, and/or any other desired analysis) to users (e.g., clients) via components of the exemplary disclosed system.

The exemplary disclosed control module may operate to control access to a user's personally identifiable information (e.g., PII). For example as described further below, the exemplary disclosed control module may provide for role-based restriction of access, a "right to be forgotten," and/or safeguarding of data exchange between users. The exemplary disclosed control module may control access to PII using artificial intelligence and machine learning processes.

The exemplary disclosed control module may operate to provide role-based restriction of access by users to client data and/or any operation features. The exemplary disclosed system and method may be utilized by operators and/or administrators (e.g., operators of the exemplary disclosed system), users (e.g., end users or customers who interact with system components such as a station or kiosk), and clients (e.g., business entities and/or "brands" that may be clients of the operator or administrator of the exemplary disclosed system; e.g., business entities such as retailers). Per client input request (e.g., and/or an end user request), predetermined algorithms, operator instructions, and/or any other suitable instructions, the exemplary disclosed control module may operate to restrict access to a particular end-users (e.g. customers) PII. For example, access to a given user's PII may be restricted via algorithm (e.g., software rules), by which a group of system operators and/or administrators may be given access to that given end user's (e.g., customer's) PII for a defined or predetermined period of time. In at least some exemplary embodiments, data and reporting for administrators and/or operators who are excluded from access to the given end-user's PII may be modified to hide some or substantially all PII for the given end-user's PII (e.g., for one or more particular clients or client class). For example, by using logical database separation, access by an operator and/or administrator to any end-user (e.g. customer) PII may be restricted by role, by brand, or other techniques so that operators and/or administrators have access to end-user PII as per their role and other configured access rules.

The exemplary disclosed control module may operate to provide "right to be forgotten" or "right to deletion" processes (e.g., software processes). For example, the exemplary disclosed control module may operate to maintain compliance with and respond to requests under the California Consumer Privacy Act (CCPA), whereby California consumers have the right to ask entities such as companies regarding what information is collected about them, and for companies to either forget or delete all of their information (e.g., PII) and not to sell their information. The exemplary disclosed control module may operate to both comply with and also balance CCPA criteria with other criteria such as business reasons as to why a user's (e.g., person's) data may not be immediately deleted from the exemplary disclosed system (e.g., user information is maintained for a certain period of time after transactions are made so that owners or operators of the exemplary disclosed system may respond to alleged fraud or theft situations). Accordingly, when the exemplary disclosed control module receives a client request or a user request (e.g., consumer request) such as an official request (e.g., a request under CCPA, General Data Protection Regulation (GDPR), Nevada Senate Bill 220 "SB220," or any other request made under a law or other suitable policy enacted to protect consumer privacy), the exemplary disclosed control module may first evaluate (e.g., confirm) that user based on the user's phone number, email address, and/or any other desired identifying information. If the exemplary disclosed control module identifies the user (e.g., based on the user's phone number and/or email address), the exemplary disclosed control module determines (e.g., automatically detects) when that user's last or most recent transaction was with a station or kiosk of the exemplary disclosed system. If the time elapsed since the last or most recent transaction exceeds a predetermined or certain threshold (e.g., 3 months or any other desired time period), then the exemplary disclosed control module may operate to delete all of that user's information from the exemplary disclosed system (e.g., that user's information is automatically deleted from multiple tables and/or all databases of the exemplary disclosed system). If the time elapsed since the last or most recent transaction does not exceed the predetermined or certain threshold, then the exemplary disclosed control module will operate to maintain the information until the threshold is reached, and then delete the data as described above. If the user's information is not yet deleted (e.g., the threshold has not been reached) after that user submits a request, and that user transacts with the exemplary disclosed system again before the threshold time period is reached, then the exemplary disclosed control module may extend the scheduled deletion date so that the full threshold time period is reset (e.g., the threshold time period is reset to the full time period, e.g., the full 3 months before it is deleted).

The exemplary disclosed system may also share user data (e.g., PII) with third parties such as clients or sponsors. If a user opts out of sale of information (e.g., future information) for example by entering such input to an exemplary disclosed user interface, the exemplary disclosed control module operates to prevent sharing of that user's information (e.g., PII). For example, the exemplary disclosed control module may operate to exclude that user's data from data transmission (e.g., automated data extracts) that may be sent to third parties that may contract with an owner or operator of the exemplary disclosed system to have access and use of customer information. In at least some exemplary embodiments, the exemplary disclosed control module may add a flag (e.g., make an indication in a data field indicating opt-in or opt-out) to the user's identifier (e.g., mobile number) that flags that user's data (e.g., records and information) from being transferred outside of the exemplary disclosed system (e.g., passed to a third party that may for example be paying for access to information). The exemplary disclosed control module may thereby operate to automatically control data that falls under a right-to-be-forgotten request and/or a do-not-sell request (e.g., a CCPA request, a GRPR request, Nevada Consumer Rights policies, or any other request made under a law or other suitable policy enacted to protect consumer privacy) to reduce or substantially avoid costs associated with manual handling and processing of such requests.

The exemplary disclosed control module may further operate to safeguard transfer of data (e.g., PII) between users (e.g., clients such as business entities). For example, logical separation may be provided in the database between business entities (e.g., clients). In at least some exemplary embodiments, clients may also be "users" of the exemplary disclosed system, and for example by logging in would be able to view information related to their business entity (e.g., but not other information such as other clients, business entities, and/or client users.) The exemplary disclosed control module may operate to control (e.g., safeguard) transfer of data in system storages such as cloud-based storage (e.g., storage facilities) to selectively prevent sharing of some or substantially all user data (e.g., PII) between users of the exemplary disclosed system. The exemplary disclosed system and method may not display data of a given client when another client is logged in (e.g., may not display a given client's data to other clients). For example, the exemplary disclosed control module may operate to substantially prevent an information security breach and/or any other undesirable data exchange. For example, the exemplary disclosed control module may include elements of a graphical user interface of the exemplary disclosed user interface that may include a layer that separates different classes of information. For example, substantially all configuration details (e.g., all information and data) may be created and stored in a first layer (e.g., a "Brands" layer), while a second layer (e.g., a "Partners" layer) may include information that may be transferred. Transaction level data may be associated with the first level (e.g., "Brands"). For example, each brand may be mapped to a single "Partner," and multiple "Brands" may be assigned to the same partner. Users and/or operators having a relatively high or highest-privileged administrative roles may access the second (e.g., "Partner") level and designate where user data is to be sent to and at what frequency. The exemplary disclosed control module may thereby operate to control data transfer and protect transaction-level data (e.g., user PII) from being shared except as designated on the "Partner" level (relatively high or highest-privileged administrative roles) of the exemplary disclosed system.

The exemplary disclosed control module may operate to query for and obtain data regarding graphical user interface and user experience (UI/UX) modifications and designs. For example as changes are made to UI/UX of the exemplary disclosed system by system operators and/or based on machine learning processes of the exemplary disclosed control module, data of the UI/UX designs may be provided to a third party user (e.g., market research firm) in real-time or near real-time. The third party user may then transfer data including feedback information (e.g., proposed changes or comments) back to the exemplary disclosed control module, which the control module may utilize to further update the UI/UX (e.g., based on operator input and/or artificial intelligence operations).

The exemplary disclosed control module may operate to control data transfer and data reporting for example by generating and transferring data including automated reports having actionable operational information. For example, the exemplary disclosed control module may perform analysis, calculations, and/or machine learning operations using user data to generate automatic reports (e.g., based on predetermined criteria, operator input, and/or machine learning) to notify one or more operators (e.g., various operators and/or team of operators) of performance and/or operational issues so that the operators may proactively address the issues if desired. For example, the exemplary disclosed control module may generate one or more reports including data of an amount of time taken for each operator (e.g., customer service representative logged into the exemplary disclosed system) to respond to a call. Based on data including averages over time, the exemplary disclosed control module may provide data, analysis, and recommendations that can be used to train and help operators (e.g., team members) to evaluate and improve their performance. Also for example, the exemplary disclosed control module may generate one or more reports including data of an amount of time taken for data to be transferred (e.g., for information to be passed from a station or kiosk to a remotely-located server of the exemplary disclosed system). Based on the data, the exemplary disclosed control module may provide data, analysis, and recommendations that can be used to determine connectivity issues at venues, which may adversely impact user's ability to conduct transactions on the stations or kiosks.

Also for example, the exemplary disclosed control module may generate one or more reports including data of schedules and timing for sending notification reports on a distinct cadence (e.g., daily, weekly, monthly) or schedule to a specific group or groups of operators, users, and/or third parties. Based on the data, the exemplary disclosed control module may provide data, analysis, and recommendations that may be used to identify operators (e.g., employees) who are responsible for and/or suited (e.g., best suited) for resolving an issue may receive notice of that issue in a timely manner. Further for example, the exemplary disclosed control module may control reports to be generated and/or transmitted when desired criteria is met (e.g., when a new data point is available for the report).

The exemplary disclosed control module may operate to provide a fleet failure notification or alert. The exemplary disclosed control module may operate to transfer data including a notice or alert of a failure of a plurality of stations or kiosks (e.g., a fleet failure) to one or more operators (e.g., notify certain team members when certain types of fleet failures occur). For example if a certain percentage of stations or kiosks go offline within a predetermined time (e.g., certain number of minutes), a first subset of operators (e.g., a "Business Continuity" team) may be notified with a first data transmission or message, and/or a second subset of operators (e.g., an entire team) may receive a second data transmission or message (e.g., a different notification message, such as a more general message).

The exemplary disclosed control module may transfer data (e.g., send notifications) by one or more suitable techniques such as, for example, an email, a WhatsApp channel, a text or SMS message, and/or any other suitable communication system that may communicate with the exemplary disclosed system. When the percentage of stations or kiosks that is online goes back above a certain threshold, then the exemplary disclosed control module may generate a different notification for any desired subsets of operators (e.g., to different groups of people). For example, the exemplary disclosed control module may transfer data (e.g., notify) relatively large groups of operators (e.g., people) in the event of a fleet failure because the fleet failure may be caused by a software or system-wide failure that is to be remedied by those operators (e.g., individuals) as soon as possible. Also, users (e.g., clients) may also notice the fleet failure, and therefore the exemplary disclosed control module may operate to notify operators (e.g., team members) so that they may be prepared to interface with clients regarding the fleet failure and/or any other related issues.

The exemplary disclosed control module may operate to introduce new technology available in the exemplary disclosed system to users via the exemplary disclosed user interface. The exemplary disclosed control module may operate to present new features and/or functionalities of the exemplary disclosed system to users via the exemplary disclosed user interface for example by displaying screens, sounds, videos, and/or any other suitable features (e.g., in screen flow) to educate users (e.g., consumers) regarding the new features and/or functionalities. For example, new features and/or functionalities may include a new device sanitizing technology inside of each locker, new hardware and/or software to assist visually impaired persons (e.g., assisted listening) to transact with the station or kiosk, and/or any other suitable features and/or functionalities. In at least some exemplary embodiments, the exemplary disclosed user interface may include screens that may be programmed to time-out after a set period of time, such as 30 seconds, or may query the user to tap a button on the screen to proceed (such as "OK, GOT IT!").

In at least some exemplary embodiments, the exemplary disclosed system for verifying the identity of a user may include a door that selectively opens to allow access to a cavity and selectively closes to block access to the cavity, a lock configured to selectively lock and unlock the door when the door is closed, a camera configured to image a user area adjacent to the door, computing memory having associated therewith code, and a processor communicatively coupled with the computing memory. The processor may be configured to execute the code to control the camera to record a first image data of the user area that includes a plurality of first image sets recorded at a plurality of first times, store the first image data, control the camera to record a second image data of the user area that includes a second image set recorded at a second time, and selectively unlock the door based on comparing the second image data to the first image data. Comparing the second image data to the first image data may include transmitting the first and second image data to a remotely-located device, selectively displaying some of the plurality of first images sets on the remotely-located device, and continuously displaying the second image set on the remotely-located device. The camera may record the second image data of the user area that includes the second image set at the second time based on the user in the user area inputting incorrect input data. Continuously displaying the second image set on the remotely-located device may include continuously displaying the second image set depicting the user in the user area inputting incorrect input data on the remotely-located device, the second image set being displayed adjacent to a movable carousel of the plurality of first images sets displayed on the remotely-located device. The movable carousel may be a variable display of the plurality of first image sets that an operator of the remotely-located device manipulates to display a desired image of the plurality of first image sets. Comparing the second image data to the first image data may include subsequently receiving an operator data from the remotely-located device, and transmitting the first and second image data to the remotely-located device occurs after the user in the user area inputs incorrect input data. The incorrect input data may be selected from the group consisting of an incorrect security image selection or an incorrect PIN code. The operator data may be selected from the group consisting of a security question, a security instruction instructing a user in the user area via voice by VPN into the exemplary disclosed station to remove a hat or change position in the user area, and a security instruction instructing a user in the user area via onscreen display to remove a hat or change position in the user area. For example, the security instruction may be a manual verification by a customer service representative such as, for example, a verification asking for additional information via voice, screen, phone call, speaking to store personnel, and/or any other suitable technique. Also for example, any suitable photo comparison technique and/or facial recognition software may be utilized for verification. The door may be maintained in a locked state when the first image data defines a first set of images of the user in the user area at the first time and the second image data defines a second set of images not including a verified match of the user in the user area at the second time. Comparing the second image data to the first image data may include using facial recognition software.

In at least some exemplary embodiments, the exemplary disclosed method may include providing a door that selectively opens to allow access to a cavity and selectively closes to block access to the cavity, using a lock to selectively lock and unlock the door when the door is closed, using a camera to image a user area adjacent to the door, providing computing memory having associated therewith code and a processor communicatively coupled with the computing memory to execute the code, and controlling the camera to record a first image data of the user area that includes a plurality of first image sets recorded at a plurality of first times. The exemplary disclosed method may also include storing the first image data, locking the door, controlling the camera to record a second image data of the user area that includes a second image set recorded at a second time, transmitting the first and second image data to a remotely-located device, selectively displaying some of the plurality of first images sets on the remotely-located device, continuously displaying the second image set on the remotely-located device, and selectively unlocking the door based on comparing the second image data to the first image data using the remotely-located device. The exemplary disclosed method may further include recording the second image data of the user area that includes the second image set at the second time using the camera based on a user in the user area inputting correct input data or incorrect input data. The exemplary disclosed method may also include continuously displaying the second image set depicting the user in the user area inputting incorrect input data on the remotely-located device, and displaying a movable carousel of the plurality of first images sets on the remotely-located device adjacent to the second image set displayed on the remotely-located device. The exemplary disclosed method may further include manipulating the display of the movable carousel to display a desired image of the plurality of first image sets. Comparing the second image data to the first image data may include subsequently receiving an operator data from the remotely-located device, and transmitting the first and second image data to the remotely-located device occurs after a user in the user area inputs an incorrect security image selection data or an incorrect PIN code data. The operator data may be selected from the group consisting of a security question, a security instruction instructing a user in the user area via voice by VPN into the exemplary disclosed station to remove a hat or change position in the user area, and a security instruction instructing a user in the user area via onscreen display to remove a hat or change position in the user area. For example, the security instruction may be a manual verification by a customer service representative such as, for example, a verification asking for additional information via voice, screen, phone call, speaking to store personnel, and/or any other suitable technique. Also for example, any suitable photo comparison technique and/or facial recognition software may be utilized for verification. Selectively unlocking the door may include unlocking the door when the first image data defines a first set of images of a user in the user area at the first time and the second image data defines a second set of images of the user in the user area at the second time. The processor may maintain the door in a locked state when the first image data defines a first set of images of a user in the user area at the first time and the second image data defines a second set of images not including a verified match of the user in the user area at the second time.

In at least some exemplary embodiments, the exemplary disclosed system for verifying the identity of a user may include a door that selectively opens to allow access to a cavity and selectively closes to block access to the cavity, a lock configured to selectively lock and unlock the door when the door is closed, a camera configured to image a user area adjacent to the door, computing memory having associated therewith code, and a processor communicatively coupled with the computing memory. The processor may be configured to execute the code and to control the camera to record a first image data of the user area that includes a plurality of first image sets recorded at a plurality of first times, store the first image data, control the camera to record a second image data of the user area that includes a second image set recorded at a second time, and selectively unlock the door based on comparing the second image data to the first image data. Comparing the second image data to the first image data may include transmitting the first and second image data to a remotely-located device and subsequently receiving an operator data from the remotely-located device. Transmitting the first and second image data to the remotely-located device may occur after the user in the user area inputs incorrect input data. Comparing the second image data to the first image data may include continuously displaying the second image set on the remotely-located device. Continuously displaying the second image set on the remotely-located device may include continuously displaying the second image set depicting the user in the user area inputting incorrect input data on the remotely-located device, the second image set being displayed adjacent to a movable carousel of the plurality of first images sets displayed on the remotely-located device. The movable carousel may be a variable display of the plurality of first image sets that an operator of the remotely-located device manipulates to display a desired image of the plurality of first image sets.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A system for verifying the identity of a user, comprising:
   a door that selectively opens to allow access to a cavity and selectively closes to block access to the cavity;
   a lock configured to selectively lock and unlock the door when the door is closed;
   a camera configured to image a user area adjacent to the door;
   computing memory having associated therewith code; and
   a processor communicatively coupled with the computing memory, configured to execute the code and to:
   control the camera to record a first image data of the user area that includes a plurality of first image sets recorded at a plurality of first times;
   store the first image data;
   control the camera to record a second image data of the user area that includes a second image set recorded at a second time; and
   selectively unlock the door based on comparing the second image data to the first image data;
   wherein comparing the second image data to the first image data includes:
   transmitting the first and second image data to a remotely-located device;
   selectively displaying some of the plurality of first images sets on the remotely-located device; and
   continuously displaying the second image set on the remotely-located device;
   wherein the camera records the second image data of the user area that includes the second image set at the second time when the user in the user area inputs correct input data or incorrect input data.

2. The system of claim 1, wherein continuously displaying the second image set on the remotely-located device includes continuously displaying the second image set depicting the user in the user area inputting incorrect input data on the remotely-located device, the second image set being displayed adjacent to a movable carousel of the plurality of first images sets displayed on the remotely-located device.

3. The system of claim 2, wherein the movable carousel is a variable display of the plurality of first image sets that an operator of the remotely-located device manipulates to display a desired image of the plurality of first image sets.

4. The system of claim 1, wherein comparing the second image data to the first image data includes using facial recognition software.

5. A method, comprising:
   providing a door that selectively opens to allow access to a cavity and selectively closes to block access to the cavity;
   using a lock to selectively lock and unlock the door when the door is closed;
   using a camera to image a user area adjacent to the door;
   providing computing memory having associated therewith code and a processor communicatively coupled with the computing memory to execute the code;
   controlling the camera to record a first image data of the user area that includes a plurality of first image sets recorded at a plurality of first times;
   storing the first image data;
   locking the door;
   controlling the camera to record a second image data of the user area that includes a second image set recorded at a second time;
   transmitting the first and second image data to a remotely-located device;
   selectively displaying some of the plurality of first images sets on the remotely-located device;
   continuously displaying the second image set on the remotely-located device;
   selectively unlocking the door based on comparing the second image data to the first image data using the remotely-located device; and
   recording the second image data of the user area that includes the second image set at the second time using the camera based on a user in the user area inputting incorrect input data.

6. The method of claim 5, further comprising:
continuously displaying the second image set depicting the user in the user area inputting incorrect input data on the remotely-located device; and
displaying a movable carousel of the plurality of first images sets on the remotely-located device adjacent to the second image set displayed on the remotely-located device.

7. The method of claim 6, further comprising manipulating the display of the movable carousel to display a desired image of the plurality of first image sets.

8. A system for verifying the identity of a user, comprising:
a door that selectively opens to allow access to a cavity and selectively closes to block access to the cavity;
a lock configured to selectively lock and unlock the door when the door is closed;
a camera configured to image a user area adjacent to the door;
computing memory having associated therewith code; and
a processor communicatively coupled with the computing memory, configured to execute the code and to:
control the camera to record a first image data of the user area that includes a plurality of first image sets recorded at a plurality of first times;
store the first image data;
control the camera to record a second image data of the user area that includes a second image set recorded at a second time; and
selectively unlock the door based on comparing the second image data to the first image data;
wherein comparing the second image data to the first image data includes transmitting the first and second image data to a remotely-located device and subsequently receiving an operator data from the remotely-located device;
wherein transmitting the first and second image data to the remotely-located device occurs after the user in the user area inputs incorrect input data; and
wherein comparing the second image data to the first image data includes continuously displaying the second image set on the remotely-located device.

9. The system of claim 8, wherein continuously displaying the second image set on the remotely-located device includes continuously displaying the second image set depicting the user in the user area inputting incorrect input data on the remotely-located device, the second image set being displayed adjacent to a movable carousel of the plurality of first images sets displayed on the remotely-located device.

10. The system of claim 9, wherein the movable carousel is a variable display of the plurality of first image sets that an operator of the remotely-located device manipulates to display a desired image of the plurality of first image sets.

11. A system for verifying the identity of a user, comprising:
a door that selectively opens to allow access to a cavity and selectively closes to block access to the cavity;
a lock configured to selectively lock and unlock the door when the door is closed;
a camera configured to image a user area adjacent to the door;
computing memory having associated therewith code; and
a processor communicatively coupled with the computing memory, configured to execute the code and to:
control the camera to record a first image data of the user area that includes a plurality of first image sets recorded at a plurality of first times;
store the first image data;
control the camera to record a second image data of the user area that includes a second image set recorded at a second time; and
selectively unlock the door based on comparing the second image data to the first image data;
wherein comparing the second image data to the first image data includes:
transmitting the first and second image data to a remotely-located device;
selectively displaying some of the plurality of first images sets on the remotely-located device; and
continuously displaying the second image set on the remotely-located device;
wherein comparing the second image data to the first image data includes receiving an operator data from the remotely-located device; and
wherein transmitting the first and second image data to the remotely-located device occurs after the user in the user area inputs incorrect input data.

12. The system of claim 11, wherein the incorrect input data is an incorrect security image selection or an incorrect PIN code.

13. The system of claim 11, wherein the operator data is selected from the group consisting of a security question and a security instruction instructing a user in the user area to remove a hat or change position in the user area.

14. A system for verifying the identity of a user, comprising:
a door that selectively opens to allow access to a cavity and selectively closes to block access to the cavity;
a lock configured to selectively lock and unlock the door when the door is closed;
a camera configured to image a user area adjacent to the door;
computing memory having associated therewith code; and
a processor communicatively coupled with the computing memory, configured to execute the code and to:
control the camera to record a first image data of the user area that includes a plurality of first image sets recorded at a plurality of first times;
store the first image data;
control the camera to record a second image data of the user area that includes a second image set recorded at a second time; and
selectively unlock the door based on comparing the second image data to the first image data;
wherein comparing the second image data to the first image data includes:
transmitting the first and second image data to a remotely-located device;
selectively displaying some of the plurality of first images sets on the remotely-located device; and
continuously displaying the second image set on the remotely-located device; and
wherein the door is maintained in a locked state when the first image data defines a first set of images of the user in the user area at the first time and the second image data defines a second set of images not including a verified match of the user in the user area at the second time.

15. A method, comprising:
providing a door that selectively opens to allow access to a cavity and selectively closes to block access to the cavity;
using a lock to selectively lock and unlock the door when the door is closed;
using a camera to image a user area adjacent to the door;
providing computing memory having associated therewith code and a processor communicatively coupled with the computing memory to execute the code;
controlling the camera to record a first image data of the user area that includes a plurality of first image sets recorded at a plurality of first times;
storing the first image data;
locking the door;
controlling the camera to record a second image data of the user area that includes a second image set recorded at a second time;
transmitting the first and second image data to a remotely-located device;
selectively displaying some of the plurality of first images sets on the remotely-located device;
continuously displaying the second image set on the remotely-located device; and
selectively unlocking the door based on comparing the second image data to the first image data using the remotely-located device;
wherein comparing the second image data to the first image data includes receiving an operator data from the remotely-located device; and
wherein transmitting the first and second image data to the remotely-located device occurs after a user in the user area inputs an incorrect security image selection data or an incorrect PIN code data.

16. The method of claim 15, wherein the operator data is selected from the group consisting of a security question and a security instruction instructing a user in the user area to remove a hat or change position in the user area.

17. A method, comprising:
providing a door that selectively opens to allow access to a cavity and selectively closes to block access to the cavity;
using a lock to selectively lock and unlock the door when the door is closed;
using a camera to image a user area adjacent to the door;
providing computing memory having associated therewith code and a processor communicatively coupled with the computing memory to execute the code;
controlling the camera to record a first image data of the user area that includes a plurality of first image sets recorded at a plurality of first times;
storing the first image data;
locking the door;
controlling the camera to record a second image data of the user area that includes a second image set recorded at a second time;
transmitting the first and second image data to a remotely-located device;
selectively displaying some of the plurality of first images sets on the remotely-located device;
continuously displaying the second image set on the remotely-located device; and
selectively unlocking the door based on comparing the second image data to the first image data using the remotely-located device;
wherein selectively unlocking the door includes unlocking the door when the first image data defines a first set of images of a user in the user area at the first time and the second image data defines a second set of images of the user in the user area at the second time.

18. A method, comprising:
providing a door that selectively opens to allow access to a cavity and selectively closes to block access to the cavity;
using a lock to selectively lock and unlock the door when the door is closed;
using a camera to image a user area adjacent to the door;
providing computing memory having associated therewith code and a processor communicatively coupled with the computing memory to execute the code;
controlling the camera to record a first image data of the user area that includes a plurality of first image sets recorded at a plurality of first times;
storing the first image data;
locking the door;
controlling the camera to record a second image data of the user area that includes a second image set recorded at a second time;
transmitting the first and second image data to a remotely-located device;
selectively displaying some of the plurality of first images sets on the remotely-located device;
continuously displaying the second image set on the remotely-located device; and
selectively unlocking the door based on comparing the second image data to the first image data using the remotely-located device;
wherein the processor maintains the door in a locked state when the first image data defines a first set of images of a user in the user area at the first time and the second image data defines a second set of images not including a verified match of the user in the user area at the second time.

* * * * *